United States Patent
Sashihara

(10) Patent No.: US 9,655,031 B2
(45) Date of Patent: May 16, 2017

(54) BASE STATION AND TERMINAL, AND CONTROL METHODS THEREOF

(75) Inventor: Toshiyuki Sashihara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1479 days.

(21) Appl. No.: 12/921,055

(22) PCT Filed: Apr. 7, 2009

(86) PCT No.: PCT/JP2009/057133
§ 371 (c)(1),
(2), (4) Date: Sep. 3, 2010

(87) PCT Pub. No.: WO2009/130998
PCT Pub. Date: Oct. 29, 2009

(65) Prior Publication Data
US 2011/0149850 A1    Jun. 23, 2011

(30) Foreign Application Priority Data
Apr. 23, 2008   (JP) .................................. 2008-112019

(51) Int. Cl.
*H04W 4/00*        (2009.01)
*H04W 48/16*       (2009.01)
*H04W 8/26*        (2009.01)

(52) U.S. Cl.
CPC .............. *H04W 48/16* (2013.01); *H04W 8/26* (2013.01)

(58) Field of Classification Search
CPC ................................. H04W 48/16; H04W 8/26
(Continued)

(56) References Cited

U.S. PATENT DOCUMENTS 5,724,346 A * 3/1998 Kobayashi ............ H04W 48/20
                                                      370/329
6,424,637 B1 * 7/2002 Pecen et al. ................... 370/328
(Continued)

FOREIGN PATENT DOCUMENTS

JP    2007-67745 A    3/2007
JP    2008079306 A    4/2008
(Continued)

OTHER PUBLICATIONS

International Search Report for PCT/JP2009/057133 mailed Jul. 14, 2009.
(Continued)

*Primary Examiner* — Khaled Kassim
*Assistant Examiner* — Berhanu Belete

(57) ABSTRACT

In order to reduce a disruption of communication which occurs upon performing an active scan, an access point (10_2) includes an interface on DS side (100_2) which communicates with different access points (10_1 and 10_3) through distribution system (DS) media (30), and an interface on terminal side (200_2) which generates, when receiving from a terminal (20) not being in communication with the access point through a radio channel (CH2) a probe request frame (FR7) which is the one for scanning an access point capable of communicating with the terminal and which includes an address (A100_1) for the DS media (30) to identify the different access point (10_1) being in communication with the terminal (20), a response frame (FR8) addressed to the address (A 100_1) and responding to the probe request frame (FR7), and makes the interface on DS side (100_2) transmit the response frame (FR8) to the DS media (30).

20 Claims, 48 Drawing Sheets

(58) Field of Classification Search
USPC .................................. 370/328, 331, 227–228
See application file for complete search history.

(56) References Cited

U.S. PATENT DOCUMENTS

| | | | | |
|---|---|---|---|---|
| 6,850,503 | B2* | 2/2005 | Dorenbosch | H04W 36/0033 370/228 |
| 7,453,844 | B1* | 11/2008 | Lee | H04W 72/08 370/329 |
| 7,542,449 | B2* | 6/2009 | Kim | H04W 36/0055 370/310 |
| 7,558,544 | B2* | 7/2009 | Kim et al. | 455/132 |
| 7,573,846 | B2* | 8/2009 | Rue | H04L 29/06 370/232 |
| 7,586,867 | B2* | 9/2009 | Lin | H04W 88/08 370/310 |
| 7,751,376 | B2* | 7/2010 | Hashimoto et al. | 370/338 |
| 7,924,786 | B2* | 4/2011 | Oh et al. | 370/331 |
| 8,359,061 | B2* | 1/2013 | Masuda | H04W 8/005 370/329 |
| 8,619,728 | B2* | 12/2013 | Frank | H04L 12/413 370/328 |
| 2003/0064752 | A1* | 4/2003 | Adachi | H04L 63/08 455/560 |
| 2004/0030791 | A1* | 2/2004 | Dorenbosch et al. | 709/230 |
| 2004/0043767 | A1* | 3/2004 | Tsutsumi | H04W 36/08 455/432.1 |
| 2004/0054774 | A1* | 3/2004 | Barber | H04L 12/2856 709/224 |
| 2005/0068928 | A1* | 3/2005 | Smith | H04W 48/16 370/338 |
| 2005/0128988 | A1* | 6/2005 | Simpson | H04W 48/16 370/338 |
| 2005/0201564 | A1* | 9/2005 | Kayashima | H04L 9/0891 380/283 |
| 2006/0029028 | A1* | 2/2006 | Kim | H04W 84/12 370/338 |
| 2006/0040663 | A1* | 2/2006 | Ise et al. | 455/434 |
| 2006/0092888 | A1* | 5/2006 | Jeong | H04W 48/14 370/338 |
| 2006/0109815 | A1* | 5/2006 | Ozer | H04W 48/16 370/329 |
| 2006/0251021 | A1* | 11/2006 | Nakano | H04W 36/0038 370/331 |
| 2007/0047480 | A1* | 3/2007 | Suga | 370/328 |
| 2007/0047492 | A1* | 3/2007 | Kim | H04W 36/0083 370/331 |
| 2007/0097940 | A1* | 5/2007 | Yuen | H04W 16/10 370/338 |
| 2007/0253355 | A1* | 11/2007 | Hande et al. | 370/328 |
| 2008/0014934 | A1* | 1/2008 | Balasubramanian et al. | 455/434 |
| 2008/0130579 | A1* | 6/2008 | Kurita | H04W 8/18 370/331 |
| 2008/0170497 | A1* | 7/2008 | Jeong | H04W 28/08 370/230 |
| 2008/0186917 | A1* | 8/2008 | Wu et al. | 370/331 |
| 2008/0192698 | A1* | 8/2008 | Rue | 370/331 |
| 2008/0212542 | A1* | 9/2008 | Kung | H04W 36/0005 370/336 |
| 2009/0190553 | A1* | 7/2009 | Masuda et al. | 370/331 |
| 2009/0190555 | A1* | 7/2009 | Oguchi | H04W 8/005 370/331 |

FOREIGN PATENT DOCUMENTS

JP   2009141535 A   6/2009
WO   2007142199 A   12/2007

OTHER PUBLICATIONS

ANSI/IEEE Std 802.11, 1999 Edition, "Information technology—Telecommunication and information exchange between systems—Local and metropolitan area networks—Specific requirements—Part 11: Wireless LAN Medium Access Control (MAC) and Physical Layer (PHY) Specifications", 1999, pp. 125-128.
Japanese Office Action for JP Application No. 2010-509133 mailed on Jul. 30, 2013 with English Translation.

* cited by examiner

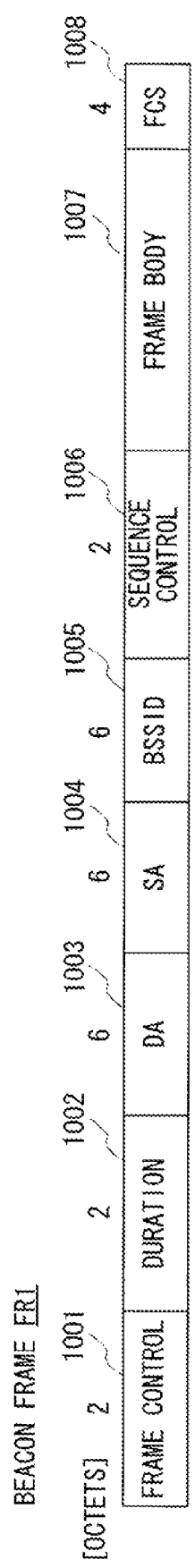

ASSOCIATION REQUEST FRAME FR5

ASSOCIATED TERMINAL INFORMATION STORAGE 406

| ASSOCIATED TERMINAL MAC ADDRESS | AVAILABILITY OF FAST ACTIVE SCAN |
|---|---|
| XX:XX:XX:XX:XX:XX:XX | 1 (USE) |
| YY:YY:YY:YY:YY:YY:YY | 0 (NONUSE) |
| ZZ:ZZ:ZZ:ZZ:ZZ:ZZ:ZZ | 1 (USE) |

Fig. 12

PROBE RESPONSE FRAME FR8a

| [OCTETS] | 2 | 2 | 6 | 6 | 6 | 2 | | 4 |
|---|---|---|---|---|---|---|---|---|
| | FRAME CONTROL | DURATION | DA | SA | BSSID | SEQUENCE CONTROL | FRAME BODY | FCS |
| | 1001 | 1002 | 1003 | 1004 | 1005 | 1006 | 1007 | 1008 |

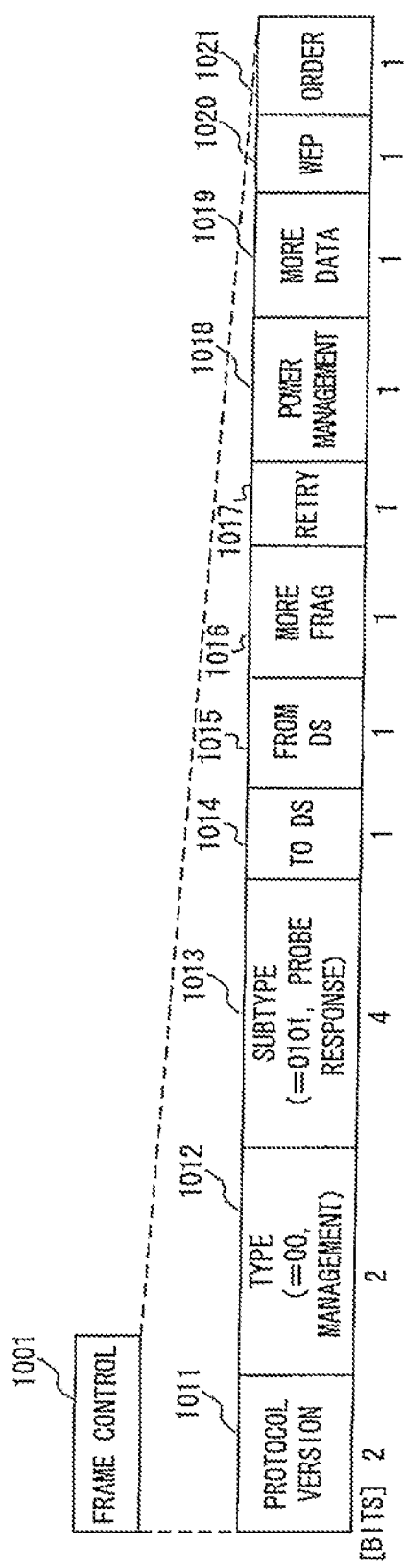
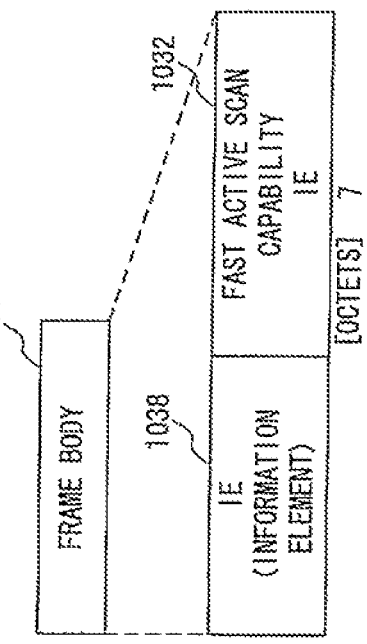
Fig. 23B
Fig. 23C

PROBE RESPONSE FRAME STORAGE 105

| TERMINAL MAC ADDRESS | AP MAC ADDRESS | INFORMATION ELEMENT |
|---|---|---|
| 11:11:11:11:11:11 | 22:22:22:22:22:22 | IE 1038 |
| 11:11:11:11:11:11 | 33:33:33:33:33:33 | IE 1038 |
| 44:44:44:44:44:44 | 22:22:22:22:22:22 | IE 1038 |
| 44:44:44:44:44:44 | 55:55:55:55:55:55 | IE 1038 |

PROBE RESULT REQUEST FRAME FR9

| [OCTETS] | 2 | 2 | 6 | 6 | 6 | 2 | | 4 |
|---|---|---|---|---|---|---|---|---|
| | FRAME CONTROL | DURATION | DA | SA | BSSID | SEQUENCE CONTROL | FRAME BODY | FCS |

1001, 1002, 1003, 1004, 1005, 1006, 1007, 1008

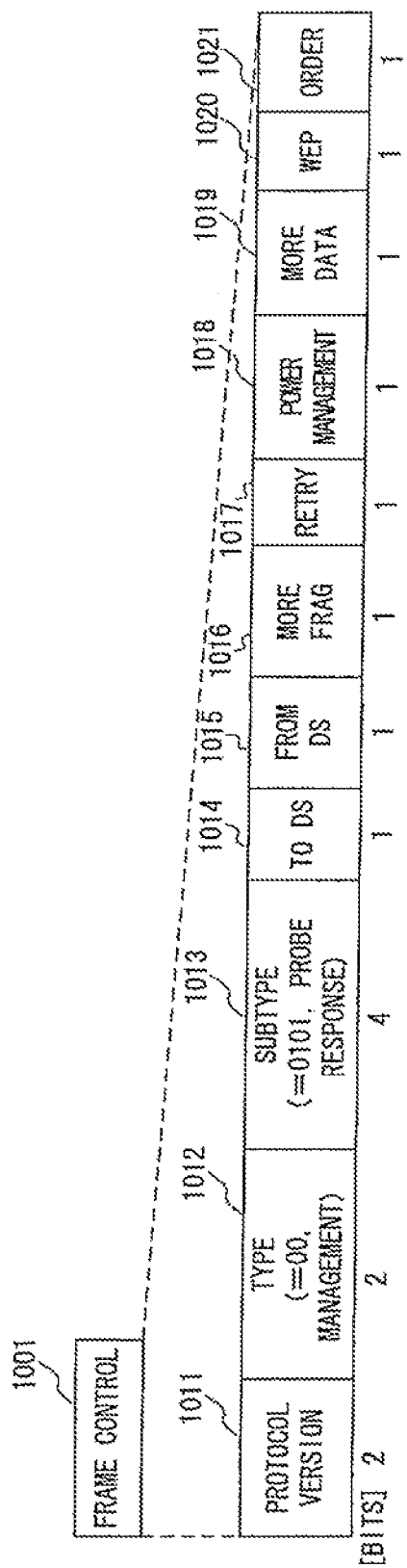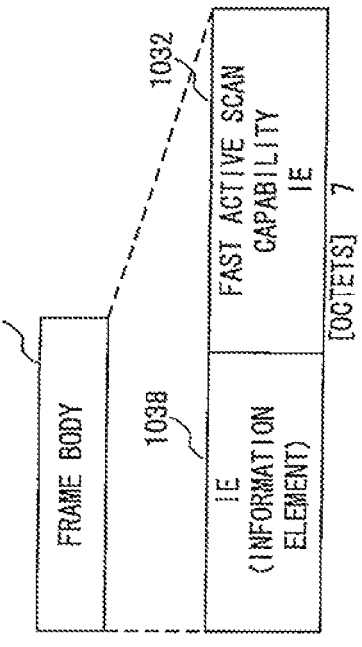

Fig. 28A

PROBE RESULT RESPONSE FRAME ER10

| [OCTETS] | 2 | 2 | 6 | 6 | 6 | 2 | | 4 |
|---|---|---|---|---|---|---|---|---|
| | FRAME CONTROL | DURATION | DA | SA | BSSID | SEQUENCE CONTROL | FRAME BODY | FCS |
| | 1001 | 1002 | 1003 | 1004 | 1005 | 1006 | 1007 | 1008 |

Fig. 28B

Frame Control (1001)

| PROTOCOL VERSION | TYPE (=00, MANAGEMENT) | SUBTYPE (=1101, ACTION) | TO DS | FROM DS | MORE FRAG | RETRY | POWER MANAGEMENT | MORE DATA | WEP | ORDER |
|---|---|---|---|---|---|---|---|---|---|---|
| 2 | 2 | 4 | 1 | 1 | 1 | 1 | 1 | 1 | 1 | 1 |

[BITS]

Frame Body (1007)

| CATEGORY (=6, FAST BSS TRANSITION) | ACTION (=6, PROBE RESULT REQUEST) | PROBE RESULT IE (INFORMATION ELEMENT) |
|---|---|---|
| 1 | 1 | M+6 |

[OCTETS]

1039, 1040, 1041

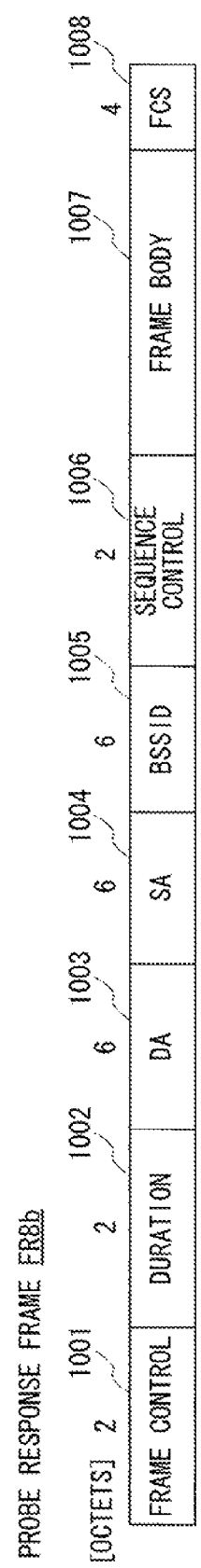

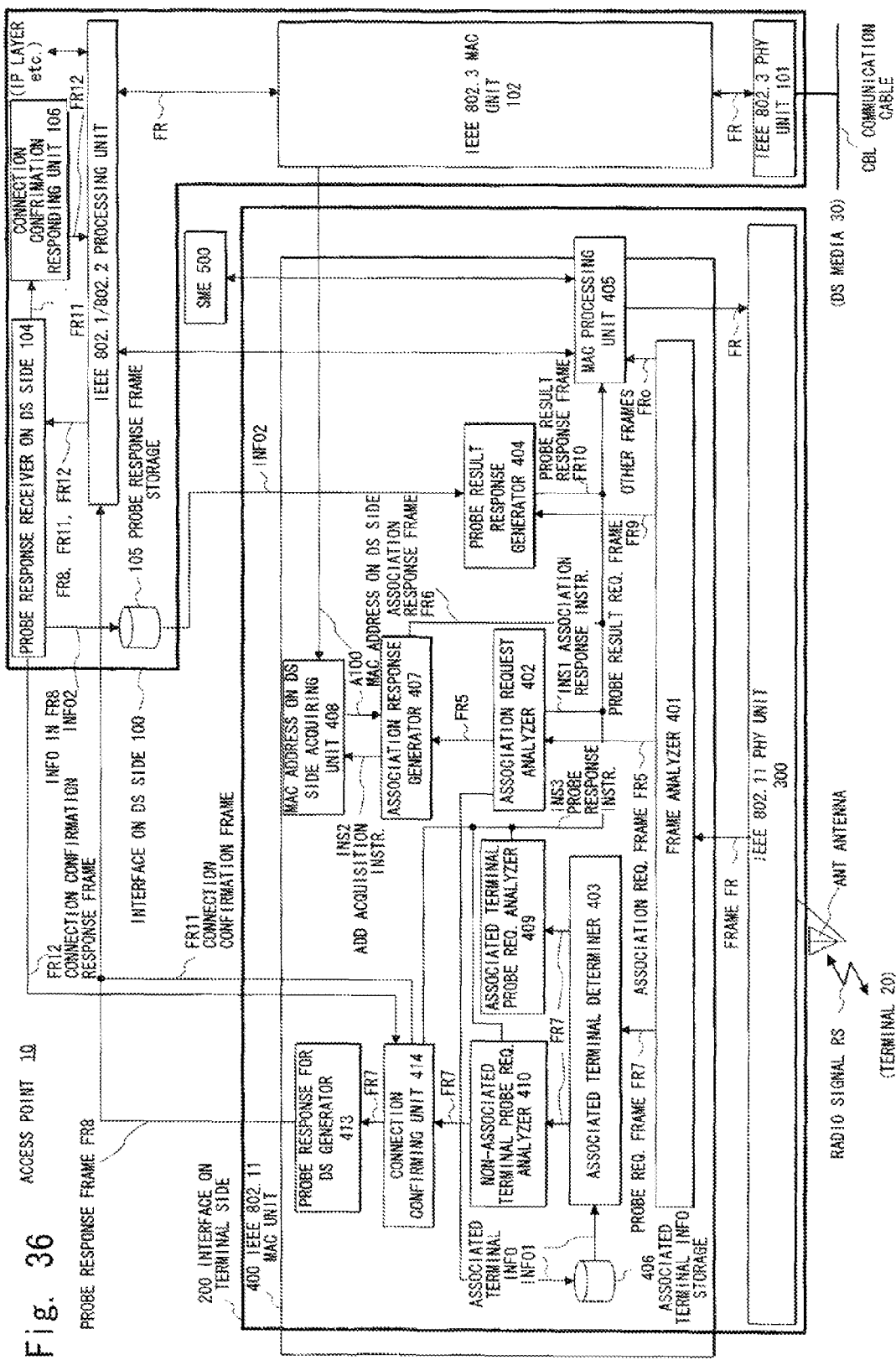

BASE STATION AND TERMINAL, AND CONTROL METHODS THEREOF

TECHNICAL FIELD

The present invention relates to a base station and a terminal, and control methods thereof, and particularly to a base station and a terminal, and control methods thereof, which can reduce time required for scanning the base station.

BACKGROUND ART

Non Patent Literature 1 discloses two kinds of methods referred to as a passive scan and an active scan, as a method by which a terminal scans an access point (base station) in a wireless LAN (Local Area Network).

In the passive scan method, a terminal scans presence of an access point, depending on the presence or absence of reception of a beacon frame which is periodically incoming from the access point through an object radio channel to be scanned. In the passive scan method, the terminal needs to wait for the beacon frame to be transmitted from the access point. Therefore, the terminal needs to wait up to periodic time for which the beacon frame is transmitted, in order to confirm the presence or absence of an access point in each radio channel.

On the other hand, in the active scan method, a terminal broadcasts a probe request frame through a radio channel. An access point, which has received the probe request frame, transmits a probe response frame to the terminal. Therefore, the terminal scans presence of the access point, depending on the presence or absence of reception of the probe response frame.

In this way, in the active scan method, the terminal can issue the probe request frame at desired timing, and collect the probe response frame from the access point. Accordingly, the active scan method is generally used in a case where information on the presence of the access point is immediately needed as upon handover or the like.

Hereinafter, operation examples of the active scan will be described with reference to FIGS. 39 and 40.

Firstly, one operation example is described with reference to FIG. 39, in a case where the terminal performs the active scan by using a radio channel in which no access point exists.

When a terminal 20 switches to a channel CH1 at time T101, the terminal 20 waits until ProbeDelay time elapses or a frame is received from a different node. Assume that the frame is not received from the different node.

When the ProbeDelay time elapses at time T102, the terminal 20 starts preparing to transmit a probe request frame FR7c. When transmission of the frame by the different node is not detected from the time T102 to time 1103 after DIFS (Distributed Inter Frame Space) time, the terminal 20 broadcasts the probe request frame FR7c to the channel CH1 at the time T103. At the same time, the terminal 20 starts to time MinChannelTime and MaxChannelTime (not shown). Note that "MinChannelTime<MaxChannelTime" is met, and each of the MinChannelTime and MaxChannelTime is generally set to a value from several to dozens of msec.

In this case, there is no access point in the channel CH1. Therefore, none of access points 10_1 to 10_3 can respond to the probe request frame FR7c transmitted by the terminal 20. When the MinChannelTime elapses at time T104, the terminal 20 assumes that there is no access point in the channel CH I, and thus terminates the active scan, because a response to the probe request frame FR7c could not be received by the MinChannelTime elapsed.

Next, another operation example is described with reference to FIG. 40, in a case where the terminal performs the active scan by using a radio channel in which the access point exists.

Assume that each of access points 10_1 to 10_3 shown in FIG. 40 uses the channel CH1 and exists within a range where the probe request frame FR7c from the terminal 20 can reach. In this case, when the terminal 20 switches to the channel CH1 at time T201, the terminal 20 waits until the ProbeDelay time elapses or the frame is received from the different node. Assume that the frame is not received from the different node.

When the ProbeDelay time elapses at time T202, the terminal 20 starts preparing to transmit the probe request frame FR7c. When the transmission of the frame by the different node is not detected from the time T202 to time T203 after the DIFS time, the terminal 20 broadcasts the probe request frame FR7c to the channel CH1 at the time T203. At the same time, the terminal 20 starts to time the MinChannelTime and MaxChannelTime.

In this case, each of the access points 10_1 to 10_3 receives the probe request frame FR7c and transmits a probe response frame FR8c to the terminal 20. As shown in FIG. 40, assume that the access point 10_1 firstly transmits the probe response frame FR8c. The terminal 20 stops to time the MinChannelTime at time T204 when the probe response frame FR8c is received, and returns an acknowledgment (Ack) frame FR3. Thereafter, when the terminal 20 receives the probe response frames FR8c from the access points 10_2 and 10_3, the terminal 20 returns the Ack frames FR3 to each of the access points 10_2 and 10_3. The MaxChannelTime elapses at time T205. Thus, the terminal 20 recognizes as a result of the scan the access points 10_1 to 10_3 which are transmission sources of the probe response. frames FR8c having been received by then, and terminates the active scan.

CITATION LIST

Non Patent Literature

[Non Patent Literature 1]
IEEE Std 802.11, 1999, section 11.1.3, pp. 125-128

SUMMARY OF INVENTION

Technical Problem

However, in the above-mentioned active scan method disclosed in Non Patent Literature 1, the terminal requires at least "MinChannelTime+ProbeDelay+DIFS+time required to transmit probe request frame" up to "MaxChannelTime+ProbeDelay+DIFS+time required to transmit probe request frame", for each object radio channel to be scanned.

In a case of operating a network in accordance with IEEE 802.11b standard, the number of available radio channels is "14" in total. Therefore, it takes about several hundreds of msec to perform the active scan for all radio channels. While the terminal performs the active scan for a radio channel different from that used by an access point which is in communication therewith, the terminal cannot communicate with the access point. Therefore, communication by the terminal through the access point is disrupted.

Particularly, there is a problem that when the terminal performs the active scan while performing voice communication such as VoIP (Voice over Internet Protocol), interruption of voice occurs due to the disruption of communication.

On the other hand, there is e.g. IEEE 802.11r standard as a standard which aims to reduce time of instantaneous interruption upon handover as much as possible. However, this standard prescribes reduction of the number of frame exchanges occurring upon the handover, but does not reduce time of instantaneous interruption occurring upon the active scan in any way.

Accordingly, the present invention aims to provide a base station and a terminal, and control methods thereof, which can reduce a disruption of communication occurring upon performing an active scan.

Solution to Problem

In order to achieve the above-mentioned aim, a base station according to one exemplary aspect of the present invention includes: a first interface means capable of communicating with a different base station; and a second interface means for generating, when a scan frame is received from a terminal that is not in communication with the base station through a radio channel, a response frame to the scan frame, and making the first interface means transmit the response frame. The scan frame is the one for scanning a base station capable of communicating with the terminal, and includes an address to identify the different base station that is in communication with the terminal. The response frame is addressed to the address.

Further, a terminal according to one exemplary aspect of the present invention communicates through radio channels with a plurality of base stations mutually connected. This terminal includes: a first means for acquiring, from one base station selected as a communication destination from among the plurality of base stations, an address to identify the one base station in order that a different base station may transmit data to the one base station; a second means for broadcasting a scan frame for scanning base stations that include the different base station and that can communicate with the terminal, the scan frame including the address; and a third means for acquiring a response frame to the scan frame from the one base station.

Further, a method of controlling a base station according to one exemplary aspect of the present invention includes: a first step capable of communicating with a different base station; and a second step of generating, when a scan frame is received from a terminal that is not in communication with the base station through a radio channel, a response frame to the scan frame, and making the first step transmit the response frame. The scan frame is the one for scanning a base station capable of communicating with the terminal, and includes an address to identify the different base station that is in communication with the terminal. The response frame is addressed to the address.

Furthermore, a method of controlling a terminal according to one exemplary aspect of the present invention provides a method of controlling a terminal that communicates through radio channels with a plurality of base stations mutually connected. This method includes: a first step of acquiring, from one base station selected as a communication destination from among the plurality of base stations, an address to identify the one base station in order that a different base station may transmit data to the one base station; a second step of broadcasting a scan frame for scanning base stations that include the different base station and that can communicate with the terminal, the scan frame including the address; and a third step of acquiring a response frame to the scan frame from the one base station.

Advantageous Effects of Invention

According to the present invention, time required for a terminal to be on a different radio channel apart from a radio channel in use equals to only time required to transmit a scan frame, so that it is possible to drastically reduce a disruption of communication.

Thus, the terminal can frequently perform an active scan, thereby can perform handover to a more suitable base station.

BRIEF DESCRIPTION OF DRAWINGS

FIG. 5A is a diagram showing a configuration example of a beacon frame used, in the first exemplary embodiment of the base station according to the present invention;

FIG. 9B is a diagram showing a configuration example of a Frame Control field in the association request frame used in the first exemplary embodiment of the terminal according to the present invention;

FIG. 9C is a diagram showing a configuration example of a Frame Body field in the association request frame used in the first exemplary embodiment of the terminal according to the present invention;

FIG. 12 is a diagram showing a configuration example of an associated terminal information storage used in the first exemplary embodiment of the base station according to the present invention;

FIG. 23B is a diagram showing a configuration example of a Frame Control field in the second probe response frame used in the first exemplary embodiment of the base station according to the present invention;

FIG. 23C is a diagram showing a configuration example of a Frame Body field in the second probe response frame used in the first exemplary embodiment of the base station according to the present invention;

FIG. 25 is a diagram showing a configuration example of a probe response frame storage used in the first exemplary embodiment of the terminal according to the present invention;

FIG. 27A is a diagram showing a configuration example of a probe result request frame used in the first exemplary embodiment of the terminal according to the present invention;

FIG. 27B is a diagram showing a configuration example of a Frame Control field in the probe result request frame used in the first exemplary embodiment of the terminal according to the present invention;

FIG. 27C is a diagram showing a configuration example of a Frame Body field in the probe result request frame used in the first exemplary embodiment of the terminal according to the present invention;

FIG. 28A is a diagram showing a configuration example of a probe result response frame used in the first exemplary embodiment of the base station according to the present invention;

FIG. 28B is a diagram showing a configuration example of a Frame Control field in the probe result response frame used in the first exemplary embodiment of the base station according to the present invention;

FIG. 28C is a diagram showing a configuration example of a Frame Body field in the probe result response frame used in the first exemplary embodiment of the base station according to the present invention;

FIG. 35A is a diagram showing a configuration example of a probe response frame used in the second exemplary embodiment of the base station according to the present invention;

FIG. 36 is a block diagram showing a configuration example in a third exemplary embodiment of the base station according to the present invention;

DESCRIPTION OF EMBODIMENTS

Hereinafter, first to third exemplary embodiments of a base station and a terminal according to the present invention will be described with reference to FIGS. 1 to 4, 5A to 5C, 6 to 8, 9A to 9C, 10 to 12, 13A to 13C, 14 to 17, 18A to 18C, 19 to 22, 23A to 23C, 24 to 26, 27A to 27C, 28A to 28C, 29 to 34, 35A to 35C, and 36 to 38. Note that the same signs are assigned to the same elements throughout the drawings, and their duplicated explanation is omitted as appropriate for clarifying the explanation.

[First Exemplary Embodiment]

Figure 1:
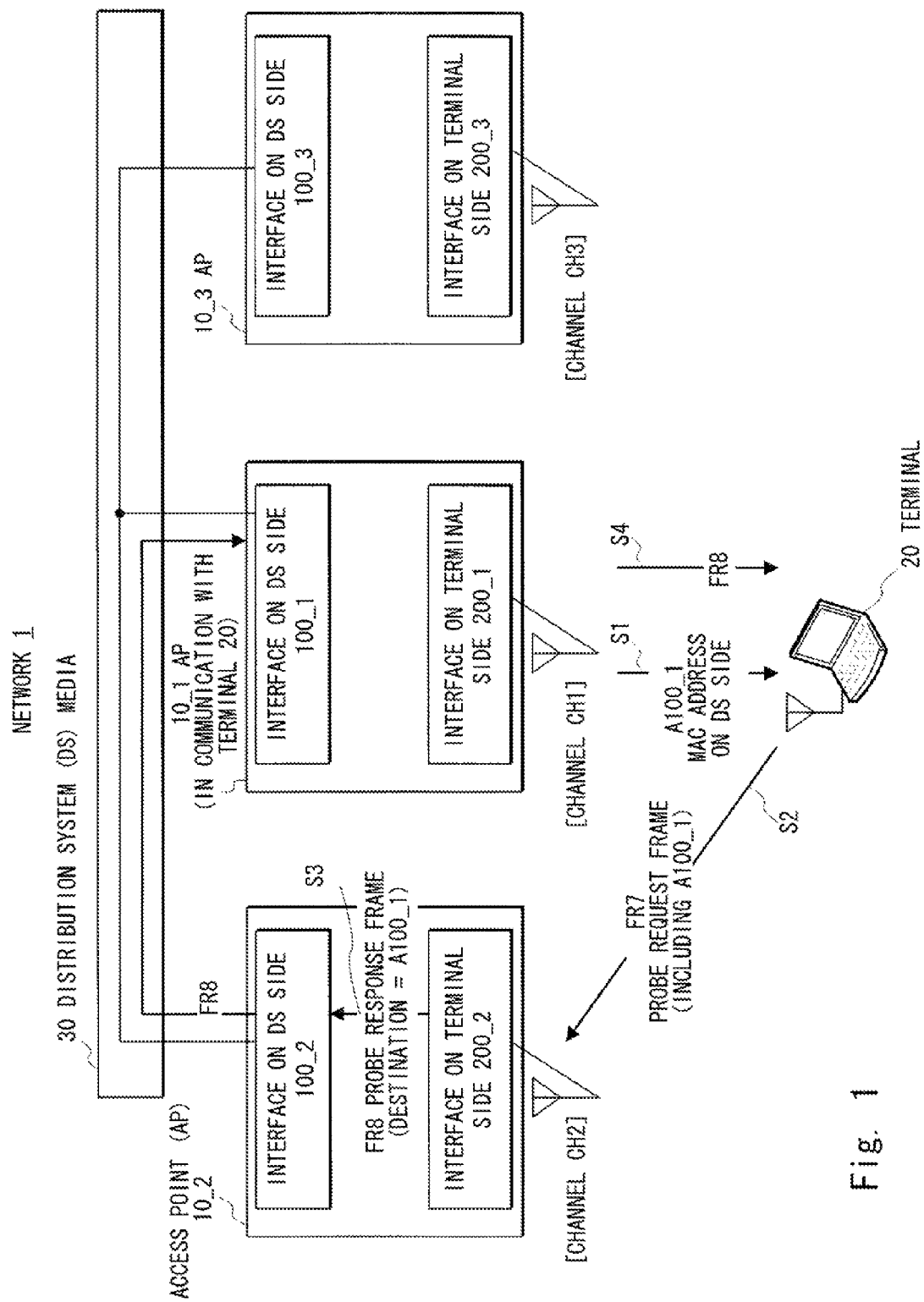
FIG. 1 is a block diagram showing a configuration example of a network to which a base station and a terminal according to the present invention are applied.

FIG. 1 shows a configuration example of a network to which a base station and a terminal according to this exemplary embodiment are applied. This network 1 includes, in general, access points (APs) 10_1 to 10_3 (hereinafter, sometimes referred to collectively as the sign 10) as base stations, a terminal 20 which performs communication through any one of radio channels CH1 to CH3 used by the access points 10_1 to 10_3, and distribution system (hereinafter, referred to as DS) media 30 which connects between the access points 10_1 to 10_3.

Further, the access points 10_1 to 10_3 respectively include interfaces 100_1 to 100_3 (hereinafter, sometimes referred to as interfaces on DS side and collectively as the sign 100) which perform intercommunication through the DS media 30, and interfaces 200_1 to 200_3 (hereinafter, sometimes referred to as interfaces on terminal side and collectively as the sign 200) which communicate with the terminal 20 through the radio channels CH1 to CH3. Note that while not shown in FIG. 1, the terminal 20 includes functions equivalent to the above-described first to third means.

In operation, as shown in FIG. 1, when the terminal 20 is associated with the access point 10_1 and in communication therewith, the terminal 20 acquires from the access point 10_1 an address for the DS media 30 to identify the access point 10_1, in other words, a MAC address A100_1 of the interface on DS side 100_1 (hereinafter, referred to as MAC address on DS side) (Step S1). Then, the terminal 20 broadcasts a probe request frame FR7 which includes therein the MAC address on DS side A100_1, in a case of scanning an access point which can communicate with the terminal 20 through the radio channel CH2 (Step S2). Further, the terminal 20 resumes the communication with the access point 10_1 through the radio channel CH1, immediately after the transmission of the probe request frame FR7.

The probe request frame FR7 is received at the access point 10_2 which uses the radio channel CH2. The interface on terminal side 200_2 in the access point 10_2 outputs a probe response frame FR8 of which destination is set to the MAC address on DS side A100_1 to the interface on DS side 100_2, thereby making the interface on DS side 100_2 transmit the probe response frame FR8 to the DS media 30 (Step S3).

The probe response frame FR8 reaches the access point 10_1 through the DS media 30. Therefore, the terminal 20 acquires the probe response frame FR8 from the access point 10_1 in use (Step S4).

Figure 39:
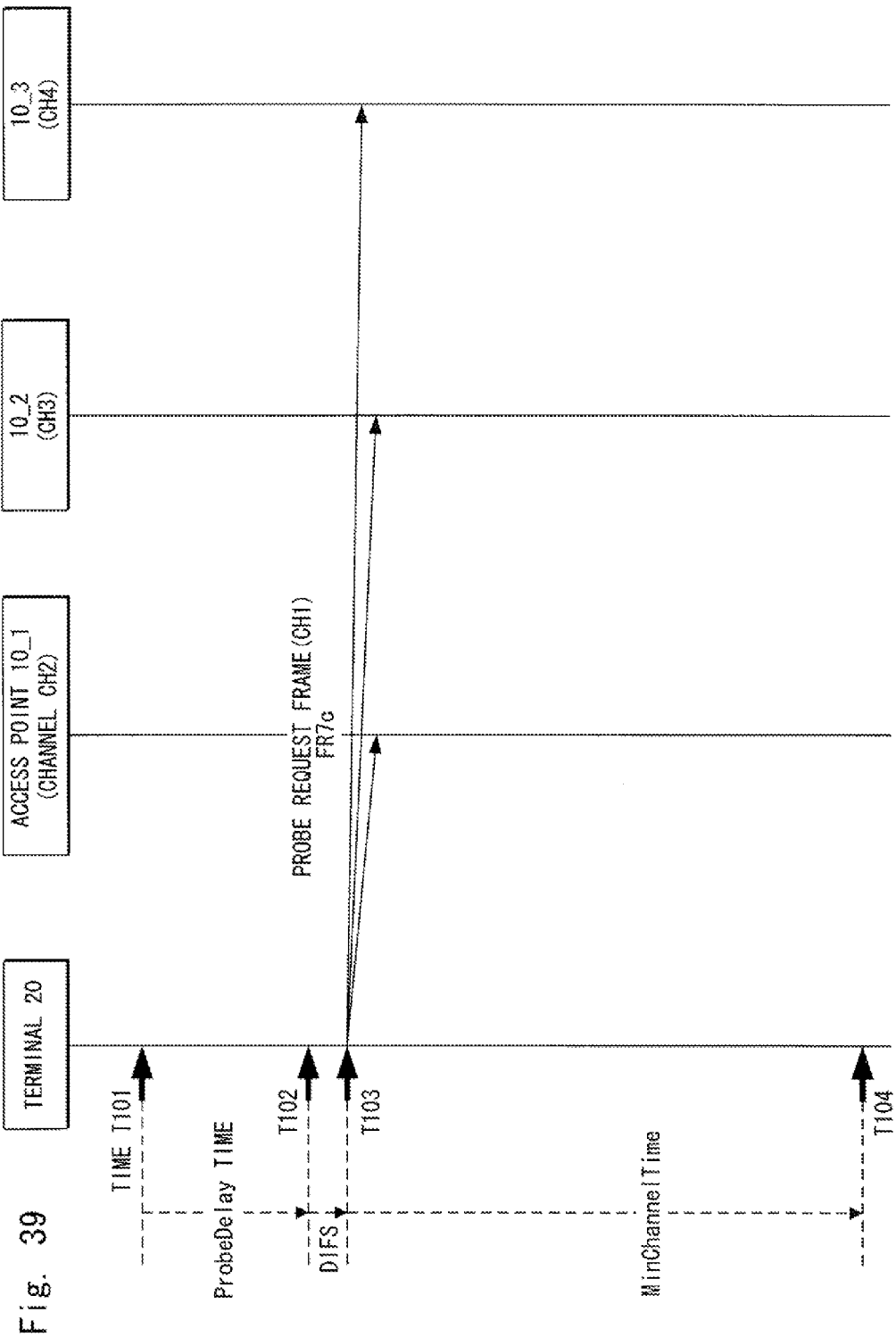
FIG. 39 is a sequence diagram showing one example of active scan operation prescribed by IEEE 802.11 standard.
Figure 40:
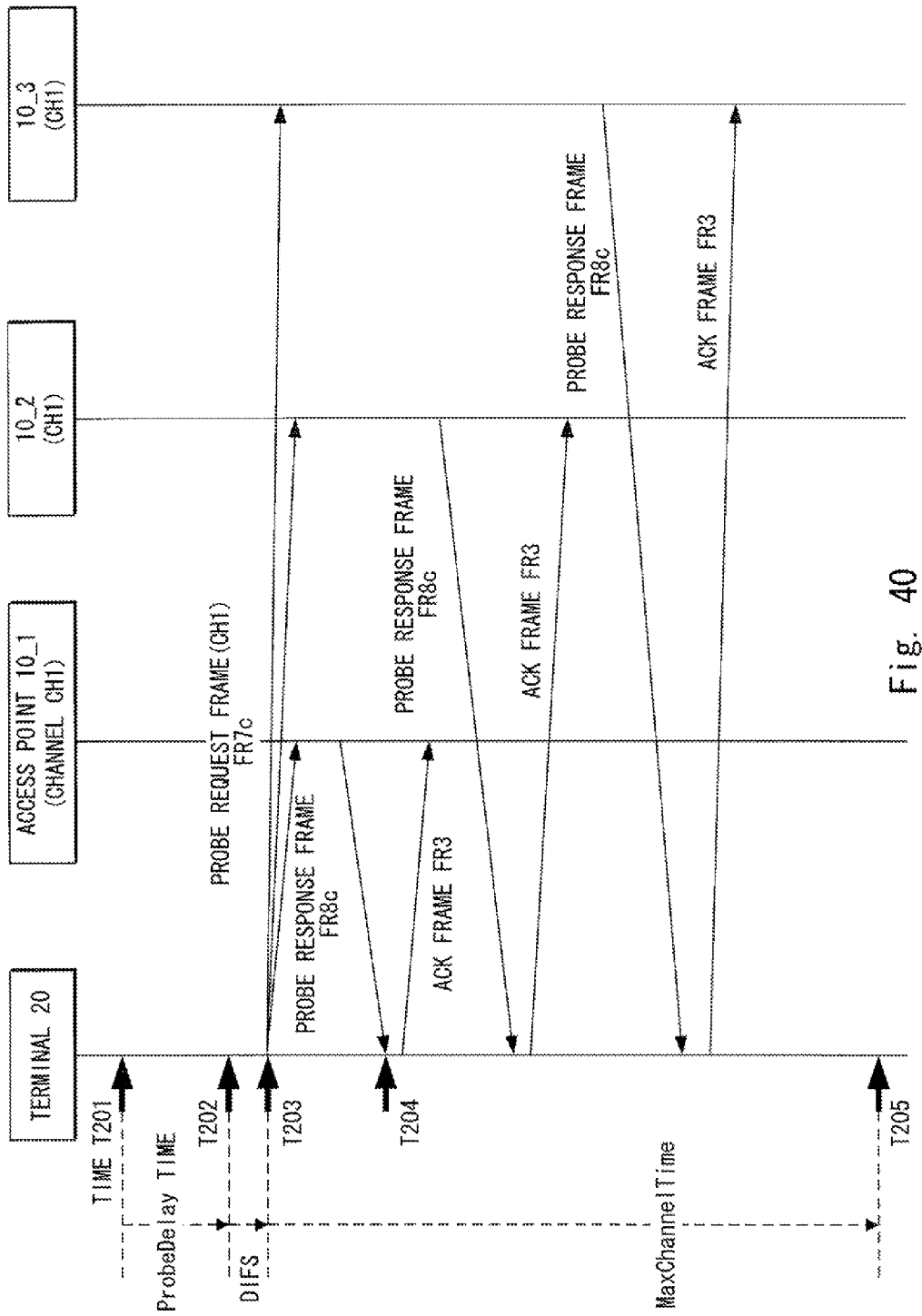
FIG. 40 is a sequence diagram showing another example of the active scan operation prescribed by IEEE 802.11 standard.

In this way, it is possible to keep time during which the terminal is on a radio channel other than the radio channel in use upon performing the active scan to only time required to transmit the probe request frame. Therefore, it is possible to drastically reduce time during which the communication is disrupted, compared to the general active scan method shown in FIGS. 39 and 40. Note that in the subsequent description, the active scan according to the present invention may be referred to as "Fast Active Scan". Further, the access point in use may be referred to as "Current AP".

Hereinafter, more detailed configuration examples and operation examples of the access point 10 and the terminal 20 shown in FIG. 1 will be described.

Figure 2:
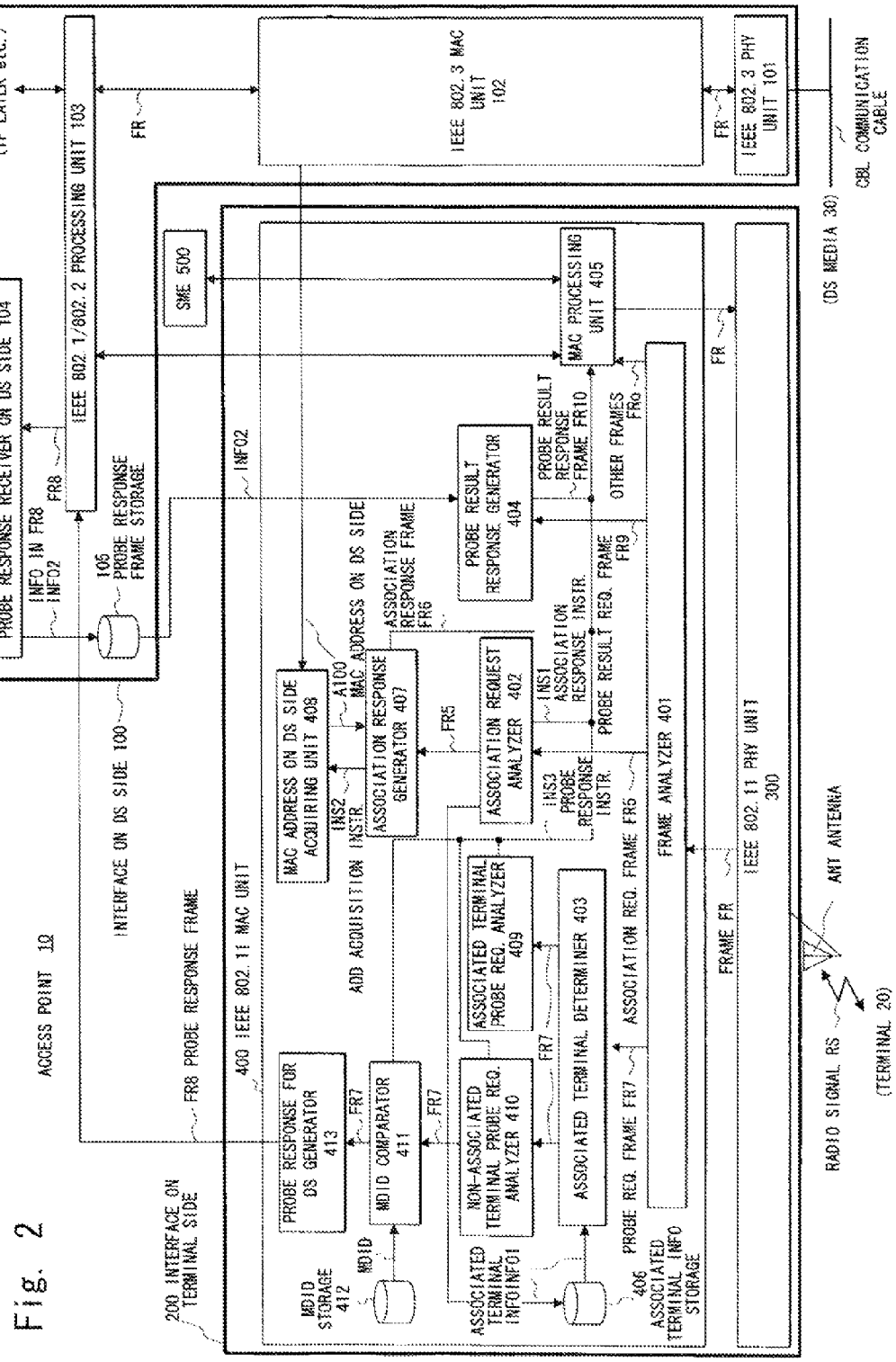
FIG. 2 is a block diagram showing a configuration example in a first exemplary embodiment of the base station according to the present invention.

Firstly, as shown in FIG. 2, the access point 10 includes an interface on DS side 100 which is connected to the DS media 30 through a communication cable CBL, an interface on terminal side 200 which transmits and receives radio signals RS to and from the terminal 20 through an antenna ANT, and an SME (Station Management Entity) 500. The SME 500 executes a process to transmit and receive primitives of MLME(MAC Sublayer Management Entity)-SAP prescribed by IEEE 802.11 standard, thereby controlling IEEE 802.11 MAC protocol so as to properly perform the communication.

Further, the interface on DS side 100 is connected to the communication cable CBL. The interface on DS side 100 includes an IEEE 802.3 PHY unit 101 which executes processes at PHY layer prescribed by IEEE 802.3 standard, an IEEE 802.3 MAC unit 102 which executes processes at MAC layer prescribed by the IEEE 802.3 standard to transmit and receive frames FR to and from the PHY unit 101, an IEEE 802.1/IEEE 802.2 processing unit 103 which executes processes prescribed by IEEE 802.1 and IEEE 802.2 standards to transmit and receive the frames FR to and from the MAC unit 102, a probe response receiver on DS side 104 which extracts information INFO2 (specifically, a MAC address of a destination terminal of the frame FR8, a MAC address on terminal side of a source access point of the frame FR8, and information elements of a probe response frame prescribed by the IEEE 802.11 standard) from the probe response frame FR8 received from the processing unit 103, and a probe response frame storage 105 for storing the information INFO2. Note that the processing unit 103 transfers frames other than the probe response frame FR8 to e.g. IP layer, and thus makes the frames processed.

Further, the interface on terminal side 200 includes, in general, an IEEE 802.11 PHY unit 300 which executes a conversion process between the radio signals RS and the frames FR, and an IEEE 802.11 MAC unit 400 which executes various processes in accordance with types of the frames FR received from the PHY unit 300. MAC unit 400 includes a frame analyzer 401, an association request analyzer 402, an associated terminal determiner 403, a probe result response generator 404, a MAC processing unit 405, an associated terminal information storage 406, an association response generator 407, a MAC address on DS side acquiring unit 408, an associated terminal probe request analyzer 409, a non-associated terminal probe request analyzer 410, an MDID (Mobility Domain IDentifier) comparator 411, an MDID storage 412, and a probe response for DS generator 413.

The above-mentioned MDID is an identifier of a mobility domain to which the access point 10 belongs, and is configured by an administrator of the network 1. The mobility domain means aggregation of access points mutually connected through the DS media 30.

Further, the frame analyzer 401 sorts the frames FR received from the PHY unit 300 based on types thereof. The frame analyzer 401 transfers the probe request frame FR7 to the associated terminal determiner 403, transfers an association request frame FR5 (a frame for the terminal 20 to request start of communication with (connection to) the access point 10) to the association request analyzer 402, transfers a probe result request frame FR9 (a frame for the terminal 20 to request a result of the Fast Active Scan from the access point 10) to the probe result response generator 404, and transfers other frames FRo except the frames FR5, FR7, and FR9 to the MAC processing unit 405.

When the association request analyzer 402 receives the association request frame FR5 (or a reassociation frame used for the terminal 20 to request connection from the access point 10, in a case where the terminal 20 has before connected to ESS (Extend Service Set) to which the access point 10 belongs), the association request analyzer 402 checks whether or not the frame FR5 includes information described below which indicates use/nonuse of the Fast Active Scan function. When the information is included, the association request analyzer 402 registers associated terminal information INFO1 which is composed of the MAC address of the terminal 20 and use/nonuse of the Fast Active Scan function on the associated terminal information storage 406. Further, when the frame FR5 does not include the information that indicates use/nonuse of the Fast Active Scan function, or includes nonuse of the Fast Active Scan function, the association request analyzer 402 issues an association response instruction INS1 to the MAC processing unit 405, thereby instructing the MAC processing unit 405 to transmit to the terminal 20 a normal association response frame (or reassociation response frame) in accordance with the IEEE 802.11 standard. On the other hand, when use of the Fast Active Scan function is included, the association request analyzer 402 transfers the association request frame FR5 (or reassociation frame) to the association response generator 407.

The association response generator 407 issues an address acquisition instruction INS2 to the MAC address on DS side acquiring unit 408, thereby acquiring the MAC address on DS side A100 of the access point 10 for being notified to the terminal 20. Further, the association response generator 407 generates an association response frame FR6 including the MAC address on DS side A100 to be output to the MAC processing unit 405, thereby making the MAC processing unit 405 transmit the association response frame FR6 to the terminal 20.

The MAC address on DS side acquiring unit 408 acquires from the IEEE 802.3 MAC unit 102 the MAC address on DS side A100 to be output to the association response generator 407, upon receiving the address acquisition instruction INS2.

The associated terminal determiner 403 refers to the associated terminal information INFO1 in the associated terminal information storage 406 to determine whether or not the terminal 20 is a terminal associated with the access point 10 (hereinafter, referred to as associated terminal). The associated terminal determiner 403 transfers the probe request frame FR7 to the associated terminal probe request analyzer 409 when the terminal 20 is the associated terminal, and transfers the probe request frame FR7 to the non-associated terminal probe request analyzer 410 when the terminal 20 is not the associated terminal.

The associated terminal probe request analyzer 409 checks whether or not the probe request frame FR7 includes the MDID and the MAC address on DS side A100. As described below, when the MDID and the MAC address on DS side A 100 are included, it means that the terminal 20 uses the Fast Active Scan function. When the MDID and the MAC address on DS side A100 are not included, it means that the terminal 20 does not use the Fast Active Scan function. Accordingly, when the MDID and the MAC address on DS side A100 are included, the associated terminal probe request analyzer 409 waits for the probe result request frame FR9 to be received from the terminal 20. On the other hand, when the MDID and the MAC address on DS side A 100 are not included, the associated terminal probe request analyzer 409 issues a probe response instruction INS3 to the MAC processing unit 405, thereby making the MAC processing unit 405 generate a probe response frame described below to be transmitted to the terminal 20.

The non-associated terminal probe request analyzer 410 checks whether or not the probe request frame FR7 includes the MDID and the MAC address on DS side A 100. When the MDID and the MAC address on DS side A100 are included, the non-associated terminal probe request analyzer 410 transfers the probe request frame FR7 to the MDID comparator 411. On the other hand, when the MDID and the MAC address on DS side A100 are not included, the non-associated terminal probe request analyzer 410 issues the probe response instruction INS3 to the MAC processing unit 405.

The MDID comparator 411 compares the MDID included in the probe request frame FR7 with an MDID stored in the MDID storage 412. It is ensured that access points, of which MDIDs coincide with each other (in other word, which belong to the same mobility domain), are in relation of mutually reachable through the DS media 30. Accordingly, the coincidence of the MDIDs means that the access point with which the terminal 20 is associated and the access point which has received the probe request frame FR7 are mutually connected through the DS media 30. When the MDIDs coincide, the MOLD comparator 411 transfers the probe request frame FR7 to the probe response for DS generator 413 in order to return the probe response frame FR8 through the DS media 30. On the other hand, when the MDIDs do not coincide, the MDID comparator 411 issues the probe response instruction INS3 to the MAC processing unit 405.

The probe response for DS generator 413 generates the probe response frame FR8 to be output to the IEEE 802.1/IEEE 802.2 processing unit 103, thereby making the IEEE 802.1/IEEE 802.2 processing unit 103 transmit the probe response frame FR8 to the DS media 30.

The probe result response generator 404 extracts the information INFO2 corresponding to the terminal 20 from the probe response frame storage 105 to generate a probe result response frame FR 10 upon receiving the probe result request frame FR9, and outputs the probe result response frame FR10 to the MAC processing unit 405, thereby making the MAC processing unit 405 transmit the probe result response frame FR10 to the terminal 20.

The MAC processing unit 405 executes a process upon receiving other frames FRo which are not directly related to the present invention, a process upon receiving the primitives from the SME 500, a process to transmit MAC frames generated by a different processing unit, and a process to transmit frames requested from the different processing unit, in accordance with the IEEE 802.11 standard.

Figure 3:
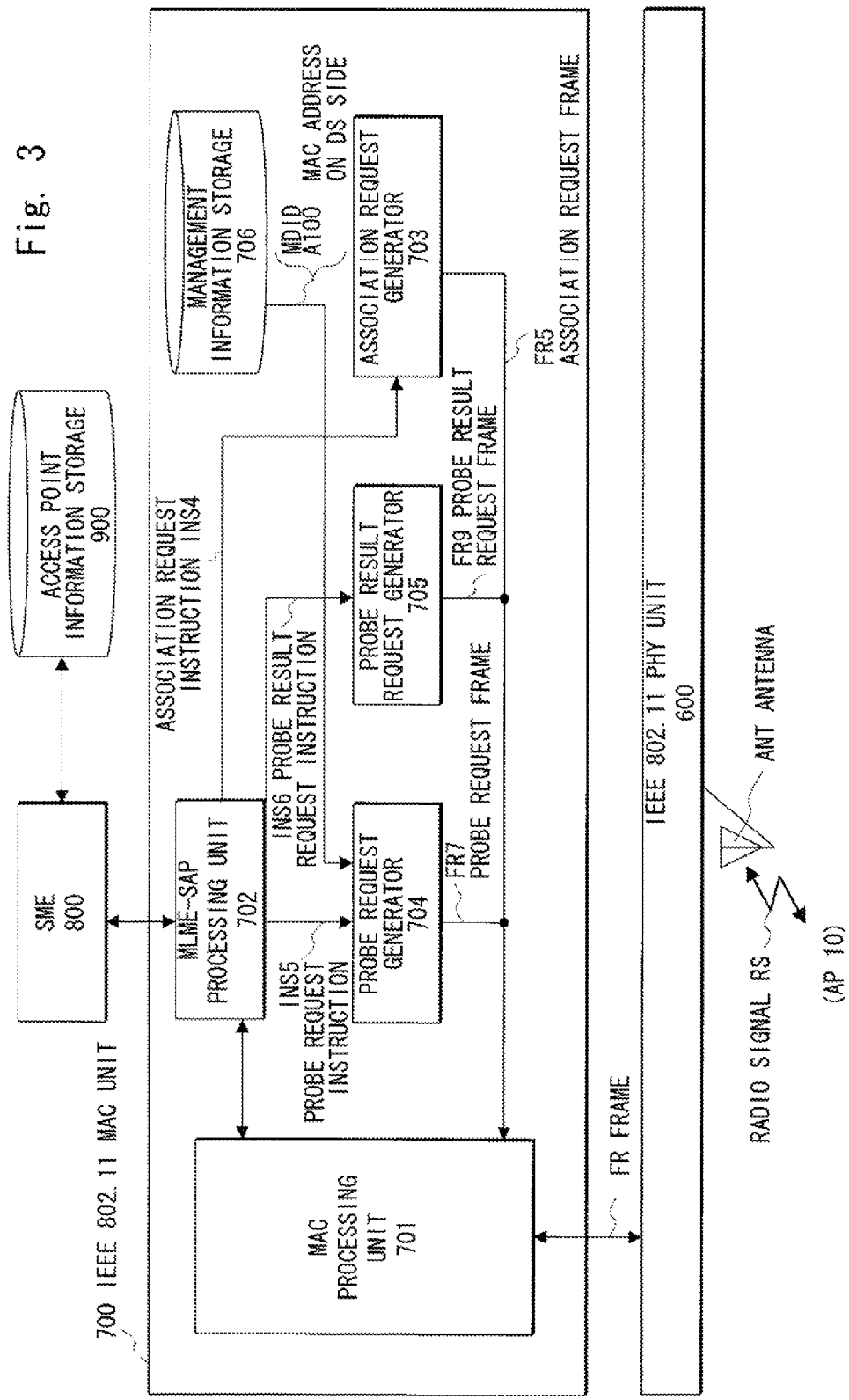
FIG. 3 is a block diagram showing a configuration example in the first exemplary embodiment of the terminal according to the present invention.

Next, as shown in FIG. 3, the terminal 20 includes an IEEE 802.11 PHY unit 600 which transmits and receives the radio signals RS to and from the access point 10 through an antenna ANT, and executes a conversion process between the radio signals RS and the frames FR, an IEEE 802.11 MAC unit 700 which transmits and receives the frames FR to and from the PHY unit 600, an SME 800 which issues instructions to the MAC unit 700 to perform the scan and to be associated with an access point selected based on a result of the scan in order that the terminal 20 may perform desired communication, and an access point information storage 900 which stores information of the access point acquired as the result of the scan. The access point information storage 900 stores therein information on a MAC address (BSSID), a radio channel to be used, and availability of the Fast Active Scan function in the access point detected by the scan.

Further, the IEEE 802.11 MAC unit 700 includes a MAC processing unit 701, an MLME-SAP processing unit 702, an association request generator 703, a probe request generator 704, a probe result request generator 705, and a management information storage 706. The management information storage 706 stores therein the MAC address on DS side A 100 and the MDID of the Current AP.

The MLME-SAP processing unit 702 executes a process corresponding to a primitive received from the SME 800, and notifies the SME 800 of a result of the process. When transmission of the association request frame FR5 is requested by the SME 800, the processing unit 702 issues an association request instruction INS4 to the association request generator 703, thereby making the association request generator 703 generate the association request frame FR5. When transmission of the probe request frame FR7 is requested, the processing unit 702 issues a probe request instruction INS5 to the probe request generator 704, thereby making the probe request generator 704 generate the probe request frame FR7. When transmission of the probe result request frame FR9 is requested, the processing unit 702 issues a probe result request instruction INS6 to the probe result request generator 705, thereby making the probe result request generator 705 generate the probe result request frame FR9. Note that in a case of not using the Fast Active Scan function, the processing unit 702 instructs the MAC processing unit 701 to generate and transmit normal association request frame and probe request frame prescribed by the IEEE 802.11 standard.

Further, the association request frame FR5, the probe request frame FR7, and the probe result request frame FR9 are transmitted by the MAC processing unit 701 to the access point 10.

Hereinafter, operation of the access point 10 shown in FIG. 2 and the terminal 20 shown in FIG. 3 will be described. Firstly, an operation example (1) until the terminal 20 completes connection to the Current AP (receives the association response frame FR6) is described with reference to FIGS. 4, 5A to 5C, 6 to 8, 9A to 9C, 10 to 12, 13A to 13C, and 14. Then, an operation example (2) until the terminal 20 acquires the result of the scan (receives the probe result response frame FR 10) is described with reference to FIGS. 15 to 17, 18A to 18C, 19 to 22, 23A to 23C, 24 to 26, 27A to 27C, 28A to 28C, 29, and 30.

OPERATION EXAMPLE (1)

Figure 4:
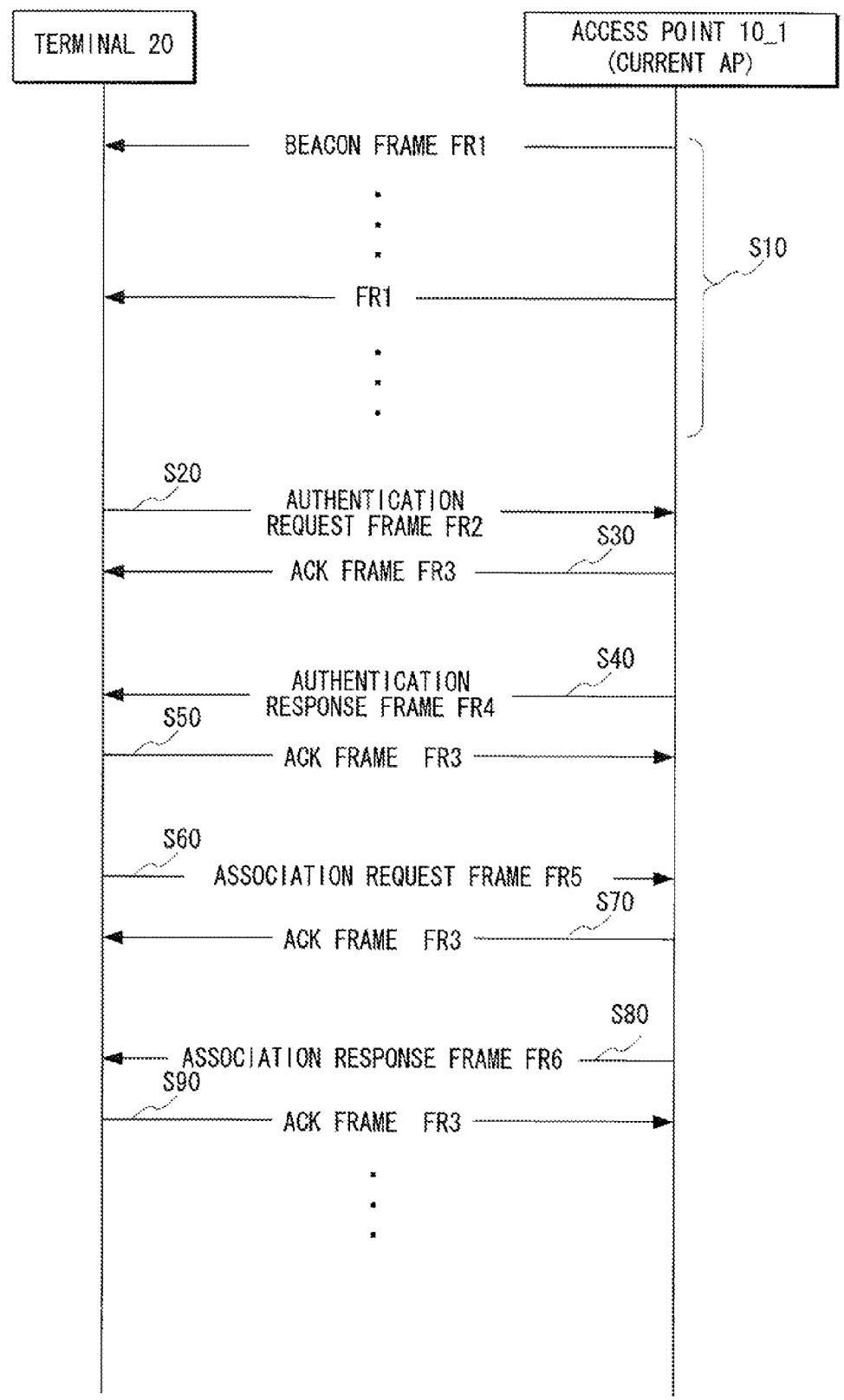
FIG. 4 is a sequence diagram showing an interoperation example (1) in the first exemplary embodiment of the base station and the terminal according to the present invention.

FIG. 4 shows interoperation between the terminal 20 and the access point 10_1 in a case where the terminal 20 selects the access point 10_1 as the Current AP.

Firstly, the access point 10_1 periodically transmits a beacon frame FR1 (Step S10).

Figure 5B:
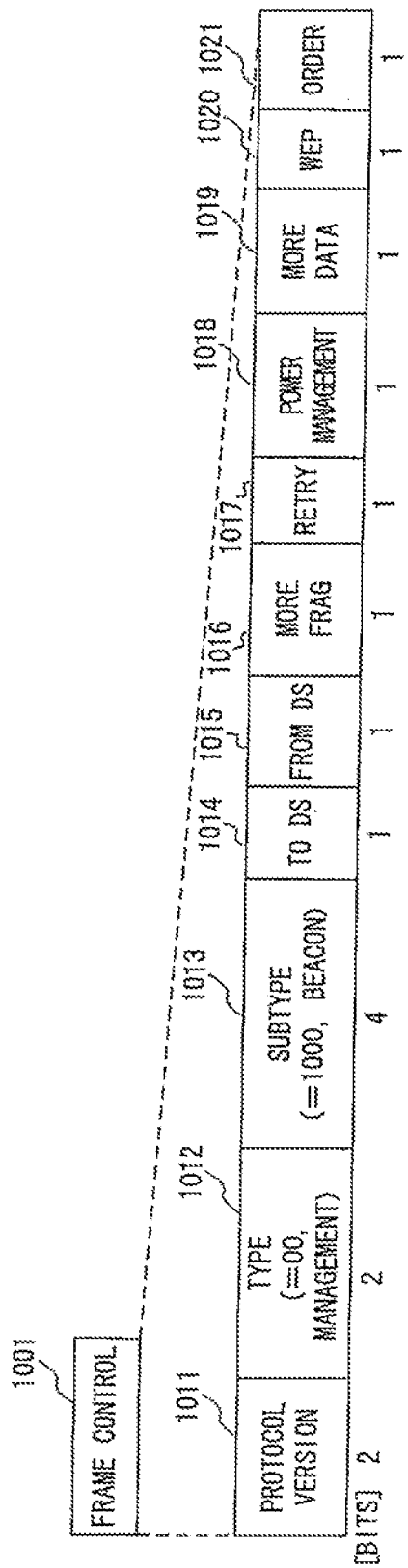
FIG. 5B is a diagram showing a configuration example of a Frame Control field in the beacon frame used in the first exemplary embodiment of the base station according to the present invention.
Figure 5C:
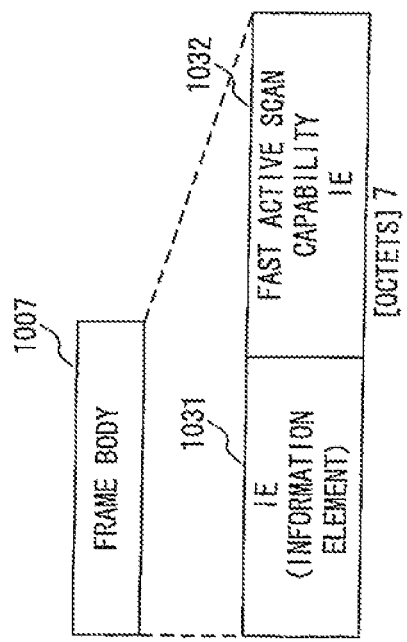
FIG. 5C is a diagram showing a configuration example of a Frame Body field in the beacon frame used in the first exemplary embodiment of the base station according to the present invention.

A configuration example of the beacon frame FR1 is shown in FIGS. 5A to 5C. As shown in FIG. 5A, the beacon frame FR1 has a format of a general Management frame prescribed by the IEEE 802.11 standard, and is composed of a Frame Control field 1001, a Duration field 1002, a DA (Destination Address) field 1003, an SA (Source Address) field 1004, a BSSID field 1005, a Sequence Control field 1006, a Frame Body field 1007, and an FCS (Frame Check Sequence) field 1008.

As shown in FIG. 5B, the Frame Control field 1001 is composed of a Protocol Version field 1011, a Type field 1012, a Subtype field 1013, a ToDS field 1014, a FromDS field 1015, a More Frag field 1016, a Retry field 1017, a Power Management field 1018, a More Data field 1019, a WEP (Wired Equivalent Privacy) field 1020, and an Order field 1021. The Protocol Version field 1011 is set to binary digits "00" which indicate a version of a MAC protocol in IEEE 802.11. The Type field 1012 is set to binary digits "00" which indicate the Management frame. The Subtype field 1013 is set to binary digits "1000" which indicate the beacon frame. Assume that the other fields 1014 to 1021 are set to appropriate values in accordance with the IEEE 802.11 standard.

Further, the Duration field 1002 is set to a NAV (Network Allocation Vector) value for inhibiting another terminal from transmitting.

The DA field 1003 is set to a broadcast address in a case of the beacon frame. Each of the SA field 1004 and the BSSID field 1005 is set to a MAC address on terminal side of the access point 10_1.

The Sequence Control field 1006 is set to a Fragment Number and a Sequence Number.

The FCS field 1008 is set to an error-detecting code for the information from the Frame Control field 1001 to the Frame Body field 1007.

Furthermore, as shown in FIG. 5C, the Frame Body field 1007 is composed of an IE (Information Element) field 1031 in which information elements of the beacon frame prescribed by the IEEE 802.11 standard are set, and a Fast Active Scan Capability IE field 1032 which includes availability of the Fast Active Scan function in the access point 10_1.

Figure 6:
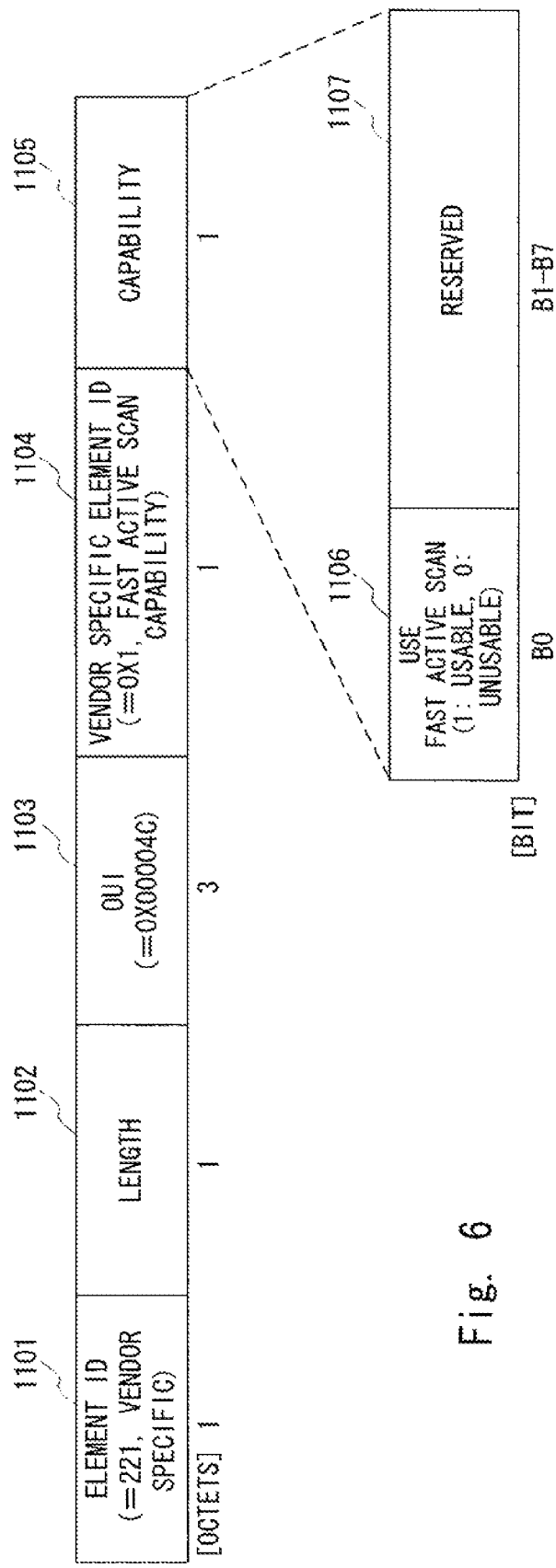
FIG. 6 is a diagram showing a configuration example of a Fast Active Scan Capability IE used in the first exemplary embodiment of the base station according to the present invention.

As shown in FIG. 6, the field 1032 is composed of an Element ID field 1101 in which a value (e.g. "221") specific to a vendor is set, a Length field 1102, an OUI field 1103 in which a vendor identifier (e.g. "0×00004c") is set, a Vendor Specific Element ID field 1104 in which a value (e.g. "0×1") indicating the Fast Active Scan Capability IE is set, and a Capability field 1105. Note that the Length field 1102 is set to the total length of the fields 1103 to 1105.

Further, the Capability field 1105 is composed of a Use Fast Active Scan field 1106 and a Reserved field 1107. The Use Fast Active Scan field 1106 is set to the availability of the Fast Active Scan function (1: usable, 0: unusable). The Reserved field 1107 is an unused and reserved area. Assume that the terminal 20 ignores a value set in this area.

The terminal 20, which has received the above-mentioned beacon frame FRI, checks whether or not the frame FRI includes the Fast Active Scan Capability IE field 1032. When the field 1032 is not included or when the Use Fast Active Scan field 1106 is set to "0 (unusable)", the terminal 20 determines that the access point 10_1 does not support the Fast Active Scan function, and thus performs only a normal active scan prescribed by the IEEE 802.11 standard upon performing the active scan. On the other hand, when the Use Fast Active Scan field 1106 is set to "1 (usable)", the terminal 20 determines that the access point 10_1 supports the Fast Active Scan function, and thus performs the Fast Active Scan as needed. Specifically, the Fast Active Scan is performed, when there is no problem with a scan range being made access points within the same mobility domain. Otherwise, the normal active scan is performed.

The terminal 20 registers the availability of the Fast Active Scan function on the access point information storage 900. Note that as described below, a probe response frame which is directly transmitted from the access point 10 to the terminal 20 also includes the Fast Active Scan Capability IE field 1032.

Return to FIG. 4, when the terminal 20 decides to be associated with the access point 10_1 (selects the access point 10_1 as the Current AP), the terminal 20 firstly transmits an authentication request frame FR2 to the access point 10_1 (Step S20). The access point 10_1, which has received this frame, returns an acknowledgement (Ack) frame FR3 in response to the authentication request frame FR2 (Step S30), and then transmits an authentication response frame FR4 to the terminal 20 (Step S40). Note that each of the frames FR2, FR3, and FR4 may have a general format prescribed by the IEEE 802.11 standard, and thus the illustration and description thereof are omitted.

Then, the terminal 20, which has received the authentication response frame FR4, returns an Ack frame FR3 (Step S50), and then transmits to the access point 10_1 the association request frame FR5 in which use of the Fast Active Scan is set (Step S60).

Operation at this time of the IEEE 802.11 MAC unit 700 and the SME 800 in the terminal 20 will be described in detail with reference to FIGS. 7, 8, and 9A to 9C.

Figure 7:
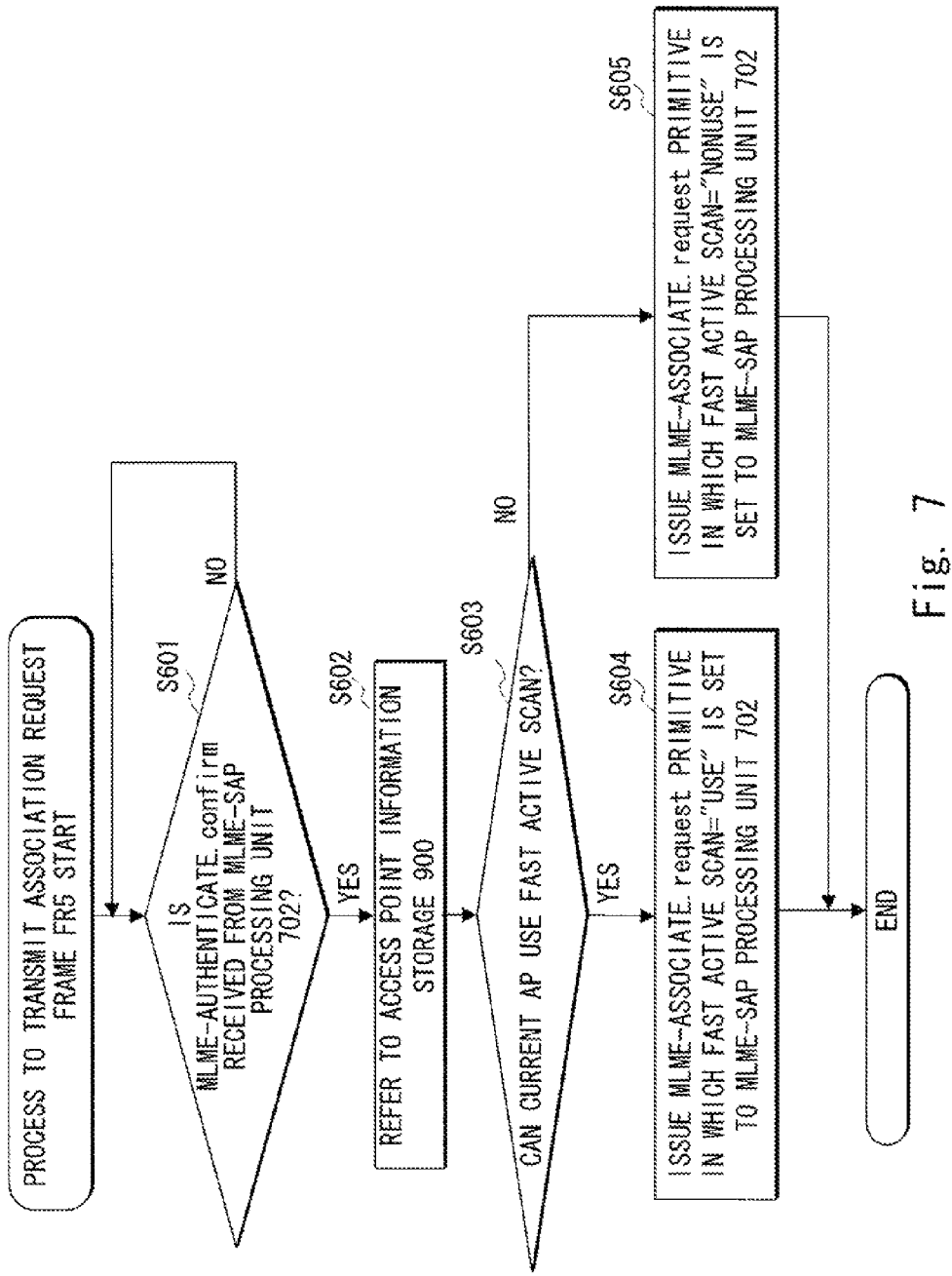
FIG. 7 is a flowchart showing an example of a process to transmit an association request frame in an SME used in the first exemplary embodiment of the terminal according to the present invention.

FIG. 7 is a flowchart showing an operation example of the SME 800. As shown in FIG. 7, the SME 800 firstly determines whether or not it has received from the MLME-SAP processing unit 702 an MLME-AUTHENTICATION.confirm that is the response to a primitive for requesting to transmit the authentication request frame FR2, which is issued to the MLME-SAP processing unit 702 by the SME 800 (Step S601). When the MLME-AUTHENTICATION.confirm is received, the SME 800 refers to the access point information storage 900 (Step S602), and thereby determines whether or not the Current AP (access point 10_1) supports the Fast Active Scan function (in other words, whether or not the terminal 20 can use the Fast Active Scan function) (Step S603).

As a result, when it is determined that the Fast Active Scan function can be used, the SME 800 issues to the MLME-SAP processing unit 702 an MLME-ASSOCIATE.request primitive in which a parameter indicating use of the Fast Active Scan is set (Step S604). On the other hand, when it is determined that the Fast Active Scan function cannot be used, the SME 800 issues to the MLME-SAP processing unit 702 an MLME-ASSOCIATE.request primitive in which a parameter indicating nonuse of the Fast Active Scan is set (Step S605).

Figure 8:
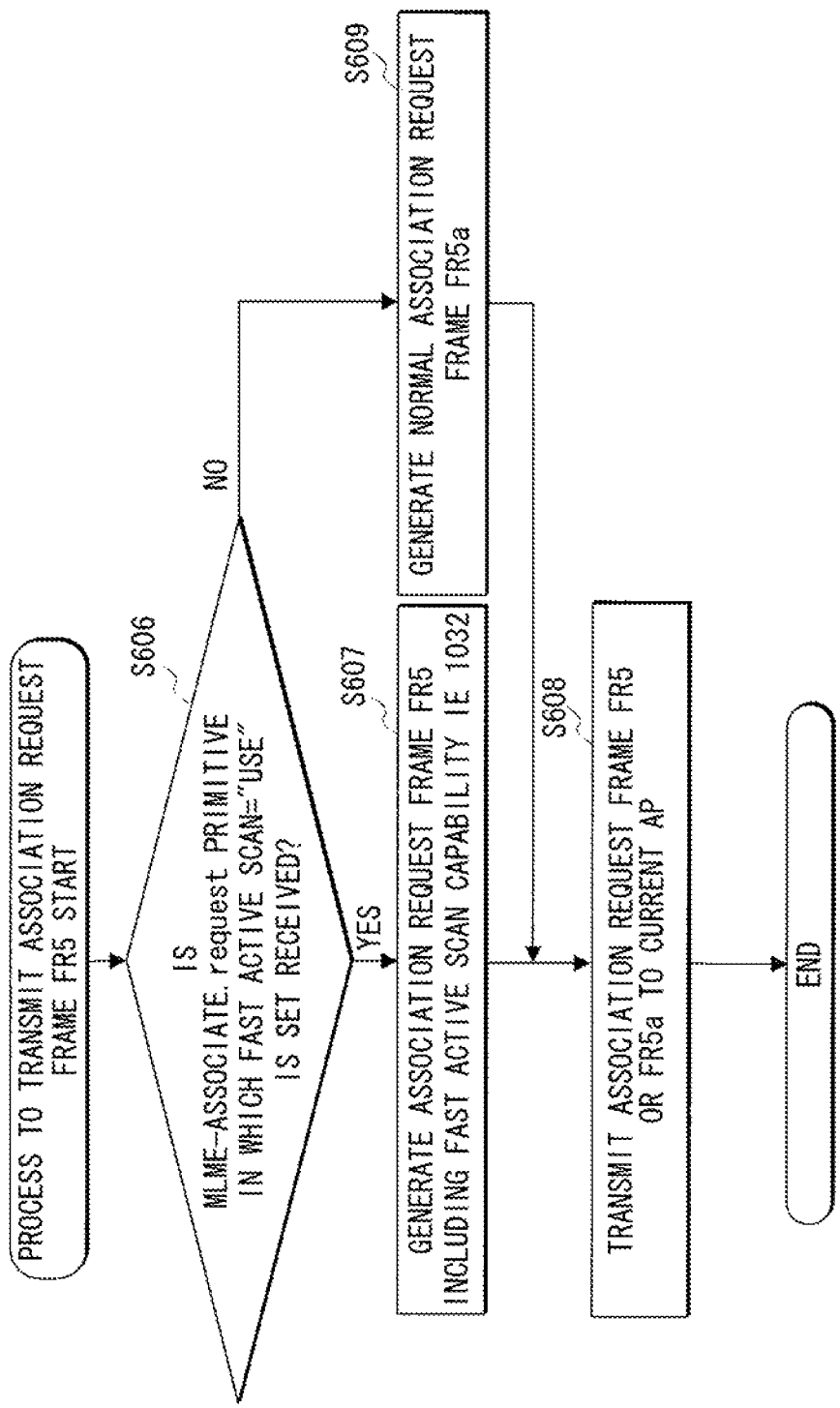
FIG. 8 is a flowchart showing an example of a process to transmit the association request frame in an IEEE 802.11 MAC unit used in the first exemplary embodiment of the terminal according to the present invention.

FIG. 8 is a flowchart showing an operation example of the IEEE 802.11 MAC unit 700. As shown in FIG. 8, the MLME-SAP processing unit 702 determines whether or not it has received the MLME-ASSOCIATE.request primitive in which the Fast Active Scan="use" is set (Step S606). When the Fast Active Scan="use" is set, the MLME-SAP processing unit 702 issues the association request instruction INS4 to the association request generator 703. The association request generator 703, which has received the instruction INS4, generates the association request frame FR5 which includes the Fast Active Scan Capability 1032 as shown in FIGS. 9A to 9C, and in which the Use Fast Active Scan field 1106 (see FIG. 6) is set to "1" (Step S607).

Figure 9A:
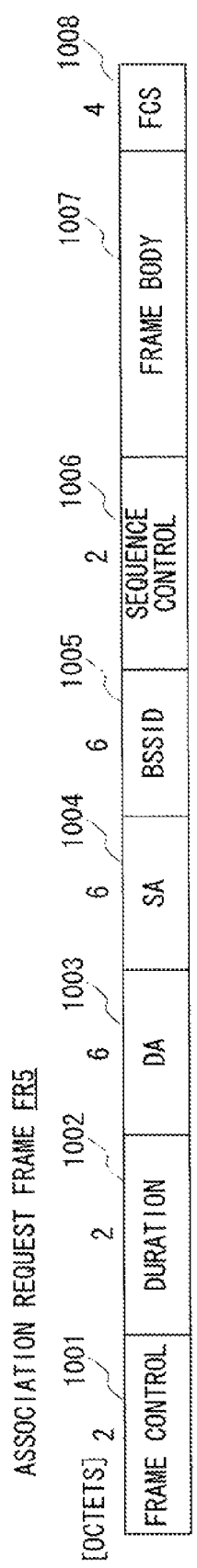
FIG. 9A is a diagram showing a configuration example of the association request frame used in the first exemplary embodiment of the terminal according to the present invention.

As shown in FIG. 9A, the association request frame FR5 has a format of the general Management frame prescribed by the IEEE 802.11 standard. Meanwhile, as shown in FIG. 9B, the Subtype field 1013 is set to binary digits "0000" which indicate the association request frame. Note that in a case of a reassociation request frame, the field 1013 is set to binary digits "0010".

Each of the DA field 1003 and the BSSID field 1005 is set to the MAC address on terminal side of the access point 10_1, and the SA field 1004 is set to the MAC address of the terminal 20.

Figures 9B, 9C:
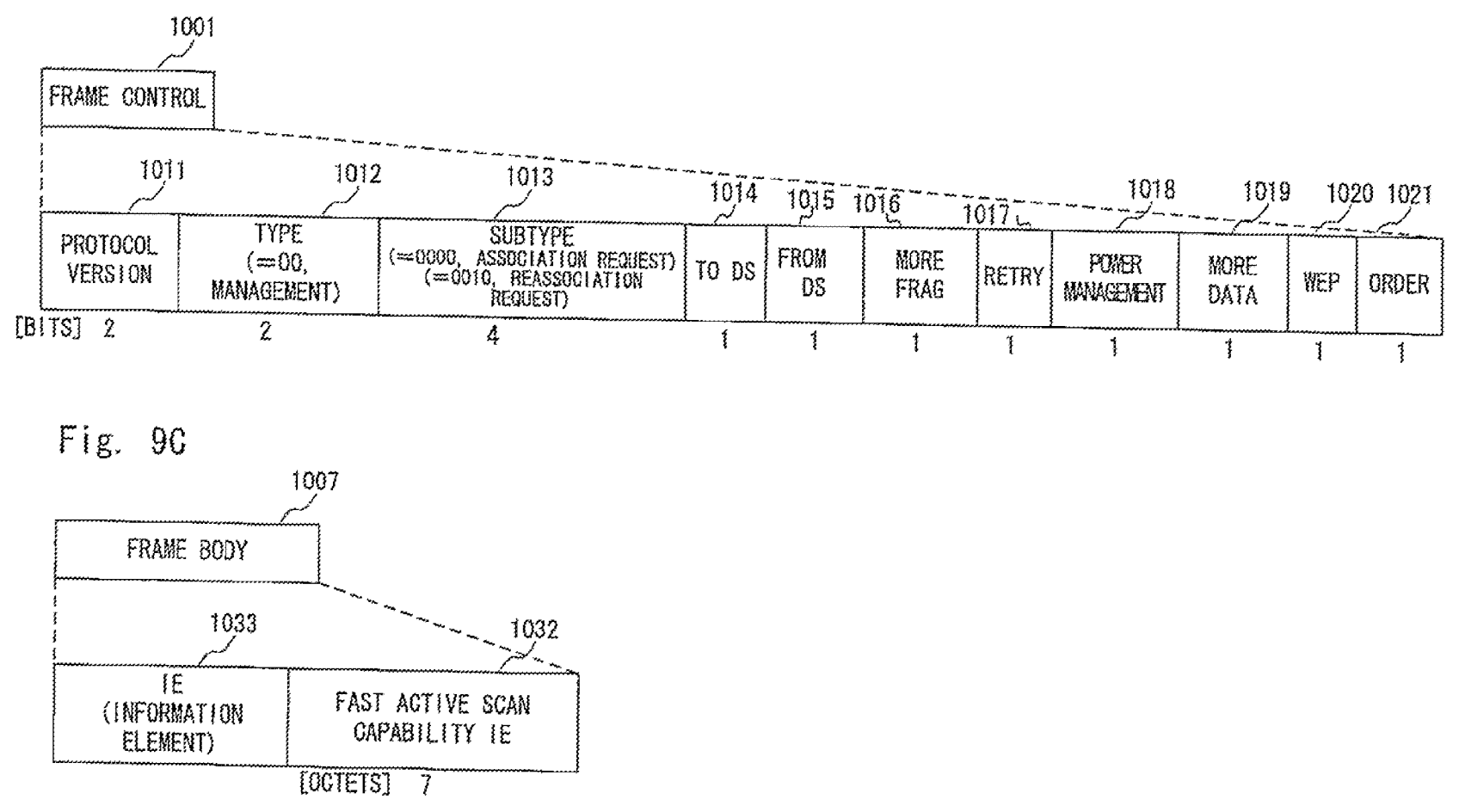

Further, as shown in FIG. 9C, the Frame Body field 1007 is composed of an IE field 1033 in which information elements of the association request frame prescribed by the IEEE 802.11 standard are set, and the Fast Active Scan Capability IE field 1032.

Then, the association request generator 703 outputs the generated association request frame FR5 to the MAC processing unit 701, thereby making the MAC processing unit 701 transmit the association request frame FR5 to the access point 10_1 (Step S608).

When the Fast Active Scan="nonuse" is set at the above-mentioned Step S606, the MLME-SAP processing unit 702 instructs the MAC processing unit 701 to generate and transmit a normal association request frame FR5a prescribed by the IEEE 802.11 standard (Steps S609 and S608).

Return to FIG. 4, the access point 10_1, which has received the association request frame FR5, returns an Ack frame FR3 (Step S70), and then transmits the association response frame FR6 to the terminal 20 (Step S80).

Operation at this time of the access point 10_1 will be described in detail with reference to FIGS. 10 to 14.

Figure 10:
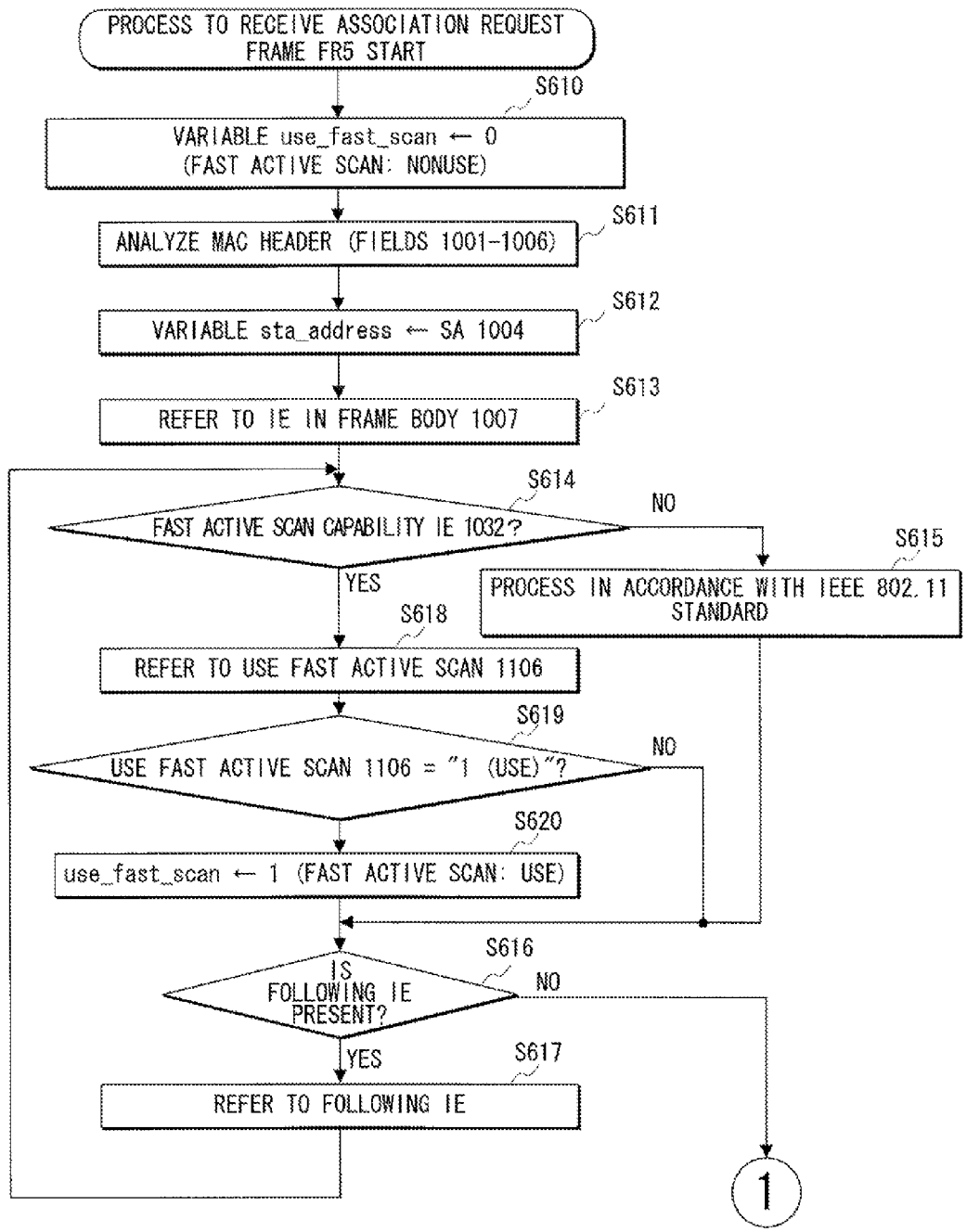
FIG. 10 is a flowchart showing a part of an example of a process to receive the association request frame in the first exemplary embodiment of the base station according to the present invention.
Figure 11:
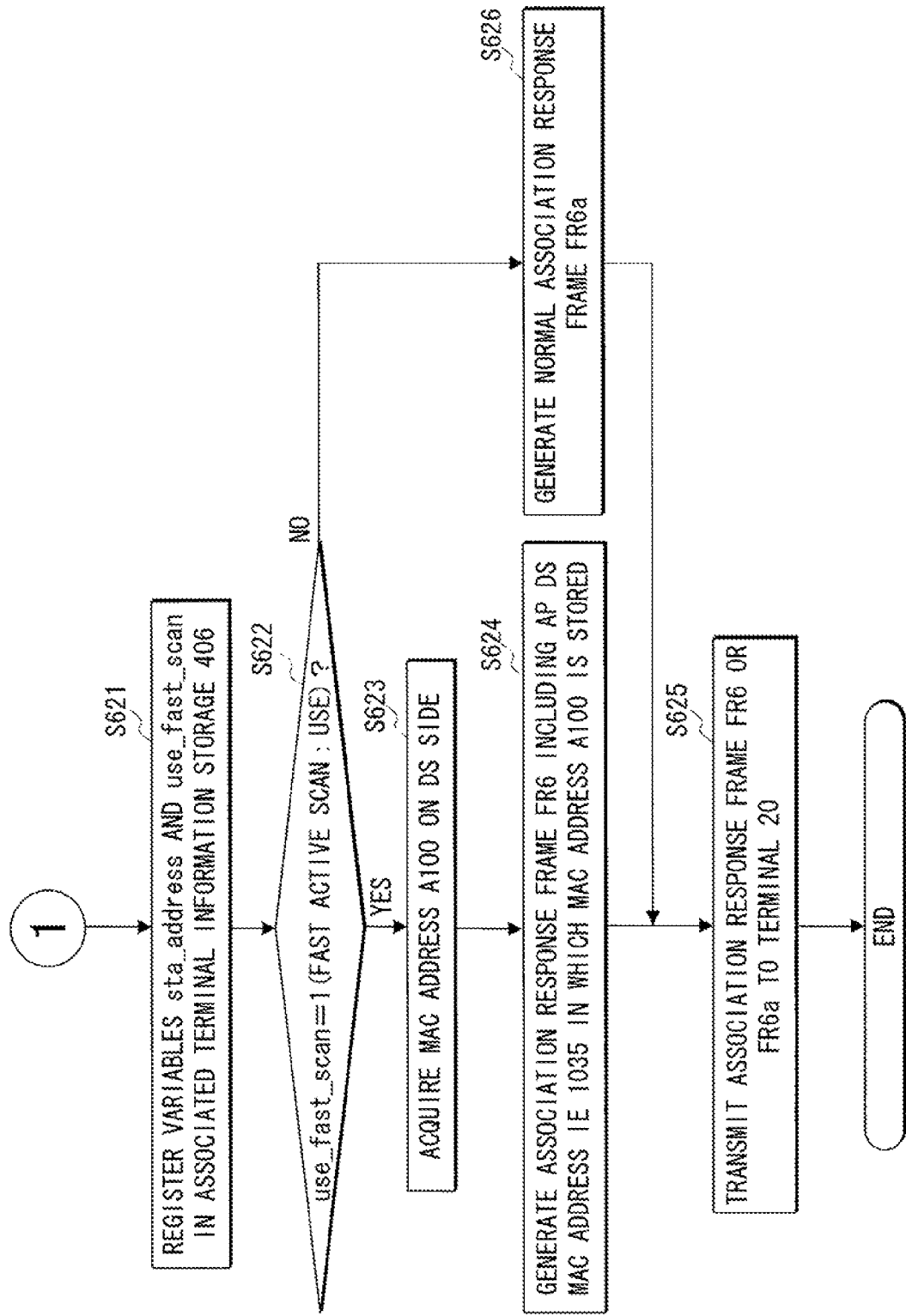
FIG. 11 is a flowchart showing the rest of the example of the process to receive the association request frame in the first exemplary embodiment of the base station according to the present invention.

As shown in FIG. 10, the association request analyzer 402 in the access point 10_1 firstly initializes a variable use_fast_scan which indicates whether or not the terminal 20 uses the Fast Active Scan to "0 (nonuse)" (Step S610). Then, the association request analyzer 402 analyzes a MAC header (the fields 1001 to 1006 shown in FIG. 9A) in the association request frame FR5 (Step S611). At this time, the association request analyzer 402 assigns the MAC address of the terminal 20 which is set in the SA field 1004 within the MAC header to a variable sta_address (Step S612).

Then, the association request analyzer 402 refers to information elements in the Frame Body 1007 from the lead one (Step S613). The association request analyzer 402 determines whether or not the referred information element is the Fast Active Scan Capability IE 1032 (Step S614). The lead one in the Frame Body 1007 is the IE 1033. Therefore, the association request analyzer 402 determines that the lead one is not the Fast Active Scan Capability IE 1032, and processes the IE 1033 in accordance with the IEEE 802.11 standard (Step S615).

Then, the association request analyzer 402 determines whether or not there exists the following information element to be processed (Step S616). There exists the Fast Active Scan Capability IE 1032 following the IE 1033 in the Frame Body 1007. Therefore, the association request analyzer 402 refers to the following IE 1032 (Step S617). After passing through the above-mentioned Step S614, the association request analyzer 402 refers to the Use Fast Active Scan field 1106 in the Capability field 1105 (see FIG. 6) (Step S618), and determines whether or not the field 1106 is set to "1 (use of Fast Active Scan)" (Step S619).

As a result, when the Use Fast Active Scan field 1106="1" is met, the association request analyzer 402 sets the variable use_fast_scan to "1" indicating use of the Fast Active Scan (Step S620). Note that when the Use Fast Active Scan field 1106="0" is met, the variable use_fast_scan="0" is held.

Then, the association request analyzer 402 again moves to the above-mentioned Step S616. However, there exists no following information element in the Frame Body 1007. Therefore, the association request analyzer 402 moves to Step S621 shown in FIG. 11, and thus stores contents of the variables sta_address and use_fast_scan in the associated terminal information storage 406. In this way, as shown in FIG. 12, the associated terminal information storage 406 stores therein the MAC address of the associated terminal in association with the availability of the Fast Active Scan.

Further, the association request analyzer 402 determines whether or not the variable use_fast_scan="1" is met (Step S622). When the variable use_fast_scan="1" is met, the association request analyzer 402 transfers the association request frame FR5 to the association response generator 407. The association response generator 407 issues the address acquisition instruction INS2 to the MAC address on DS side acquiring unit 408, thereby making the MAC address on DS side acquiring unit 408 acquire the MAC address on DS side A100 held by the IEEE 802.3 MAC unit 102 (Step S623). The association response generator 407 generates the association response frame FR6 including the acquired MAC address on DS side A100 (Step S624).

Figure 13A:
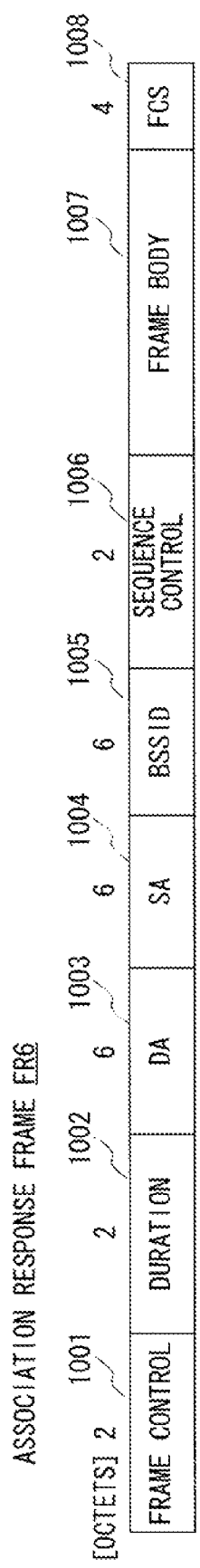
FIG. 13A is a diagram showing a configuration example of an association response frame used in the first exemplary embodiment of the base station according to the present invention.
Figure 13B:
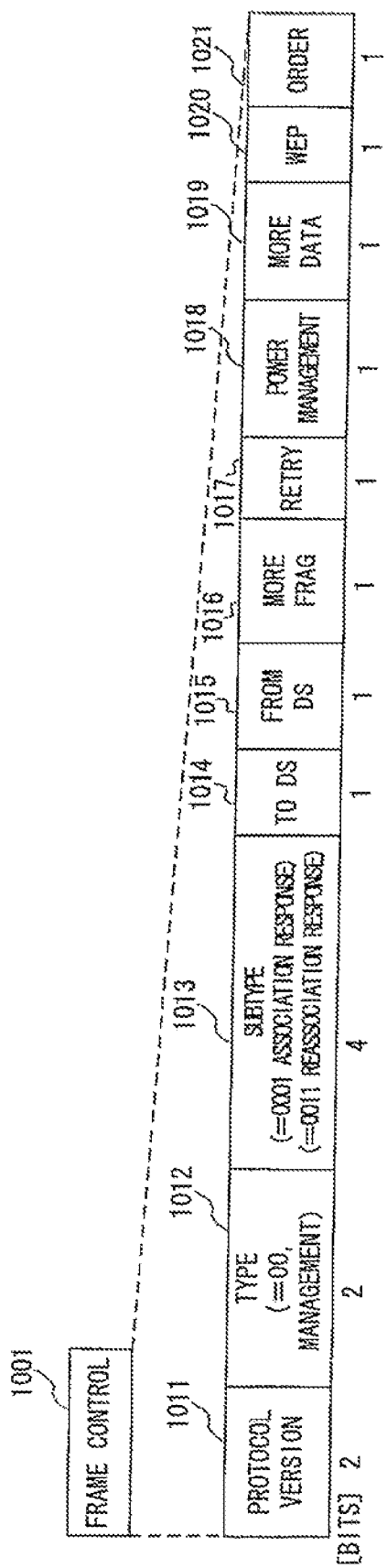
FIG. 13B is a diagram showing a configuration example of a Frame Control field in the association response frame used in the first exemplary embodiment of the base station according to the present invention.

As shown in FIG. 13A, the association response frame FR6 has a format of the general Management frame prescribed by the IEEE 802.11 standard. Meanwhile, as shown in FIG. 13B, the Subtype field 1013 is set to binary digits "0001" which indicate the association response frame. Note that in a case of a reassociation response frame, the field 1013 is set to binary digits "0011".

The DA field 1003 is set to the MAC address of the terminal 20, and each of the SA field 1004 and the BSSID field 1005 is set to the MAC address on terminal side of the access point 10_1.

Figure 13C:
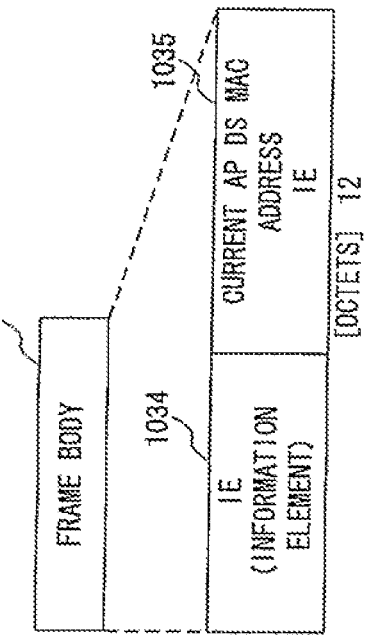
FIG. 13C is a diagram showing a configuration example of a Frame Body field in the association response frame used in the first exemplary embodiment of the base station according to the present invention.

Further, as shown in FIG. 13C, the Frame Body field 1007 is composed of an IE field 1034 in which information elements of the association response frame prescribed by the IEEE 802.11 standard are set, and a Current AP DS MAC Address IE field 1035.

Figure 14:
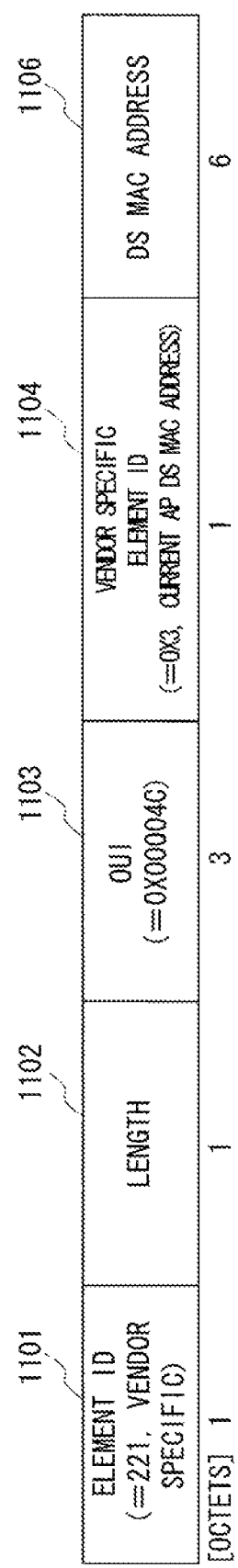
FIG. 14 is a diagram showing a configuration example of a Current AP DS MAC Address IE used in the first exemplary embodiment of the base station according to the present invention.

As shown in FIG. 14, the field 1035 is composed of the Element ID field 1101 in which the value (e.g. "221") specific to the vendor is set, the Length field 1102, the OUI field 1103 in which the vendor identifier (e.g. "0x00004c") is set, the Vendor Specific Element ID field 1104 in which a value (e.g. "0x3") indicating the Current AP DS MAC Address IE is set, and a DS MAC Address field 1106. Note that the Length field 1102 is set to the total length of the fields 1103 to 1106.

Further, the DS MAC Address field 1106 is set to the MAC address on DS side A100.

Then, the association response generator 407 outputs the generated association response frame FR6 to the MAC processing unit 405, thereby making the MAC processing unit 405 transmit the association response frame FR6 to the terminal 20 (Step S625).

When the variable use_fast_scan="1" is not met at the above-mentioned Step S622, the association request analyzer 402 issues the association response instruction INS1 to the MAC processing unit 405, thereby making the MAC processing unit 405 generate and transmit a normal association response frame FR6a prescribed by the IEEE 802.11 standard (Steps S626 and S625).

Return to FIG. 4, the terminal 20, which has received the association response frame FR6, returns an Ack frame FR3 (Step S90). Then, the terminal 20 stores in the management information storage 706 the MAC address on DS side of the access point 10_1 stored in the Current AP DS MAC Address IE field 1035 in the association response frame FR6. Thereafter, the terminal 20 becomes in communication with the access point 10_1, and thus can perform desired communication with a different node.

OPERATION EXAMPLE (2)

Figure 15:
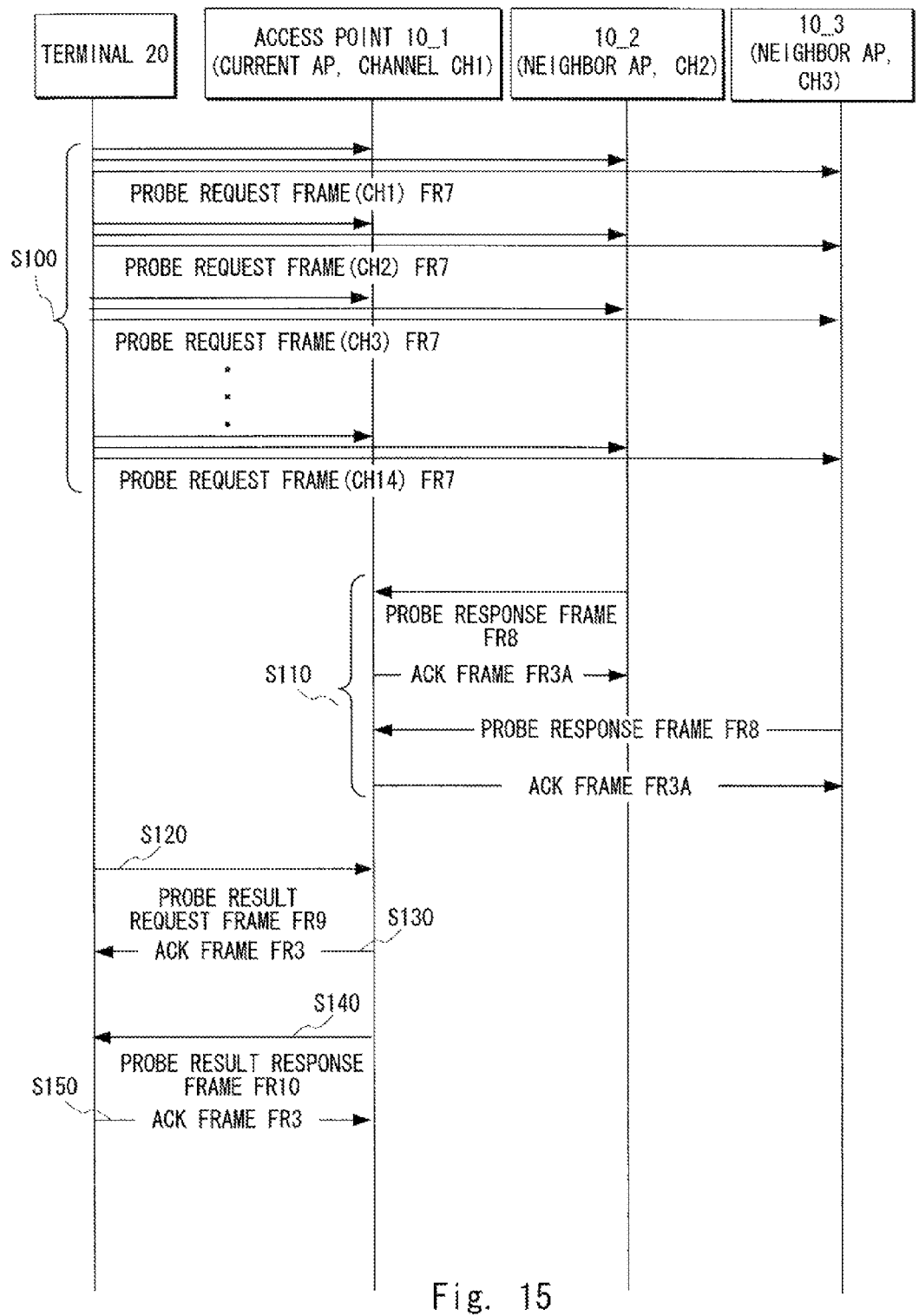
FIG. 15 is a sequence diagram showing an interoperation example (2) in the first exemplary embodiment of the base station and the terminal according to the present invention.

FIG. 15 shows Fast Active Scan operation between the terminal 20 and the access points 10_1 to 10_3.

Firstly, the terminal 20 broadcasts the probe request frame FR7 sequentially to the radio channels CH1 to CH14 (Step S100).

Figure 16:
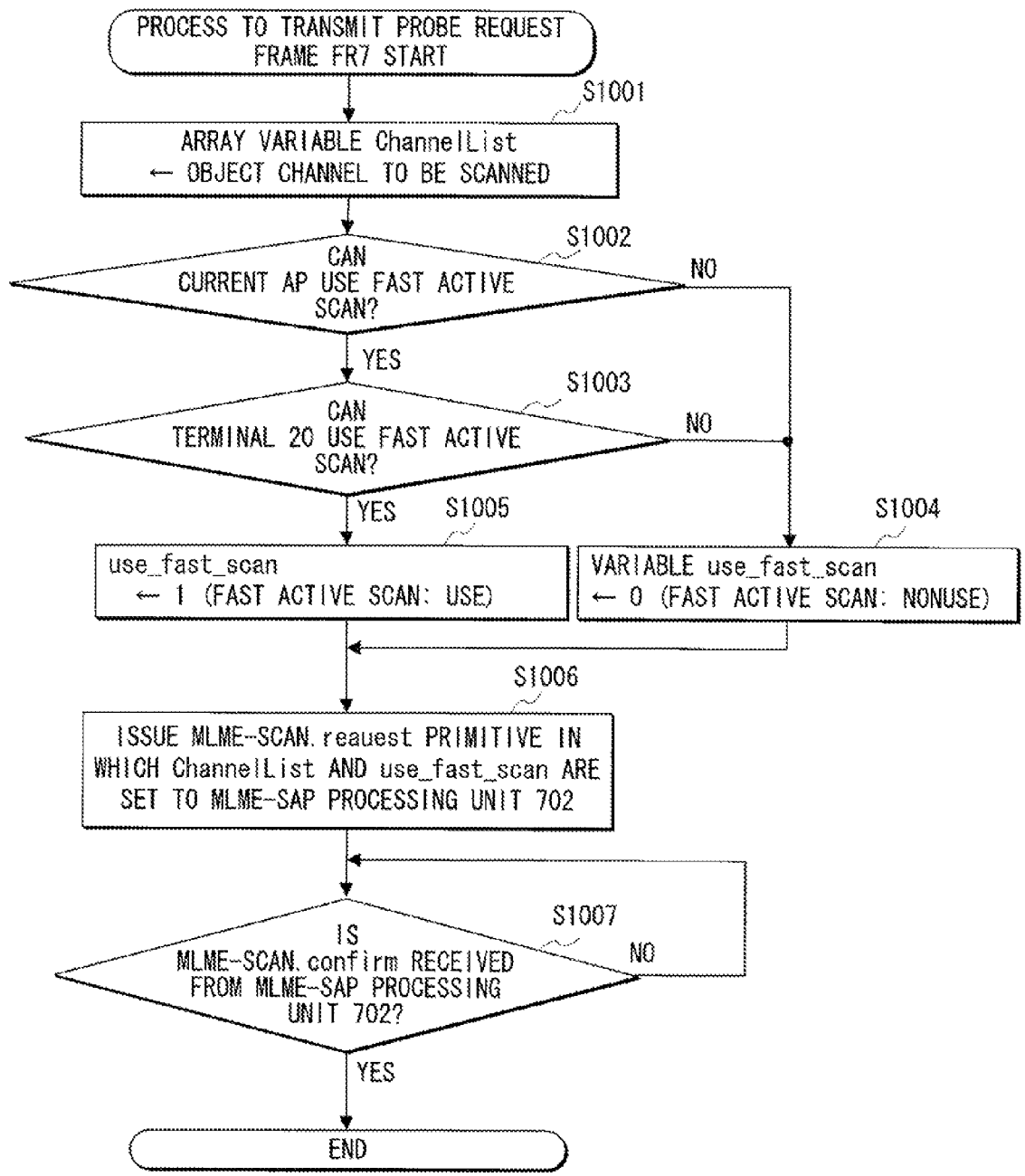
FIG. 16 is a flowchart showing an example of a process to transmit a probe request frame in the SME used in the first exemplary embodiment of the terminal according to the present invention.

Specifically, as shown in FIG. 16, the SME 800 in the terminal 20 sets an array variable ChannelList for storing object radio channels (numbers) of the active scan to the radio channels CH1 to CH14 (Step S1001). Then the SME 800 refers to the access point information storage 900 to determine whether or not the access point 10_1 can use the Fast Active Scan function, and whether or not the terminal 20 itself can use the Fast Active Scan function (Steps S1002 and S1003). When any one of the access point 10_1 and the terminal 20 cannot use the Fast Active Scan function, the SME 800 sets the variable use_fast_scan to "0 (nonuse of Fast Active Scan)" (Step S1004). On the other hand, when both of the access point 10_1 and the terminal 20 can use the Fast Active Scan function, the SME 800 sets the variable use_fast_scan to "1 (use of Fast Active Scan)" (Step S1005).

In addition, the SME 800 issues to the MLME-SAP processing unit 702 an MLME-SCAN request primitive in which necessary parameters are set in accordance with the IEEE 802.11 standard such as setting a parameter ScanType indicating a scan method to Active, and then the ChannelList and the use_fast_scan are set as the parameters (Step S1006). After the issuance of this primitive, the SME 800 waits for an MLME-SCAN.confirm to be received from the MLME-SAP processing unit 702 (Step S1007). When the MLME-SCAN.confirm is received, the SME 800 can obtain a result of the active scan from BSSDecription which is a parameter in the MLME-SCAN.confirm.

Figure 17:
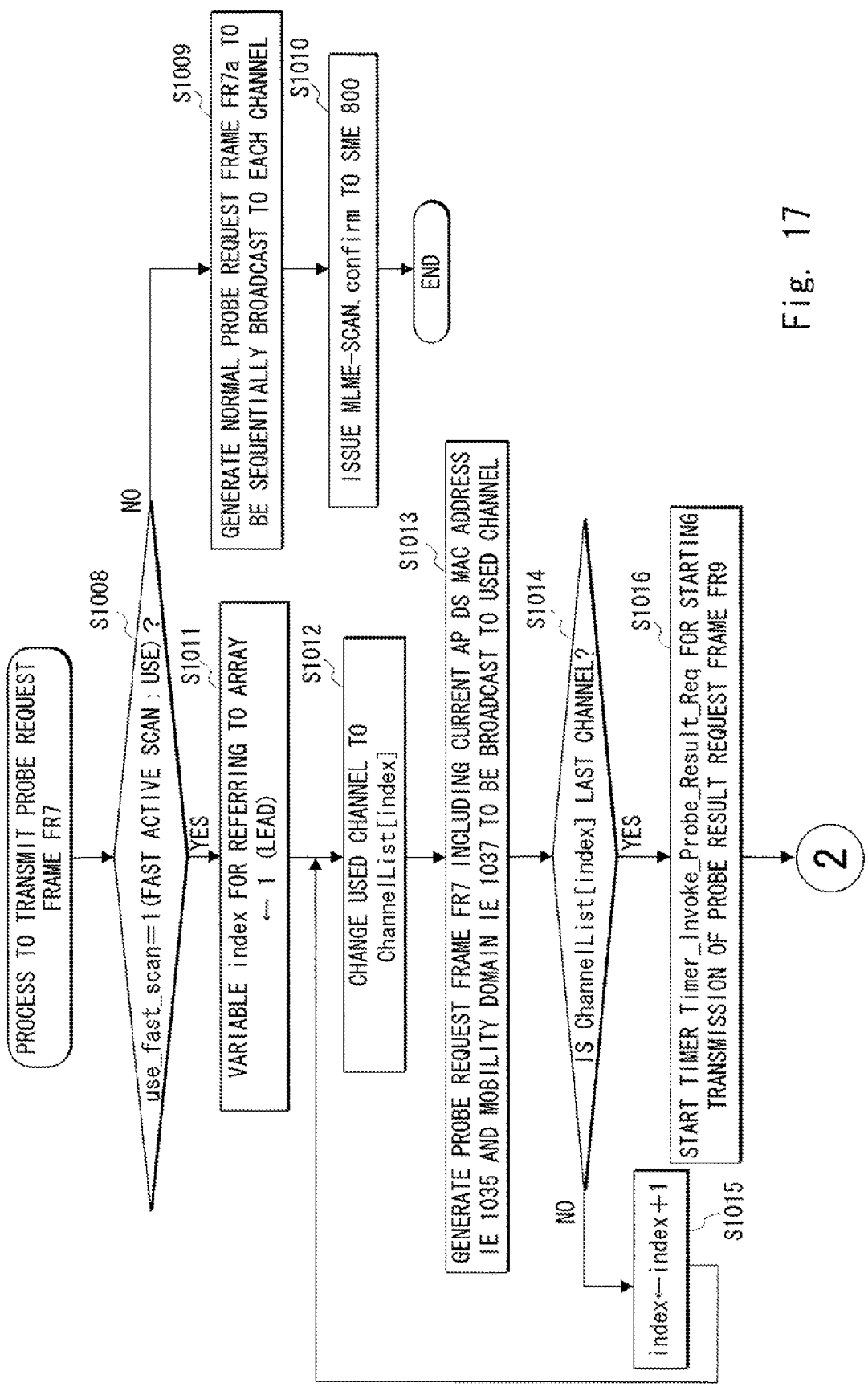
FIG. 17 is a flowchart showing a part of an example of a process to transmit the probe request frame in the IEEE 802.11 MAC unit used in the first exemplary embodiment of the terminal according to the present invention.

Then, as shown in FIG. 17, the MLME-SAP processing unit 702 determines whether or not the parameter use_fast_scan in the MLME-SCAN.request primitive is set to "1" (Step S1008). When the use_fast_scan="1" is not met, the MLME-SAP processing unit 702 instructs the MAC processing unit 701 to perform the active scan in accordance with the IEEE 802.11 standard.

Thus, a normal probe request frame FR7a prescribed by the IEEE 802.11 standard is generated and broadcast sequentially to the radio channels CH1 to CH14 (Step S1009). When the result of the active scan is received from the MAC processing unit 701, the MLME-SAP processing unit 702 issues to the SME 800 the MLME-SCAN.confirm in which the result is stored (Step S1010).

When the use_fast_scan="1" is met at the above-mentioned Step S1008, the MLME-SAP processing unit 702 initializes a variable index for referring to the array variable ChannelList to "1 (lead)" (Step S1011). Then, the MLME-SAP processing unit 702 instructs the MAC processing unit 701 to change (switch) the radio channel used for the active scan to the radio channel stored in the ChannelList[index] (Step S1012).

Further, the MLME-SAP processing unit 702 issues the probe request instruction INS5 to the probe request generator 704, thereby making the probe request generator 704 generate the probe request frame FR7, and makes the MAC processing unit 701 broadcast the probe request frame FR7 (Step S1013).

Figure 18A:
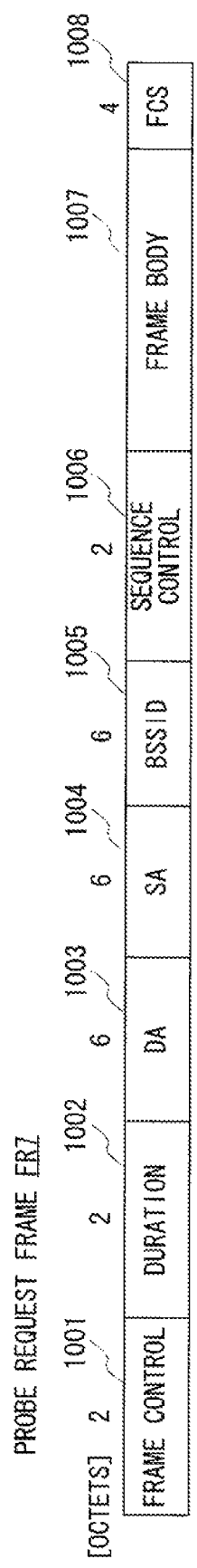
FIG. 18A is a diagram showing a configuration example of the probe request frame used in the first exemplary embodiment of the terminal according to the present invention.
Figure 18B:
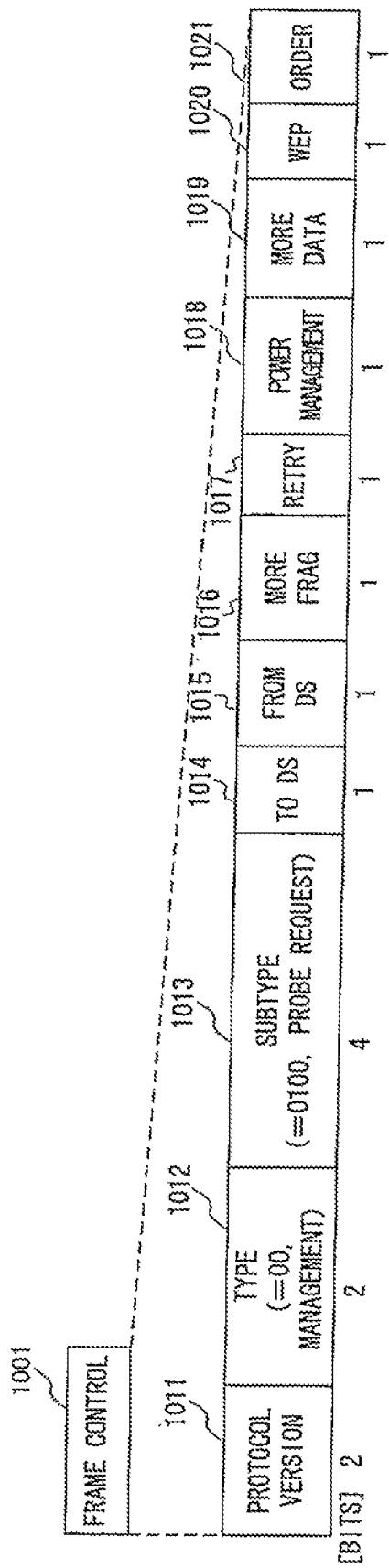
FIG. 18B is a diagram showing a configuration example of a Frame Control field in the probe request frame used in the first exemplary embodiment of the terminal according to the present invention.

As shown in FIG. 18A, the probe request frame FR7 has a format of the general Management frame prescribed by the IEEE 802.11 standard. Meanwhile, as shown in FIG. 18B, the Subtype field 1013 is set to binary digits "0100" which indicate the probe request frame.

Each of the DA field 1003 and the BSSID field 1005 is set to the broadcast address, and the SA field 1004 is set to the MAC address of the terminal 20.

Figure 18C:
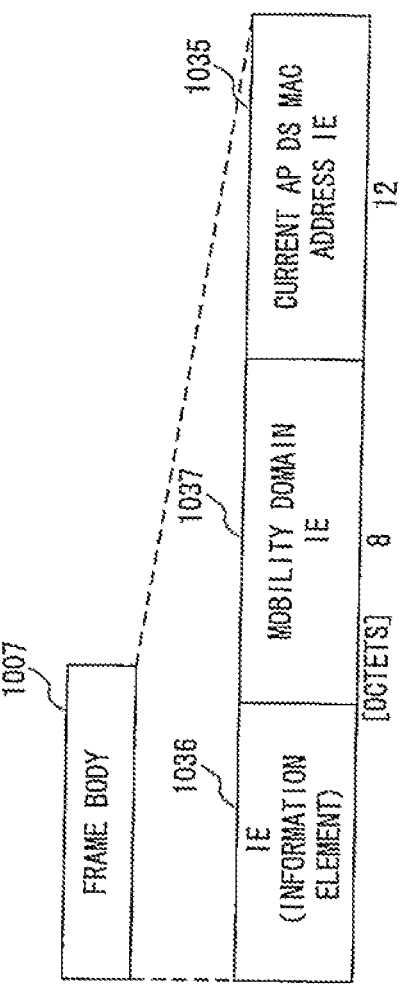
FIG. 18C is a diagram showing a configuration example of a Frame Body field in the probe request frame used in the first exemplary embodiment of the terminal according to the present invention.

Further, as shown in FIG. 18C, the Frame Body field 1007 is composed of an IE field 1036 in which information elements of the probe request frame prescribed by the IEEE 802.11 standard are set, a Mobility Domain IE field 1037, and the above-described Current AP DS MAC Address IE field 1035.

Figure 19:
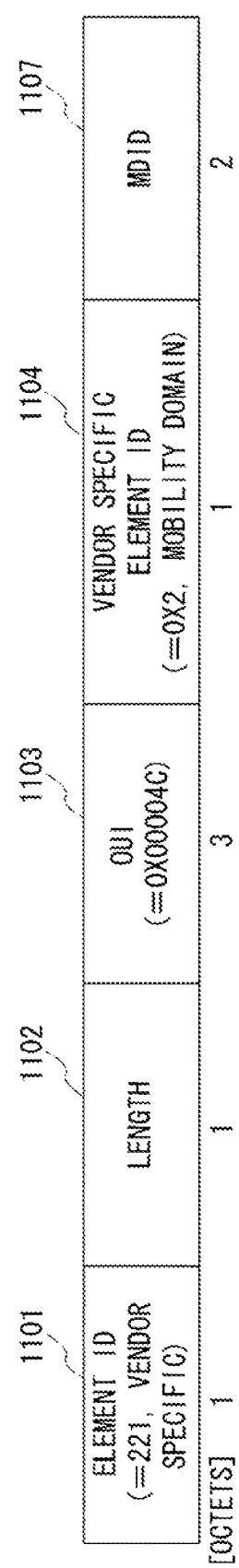
FIG. 19 is a diagram showing a configuration example of a Mobility Domain IE used in the first exemplary embodiment of the terminal according to the present invention.

As shown in FIG. 19, the field 1037 is composed of the Element ID field 1101 in which the value (e.g. "221") specific to the vendor is set, the Length field 1102, the OUI field 1103 in which the vendor identifier (e.g. "0x00004c") is set, the Vendor Specific Element ID field 1104 in which a value (e.g. "0x2") indicating the Mobility Domain 1E is set, and an MDID field 1107. Note that the Length field 1102 is set to the total length of the fields 1103 to 1107.

Further, the MDID field is set to an identifier of a mobility domain to which the access point 10_1, with which the terminal 20 is associated, belongs.

Then, the MLME-SAP processing unit 702 determines whether or not the ChannelList[index] is the last radio channel (Step S1014). When the ChannelList[index] is not the last radio channel, the MLME-SAP processing unit 702 increments the variable index by "1" (Step 1015), and again executes the above-mentioned Steps S1012 to S1014 with respect to the next radio channel.

On the other hand, when the ChannelList[index] is the last radio channel, the MLME-SAP processing unit 702 starts a timer Timer_Invoke_Probe_Result_Req for starting transmission of the probe result request frame FR9, and thus interrupts the processes (Step S1016).

Return to FIG. 15, when the access points 10_2 and 10_3 respectively use the radio channels CH2 and CH3, the access point 10_2 transmits the probe response frame FR8 in response to the probe request frame FR7 which has been received through the radio channel CH2 to the access point 10_1 through the DS media 30. Further, the access point 10_3 transmits the probe response frame FR8 in response to the probe request frame FR7 which has been received through the radio channel CH3 to the access point 10_1 through the DS media 30. The access point 10_1 returns an Ack frame FR3a in response to each probe response frame FR8 (Step S110).

Operation at this time which is common to the access points 10_2 and 10_3 will be described in detail with reference to FIGS. 20 to 22 and 23A to 23C.

Figure 20:
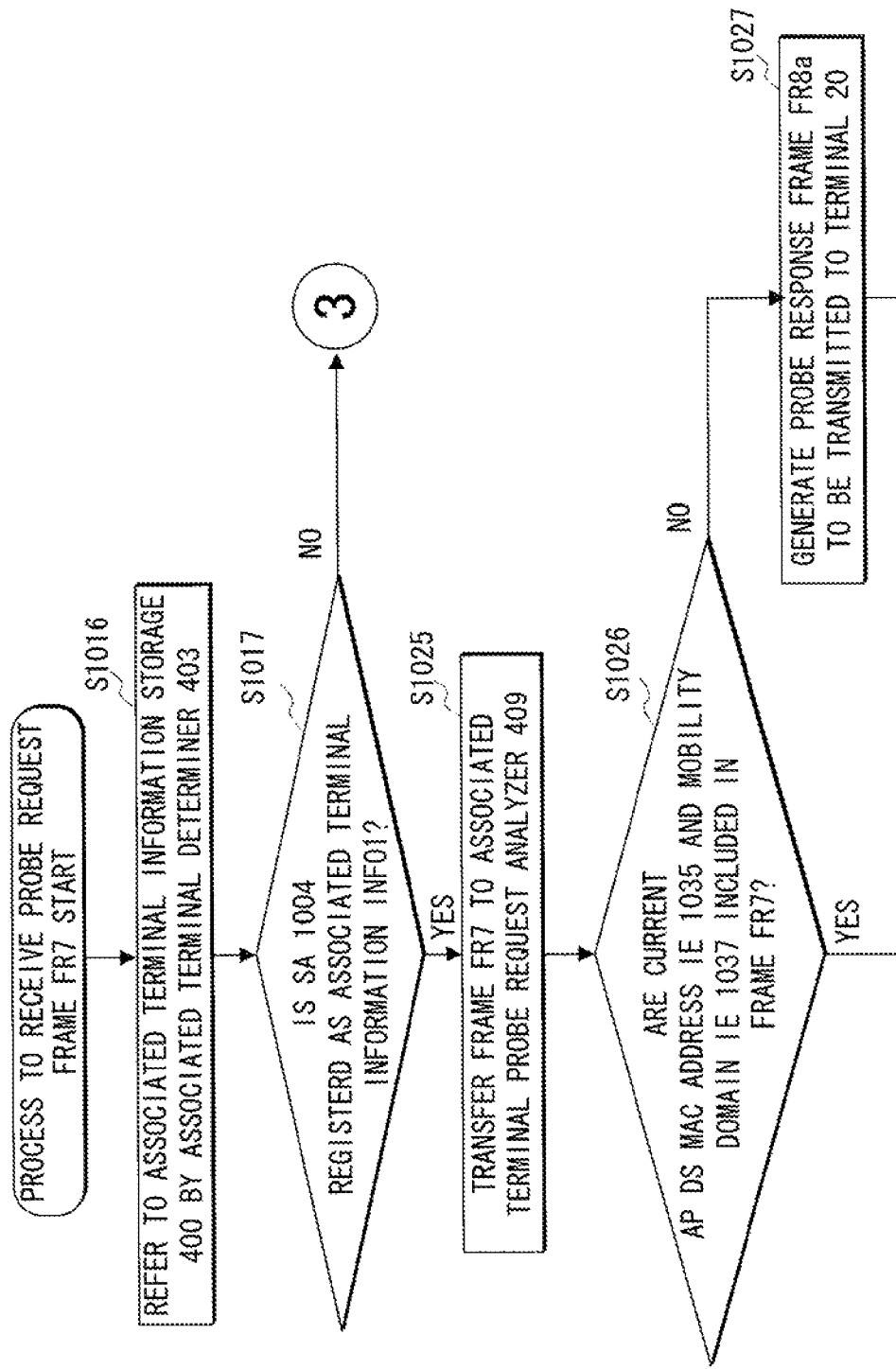
FIG. 20 is a flowchart showing a part of an example of a process to receive the probe request frame in the first exemplary embodiment of the base station according to the present invention.
Figure 21:
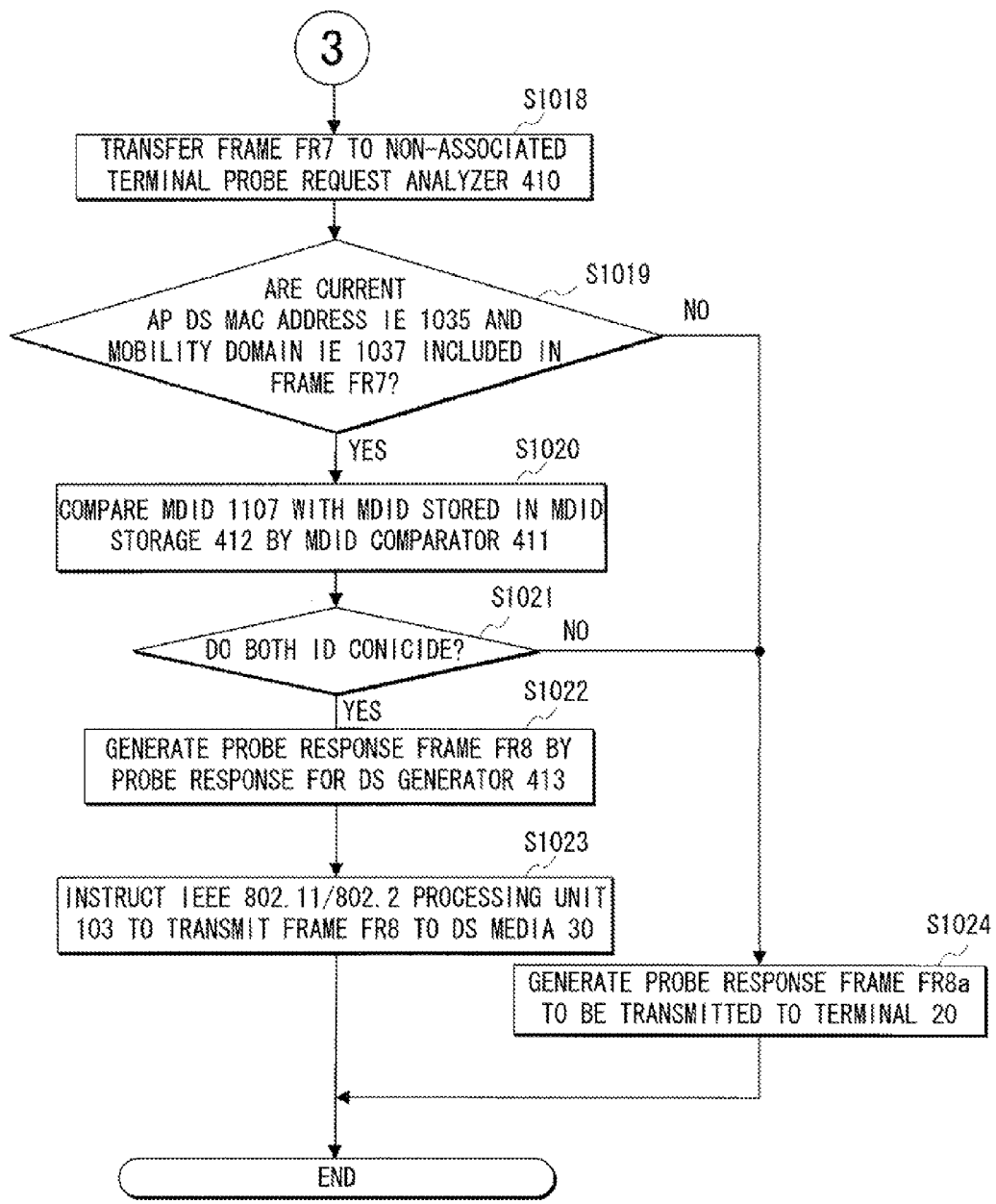
FIG. 21 is a flowchart showing the rest of the example of the process to receive the probe request frame in the first exemplary embodiment of the base station according to the present invention.

Firstly, as shown in FIG. 20, the associated terminal determiner 403, which has received the probe request frame FR7, refers to the associated terminal information storage 406 (Step S1016), and thereby determines whether or not the address stored in the SA field 1004 in the probe request frame FR7 is registered as the associated terminal information INFO1 (Step S1017). The terminal 20 is associated with neither access point 10_2 nor access point 10_3. Therefore, the associated terminal determiner 403 in each access point moves to Step S1018 shown in FIG. 21, and thus transfers the probe request frame FR7 to the non-associated terminal probe request analyzer 410.

The probe request analyzer 410, which has received the probe request frame FR7, determines whether or not the probe request frame FR7 includes the Current AP DS MAC Address IE 1035 and the Mobility Domain IE 1037 (Step S1019). As a result, when the Current AP DS MAC Address IE 1035 and the Mobility Domain IE 1037 are included, the probe request analyzer 410 transfers the probe request frame FR7 to the MDID comparator 411.

The MDID comparator 411, which has received the probe request frame FR7, compares the MDID 1107 in the Mobility Domain IE 1037 with the MDID stored in the MDID storage 412 (Step S1020). When both MDIDs coincide with each other (Step S1O21), the MDID comparator 411 transfers the probe request frame FR7 to the probe response for DS generator 413. The probe response for DS generator 413 generates the probe response frame FR8 (Step S1022), and instructs the IEEE 802.1/IEEE 802.2 processing unit 103 to transmit the probe response frame FR8 to the DS media 30 (Step S1023).

Figure 22:
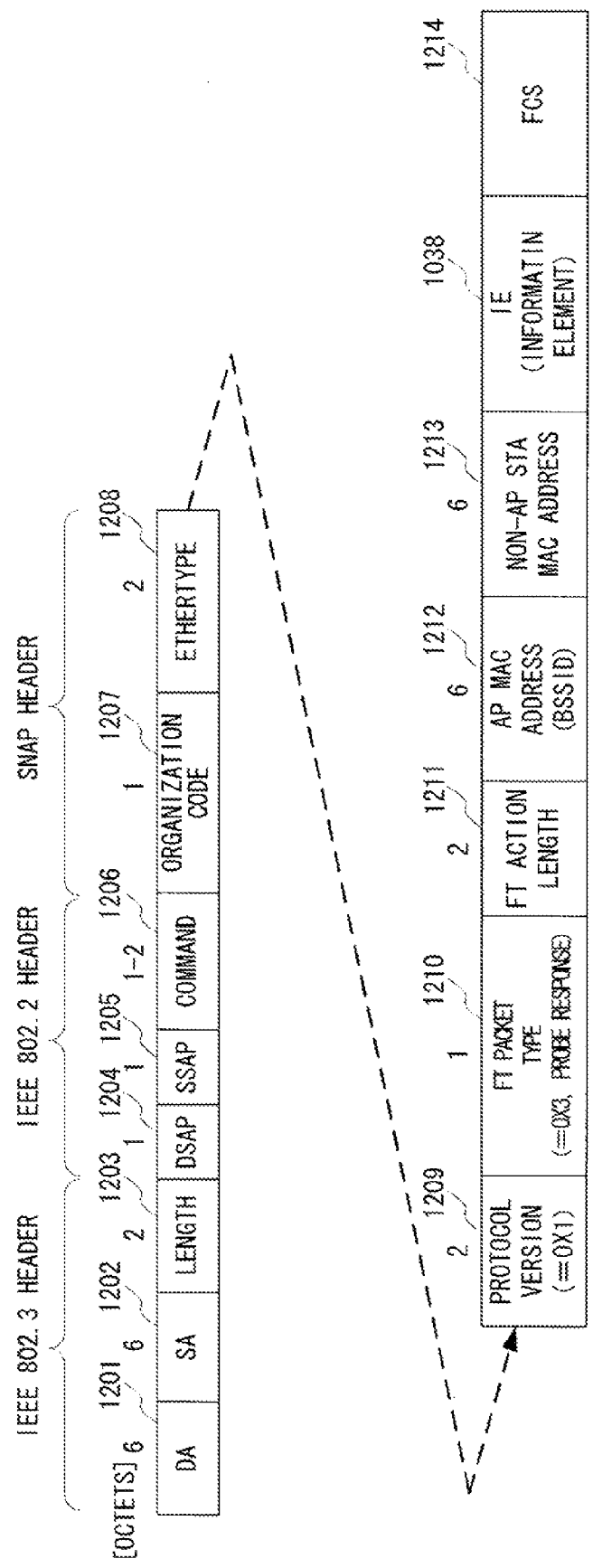
FIG. 22 is a diagram showing a configuration example of a first probe response frame used in the first exemplary embodiment of the base station according to the present invention.

As shown in FIG. 22, the probe response frame FR8 is the one in IEEE 802.3+IEEE 802.2 (LLC+SNAP (Subnetwork Access Protocol)) format, and composed of a DA field 1201, an SA field 1202, a Length field 1203, a DSAP (Destination Service Access Point) field 1204, an SSAP field 1205, a Command field 1206, an Organization Code field 1207, an EtherType field 1208, a Protocol Version field 1209, an FT Packet Type field 1210, an FT Action Length field 1211, an AP MAC Address field 1212, a Non-AP STA MAC Address field 1213, an IE field 1038 in which information elements of the probe response frame prescribed by the IEEE 802.11 standard are set, and an FCS field 1214.

The DA field 1201 stores a destination MAC address of the probe response frame FR8, and in this example, is set to the MAC address on DS side of the access point 10_1.

The SA field 1202 stores a source MAC address of the probe response frame FR8. In this example, in a case of the access point 10_2, a MAC address allocated to the IEEE 802.3 MAC unit 102 in the access point 10_2 (in a case of the access point 10_3, a MAC address allocated to the IEEE 802.3 MAC unit 102 in the access point 10_3) is set.

The Length field 1203 is set to the total length of the fields 1204 to 1038.

The DSAP field 1204 is the one for storing an address of a Service Access Point which is the destination. Assume that hexadecimal digits "0×AA" are set, because a SNAP header is used in this example.

The SSAP field 1205 is the one for storing an address of a Service Access Point which is the source. Assume that the hexadecimal digits "0×AA" are set, because the SNAP header is used in this example.

The Command field 1206 is the one for storing a command value prescribed by the IEEE 802.2 standard. For example, "0×03" is set.

Each of the Organization Code field 1207 and the EtherType field 1208 is the one which belongs to a header of a protocol prescribed by the SNAP, and indicates a protocol of data of the field 1209 and the subsequent fields. Values of these fields can be obtained at EtherType Field Registration of IEEE Standards Association. In this example, assume that values OCODE_PRESP and ETYPE_PRESP are allocated respectively to the Organization Code field 1207 and the EtherType field 1208.

The Protocol Version field 1209 is the one for storing a version in IEEE 802.3+IEEE 802.2 format, and set to e.g. value "0×1".

The FT Packet Type field 1210 is set to an identifier (e.g. "0×3") indicating the probe response frame.

The FT Action Length field 1211 is the one for storing the total length of the Non-AP STA MAC Address field 1213 and the IE field 1038.

The AP MAC Address field 1212 is set to the MAC address on terminal side (BSSID) of the source access point of the probe response frame FR8, in this example, the MAC address on terminal side of the access point 10_2 or 10_3.

The Non-AP STA MAC Address field 1213 is set to the MAC address of the destination terminal of the probe response frame FR8, in this example, the MAC address of the terminal 20.

The FCS field 1214 is set to error-detecting code for the information from the DA field 1201 to the IE field 1038.

Figure 23A:
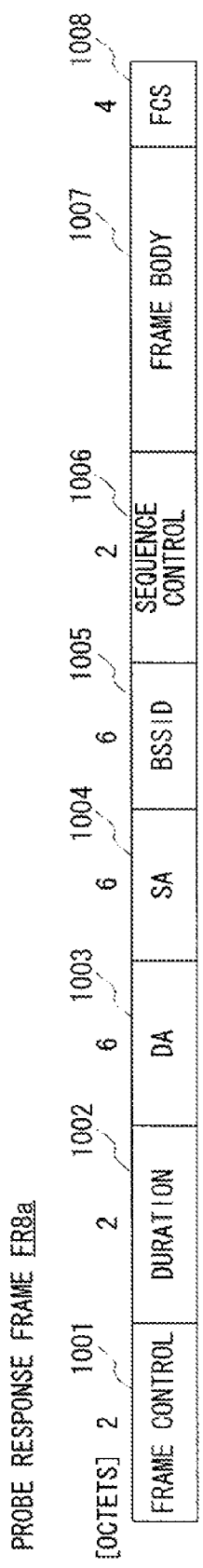
FIG. 23A is a diagram showing a configuration example of a second probe response frame used in the first exemplary embodiment of the base station according to the present invention.

Return to FIG. 21, when the condition at the above-mentioned Step S1019 or S1021 is not met, the non-associated terminal probe request analyzer 410 or the MDID comparator 411 issues the probe response instruction INS3 to the MAC processing unit 405, thereby making the MAC processing unit 405 generate a probe response frame FR8a shown in FIGS. 23A to 23C to be transmitted to the terminal 20 (Step S1024).

As shown in FIG. 23A, the probe response frame FR8a has a format of the general Management frame prescribed by the IEEE 802.11 standard. Meanwhile, as shown in FIG. 23B, the Subtype field 1013 is set to binary digits "0101" which indicate the probe response frame.

The DA field 1003 is set to the MAC address of the terminal 20, and each of the SA field 1004 and the BSSID field 1005 is set to the MAC addresses on terminal side of the access points 10_2 and 10_3.

Further, as shown in FIG. 23C, the Frame Body field 1007 is composed of the above-described IE field 1038 and Fast Active Scan Capability IE field 1032.

Return to FIG. 20, when the condition at the above-mentioned Step S1017 is met (in other words, when the probe request frame FR7 is received at the access point 10_1 which is in communication with the terminal 20), the associated terminal determiner 403 transfers the probe request frame FR7 to the associated terminal probe request analyzer 409 (Step S1025). The associated terminal probe request analyzer 409 determines whether or not the probe request frame FR7 includes the Current AP DS MAC Address IE 1035 and the Mobility Domain IE 1037 (Step S1026). As a result, when the Current AP DS MAC Address IE 1035 and the Mobility Domain IE 1037 are included, the associated terminal probe request analyzer 409 completes the processes. This is because the associated terminal probe request analyzer 409 waits for the probe result request frame FR9 to be received. On the other hand, when the Current AP DS MAC Address IE 1035 and the Mobility Domain IE 1037 are not included, the associated terminal probe request analyzer 409 issues the probe response instruction INS3 to the MAC processing unit 405, thereby making the MAC processing unit 405 generate the probe response frame FR8a to be transmitted to the terminal 20 (Step S1027).

Next, operation of the access point 10_1 upon receiving the probe response frame FR8 from the access points 10_2 and 10_3 will be described in detail with reference to FIGS. 24 and 25.

Firstly, the IEEE 802.1/IEEE 802.2 processing unit 103 receives a frame FR from the DS media 30 sequentially through the IEEE 802.3 PHY unit 101 and the IEEE 802.3 MAC unit 102, and then determines whether or not the frame FR is addressed to the access point 10_1. When the frame FR is addressed not to the access point 10_1 but to the terminal 20 which is the associated terminal, the IEEE 802.1/IEEE 802.2 processing unit 103 transfers to the MAC processing unit 405 the frame FR to be processed. When the destination of the frame FR is neither access point 10_1 nor terminal 20, the IEEE 802.1/IEEE 802.2 processing unit 103 discards the frame FR8. When the frame FR is addressed to the access point 10_1, the IEEE 802.1/IEEE 802.2 processing unit 103 refers to the Organization Code field 1207 and the EtherType field 1208 shown in FIG. 22. As a result, when it is determined that a content of data after the field 1208 corresponds to an IP protocol, the IEEE 802.1/IEEE 802.2 processing unit 103 transfers the frame FR to the IP layer. On the other hand, values of the Organization Code field 1207 and the EtherType field 1208 are the OCODE_PRESP and the ETYPE_PRESP each indicating the probe response frame, the IEEE 802.1/IEEE 802.2 processing unit 103 identifies the frame FR as the probe response frame FR8 to be transferred to the probe response receiver on DS side 104.

Figure 24:
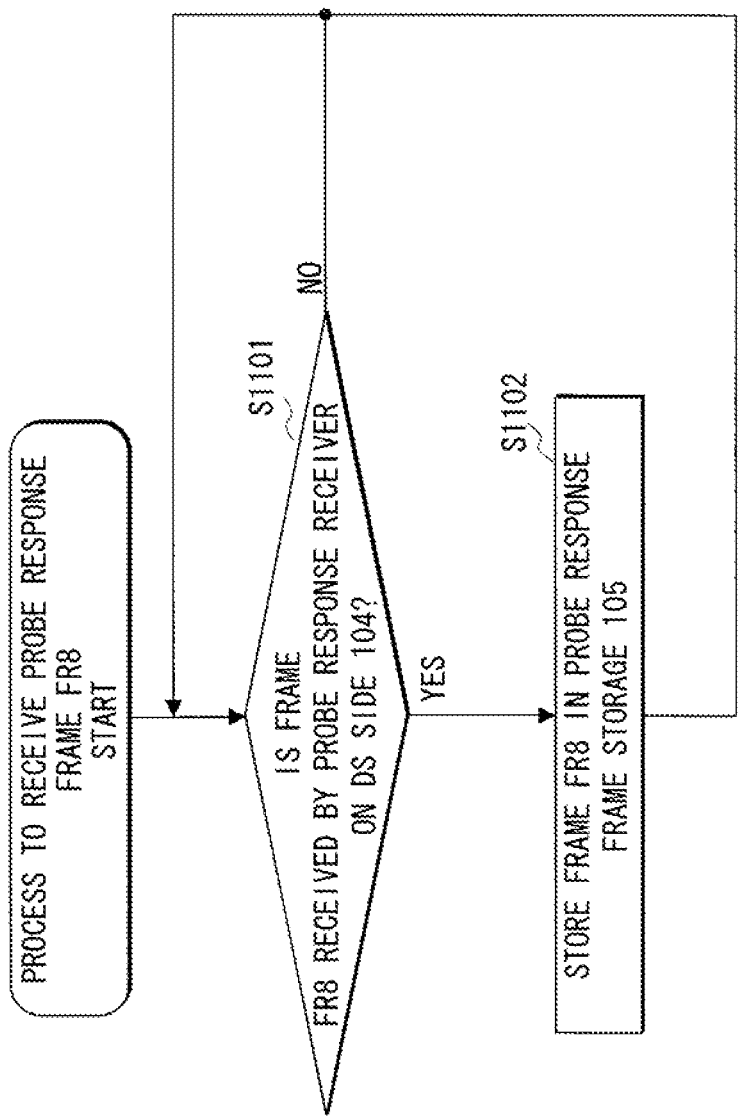
FIG. 24 is a flowchart showing an example of a process to receive the first probe response frame in the first exemplary embodiment of the base station according to the present invention.

Thus, when the probe response frame FR8 is received as shown at Step S1101 in FIG. 24, the probe response receiver on DS side 104 stores the frame FR8 in the probe response frame storage 105 (Step S1102). Specifically, as shown in FIG. 25, the probe response receiver on DS side 104 creates a record which is composed of the value of the Non-AP STA MAC Address field 1213 in the frame FR8 (the MAC address of the destination terminal of the frame FR8), the value of the AP MAC address field 1212 (the MAC address on terminal side of the destination access point of the frame FR8), and the content of the IE field 1038, and additionally stores the record in the probe response frame storage 105.

After that, as shown at Step S120 in FIG. 15, the terminal 20 transmits the probe result request frame FR9 to the access point 10_1. The access point 10_1, which has received the probe result request frame FR9, returns an Ack frame FR3 in response to the probe result request frame FR9 (Step S130), and transmits the probe result response frame FR10 to the terminal 20 (Step S140). The terminal 20, which has received the probe result response frame FR 10, returns an Ack frame FR3 in response to the probe result response frame FR10 (Step S150). Thus, the terminal 20 can acquire the probe response frames FR8 by the access points 10_2 and 10_3 from the access point 10_1 in use.

Figure 26:
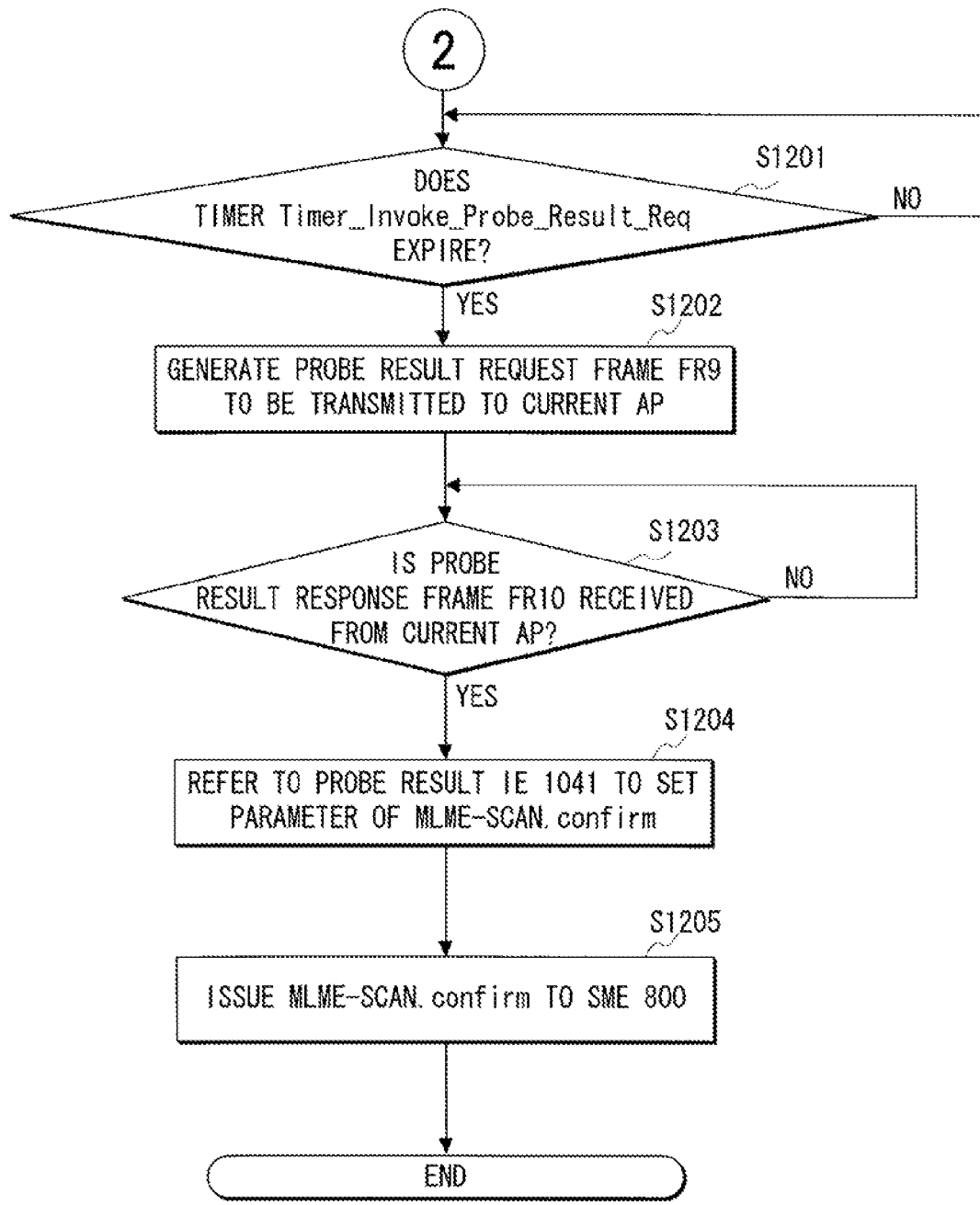
FIG. 26 is a flowchart showing the rest of the example of the process to transmit the probe request frame in the IEEE 802.11 MAC unit used in the first exemplary embodiment of the terminal according to the present invention.

Specifically, as shown in FIG. 26, the MLME-SAP processing unit 702 in the terminal 20 firstly checks whether or not the timer Timer_Invoke_Probe_Result_Req which has been started at Step S1016 in FIG. 17 expires (Step S1201). When the timer Timer_Invoke_Probe_Result_Req expires, the MLME-SAP processing unit 702 issues the probe result request instruction INS6 to the probe result request generator 705, thereby making the probe result request generator 705 generate the probe result request frame FR9, and makes the MAC processing unit 701 transmit the probe result request frame FR9 to the access point 10_1 (Step S1202).

As shown in FIG. 27A, the probe result request frame FR9 has a format of the general Management frame prescribed by the IEEE 802.11 standard. Meanwhile, as shown in FIG. 27B, the Subtype field 1013 is set to binary digits "1101" which indicate an action frame.

Each of the DA field 1003 and the BSSID field 1005 is set to the MAC address on terminal side of the access point 10_1, and the SA field 1004 is set to the MAC address of the terminal 20.

Further, as shown in FIG. 27C, the Frame Body field 1007 is composed of a Category field 1039 in which a value "6" indicating that the probe result request frame FR9 belongs to a Fast BSS Transition category is set, and an Action field 1040 in which a value (e.g. "5") indicating the probe result request frame is set.

Then, the MLME-SAP processing unit 702 waits for the probe result response frame FR10 to be received from the access point 10_1 (Step S1203).

As shown in FIG. 28A, the probe result response frame FR 10 has a format of the general Management frame prescribed by the IEEE 802.11 standard. Meanwhile, as shown in FIG. 28B, the Subtype field 1013 is set to the binary digits "1101" as with the probe result request frame FR9.

The DA field 1003 is set to the MAC address of the terminal 20, and each of the SA field 1004 and the BSSID field 1005 is set to the MAC address on terminal side of the access point 10_1.

Further, as shown in FIG. 28C, the Frame Body field 1007 is composed of the Category field 1039 in which "6" is set as with the probe result request frame FR9, the Action field 1040 in which a value (e.g. "6") indicating the probe result response frame is set, and zero or more Probe Result IE fields 1041.

Figure 29:
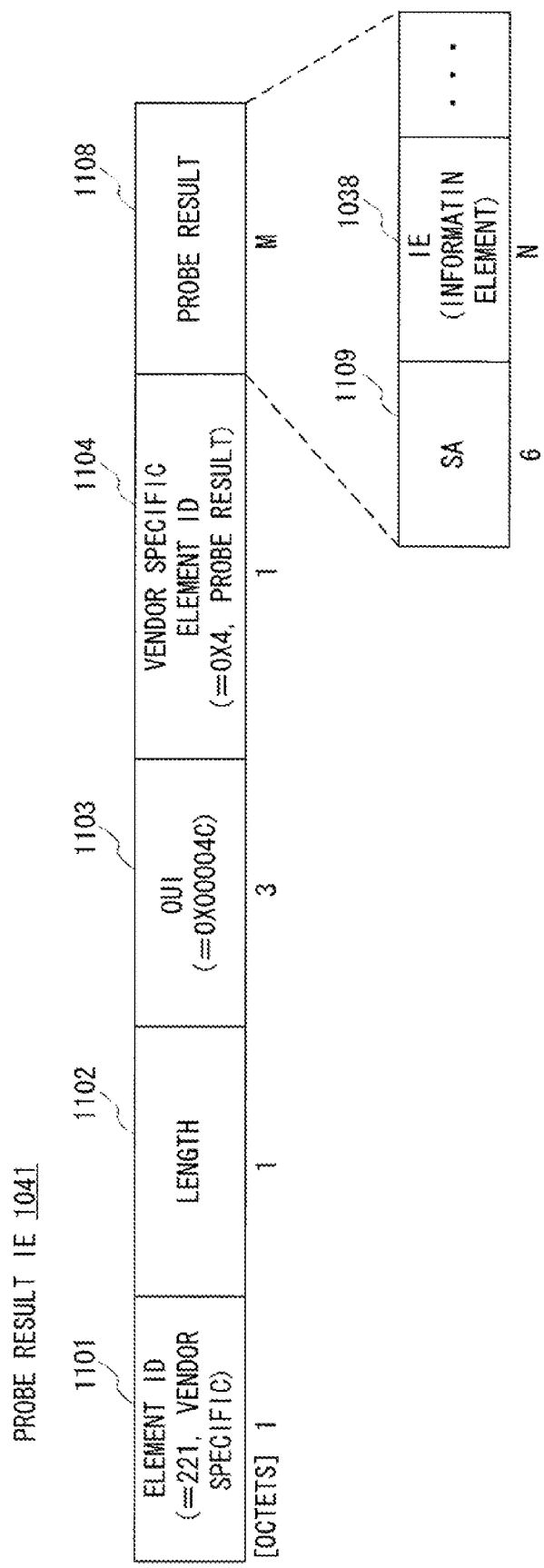
FIG. 29 is a diagram showing a configuration example of a Probe Result IE used in the first exemplary embodiment of the base station according to the present invention.

As shown in FIG. 29, the Probe Result IE field 1041 is composed of the Element ID field 1101 in which the value (e.g. "221") specific to the vendor is set, the Length field 1102, the OUI field 1103 in which the vendor identifier (e.g. "0x00004c") is set, the Vendor Specific Element ID field 1104 in which a value (e.g. "0x4") indicating the Probe Result IE is set, and a Probe Result field 1108. Note that the Length field 1102 is set to the total length of the fields 1103 to 1108.

Further, as an example, the Probe Result field 1108 is composed of an SA field 1109 and the above-described IE field 1038. The SA field 1109 and the IE field 1038 are set respectively to the value of the AP MAC address and the content of the information element shown in FIG. 25. Thus, the terminal 20 can acquire the same information as that in a case of receiving the normal probe response frame prescribed by the IEEE 802.11 standard through the radio channel.

Then, the MLME-SAP processing unit 702 receives the above-mentioned probe result response frame FR10, and then refers to the Probe Result IE 1041 to set a content of a parameter (BSSDescriptionSet) in the MLME-SCAN.confirm (Step S1204). After that, the MLME-SAP processing unit 702 issues the MLME-SCAN.confirm to the SME 800 (Step S1205).

Thus, the SME 800, which has waited for the MLME-SCAN.confirm to be received at Step S1007 in FIG. 16, can obtain the result of the active scan.

Figure 30:
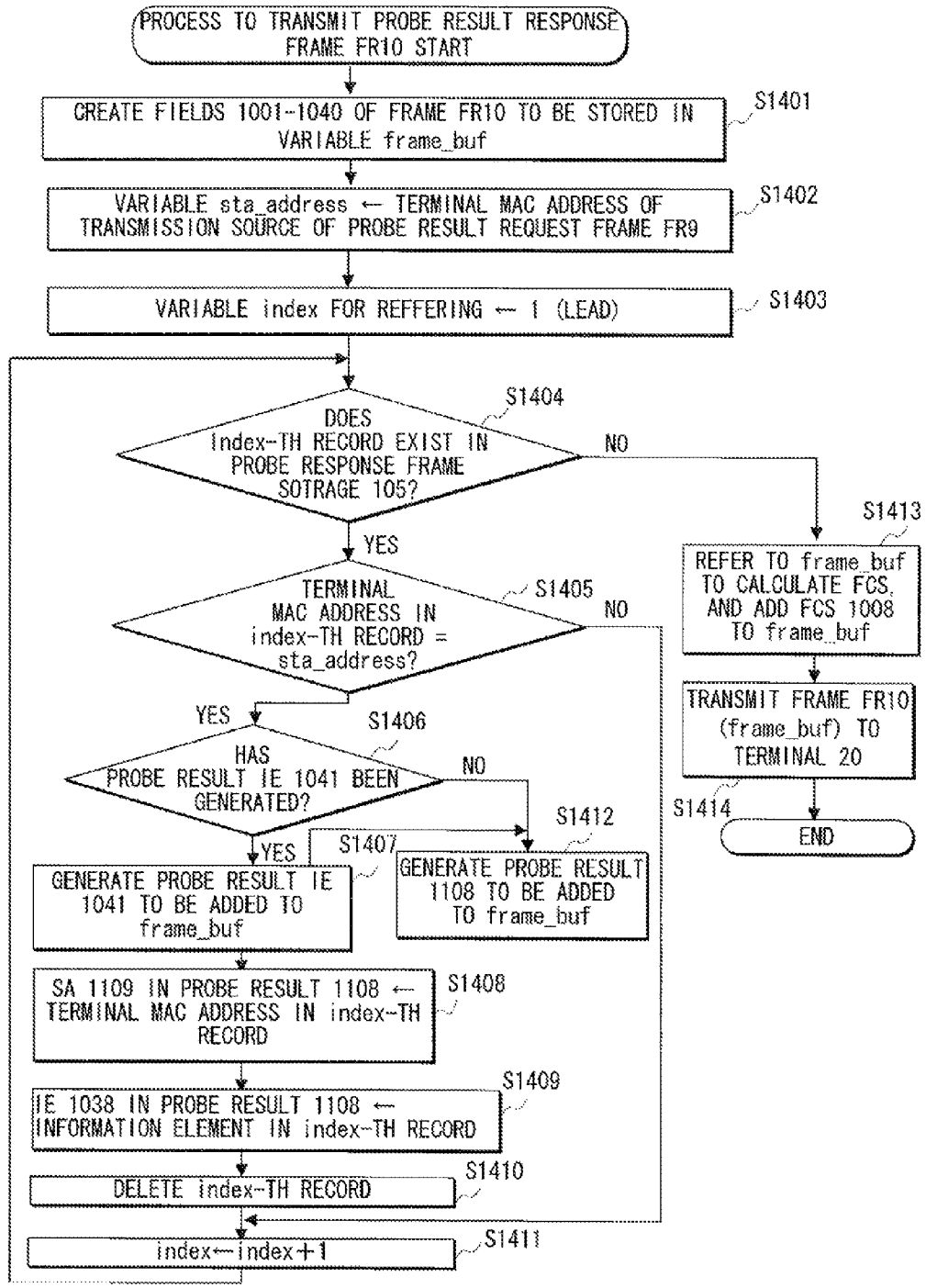
FIG. 30 is a flowchart showing an example of a process to transmit the probe result response frame in the first exemplary embodiment of the base station according to the present invention.

Further, transmission operation of the probe result response frame FR10 in the access point 10_1 will be described in detail with reference to FIG. 30.

Firstly, the probe result response generator 404, which has received the probe result request frame FR9 from the terminal 20, creates the fields 1001 to 1040 of the probe result response frame FR 10 to be stored in a variable frame_buf (Step S1401). At this time, the probe result response generator 404 stores the source MAC address of the probe result request frame FR9 (value of the SA field 1004) in the DA field 1003, and stores the MAC address on terminal side (BSSID) of the access point 10_1 in the SA field 1004. Further, the probe result response generator 404 sets the variable sta_address to the source MAC address of the probe result request frame FR9 (Step S1402).

Then, the probe result response generator 404 initializes a variable index for referring to the probe response frame storage 105 to "1 (lead)" (Step S1403). Next, the probe result response generator 404 checks whether or not there exists an index-th record stored in the probe response frame storage 105 (Step S1404). When the record exists, the probe result response generator 404 determines whether or not the terminal MAC address in the index-th record coincides with the value of the variable sta_addr (Step S1405).

When the MAC address of the terminal 20 is "11:11:11:11:11:11", the MAC address coincides with the terminal MAC address in the first record in the probe response frame storage 105. Therefore, the probe result response generator 404 moves to Step S1406, and thus checks whether or not the Probe Result IE 1041 has been already generated. The Probe Result IE 1041 has not been generated. Therefore, the probe result response generator 404 generates the Probe Result IE 1041 to be added to the variable frame_buf (Step S1407), generates the Probe Result 1108 (Step S1412), and assigns the MAC address="11:11:11:11:11:11" to the SA field 1109 in the Probe Result 1108 (Step S1408). Further, the probe result response generator 404 stores in the IE field 1038 in the Probe Result 1108 the content of the information element in the first record in the probe response frame storage 105 (Step S1409), and deletes the first record (Step S1410).

Then, the probe result response generator 404 increments the variable index by "1" and again executes the above-mentioned Steps S1404 to S1406. As a result, the terminal MAC address in the second record in the probe response frame storage 105 coincides with the value of the variable sta_addr, and the Probe Result IE 1041 has been already generated. Therefore, the probe result response generator 404 moves to Step S1412 to generate the Probe Result 1108 to be added to the variable frame_buf, and again executes the above-mentioned Steps S1408 to S1411.

In this case, each terminal MAC address in the third and fourth records in the probe response frame storage 105 does not coincide with the value of the variable sta_addr. Therefore, only the increment of the variable index shown at the above-mentioned Step S1411 is executed.

As a result, when the variable index becomes equal to "5", the fifth record does not exist in the probe response frame storage 105. Therefore, the probe result response generator 404 refers to the variable frame_buf to calculate an FCS, stores a result of the calculation in the FCS field 1008, and adds the FCS field 1008 to the variable frame_buf (Step S1413). Then, the probe result response generator 404 outputs to the MAC processing unit 405 the variable frame_buf as the probe result response frame FR 10, thereby transmitting the probe result response frame FR10 to the terminal 20 (Step S1414).

[Second Exemplary Embodiment]

In this exemplary embodiment, the Fast Active Scan function can be provided without using the probe result request frame FR9 and the probe result response frame FR10 described in the above-mentioned first exemplary embodiment.

Figure 31:
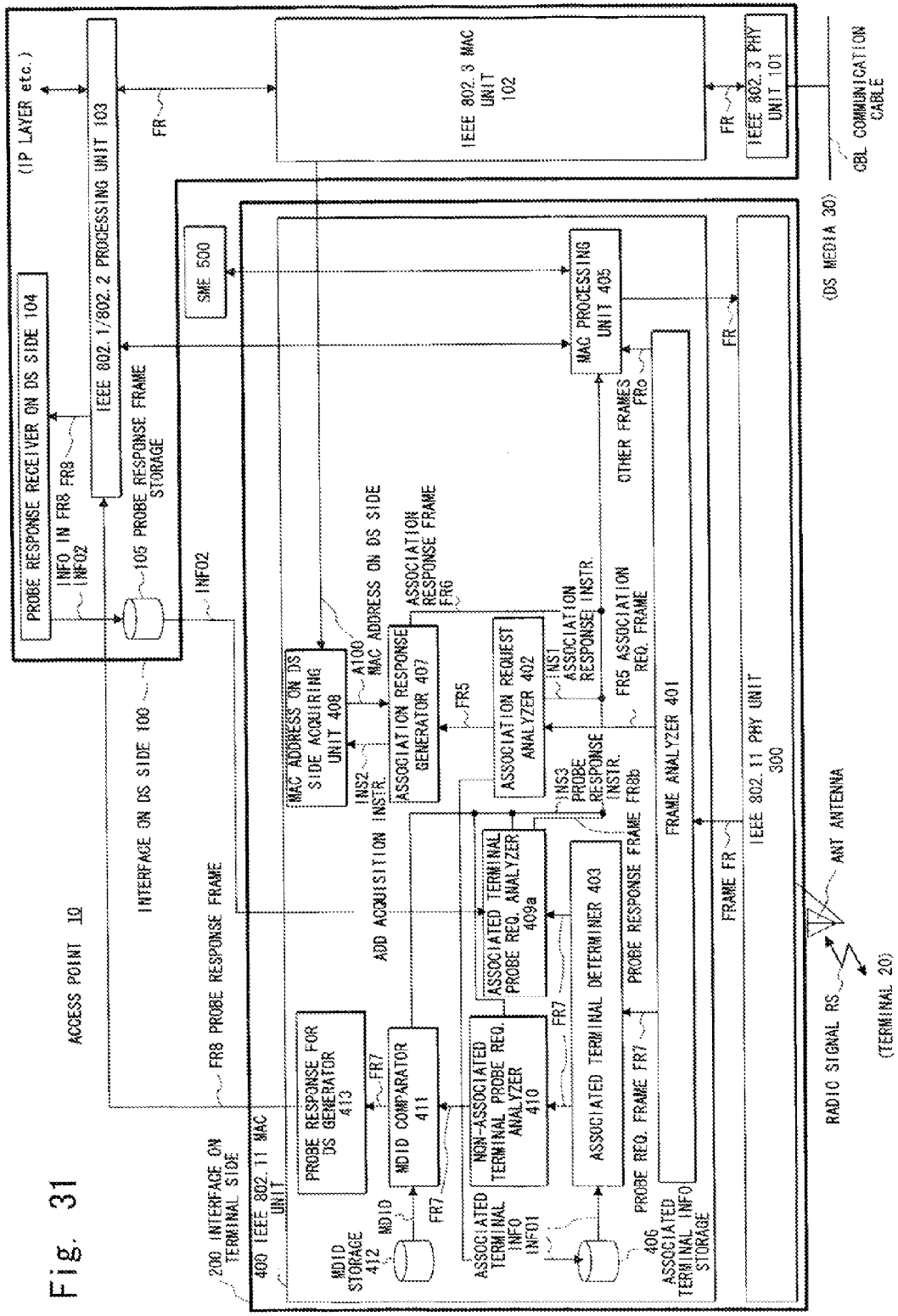
FIG. 31 is a block diagram showing a configuration example in a second exemplary embodiment of the base station according to the present invention.

An access point 10 according to this exemplary embodiment shown in FIG. 31 is different from that in the above-mentioned first exemplary embodiment in that the probe result response generator 404 shown in FIG. 2 is removed, and that an associated terminal probe request analyzer 409a acquires the information INFO2 in the probe response frame FR8 from the probe response frame storage 105 and generates a probe response frame FR8b described below.

Figure 32:
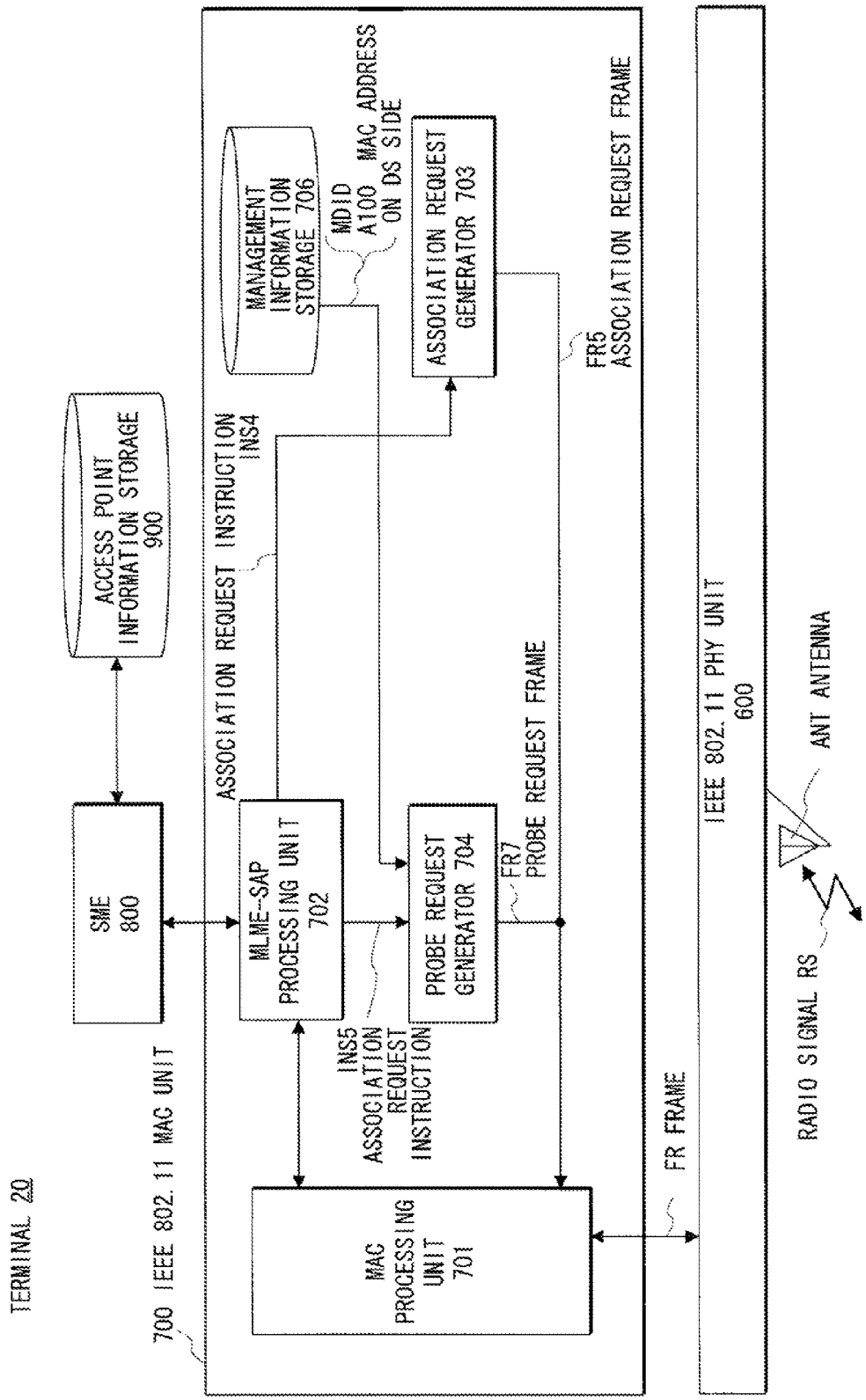
FIG. 32 is a block diagram showing a configuration example in the second exemplary embodiment of the terminal according to the present invention.

Accordingly, a terminal 20 according to this exemplary embodiment shown in FIG. 32 is different from that in the above-mentioned first exemplary embodiment in that the probe result request generator 705 shown in FIG. 3 is removed.

Figure 33:
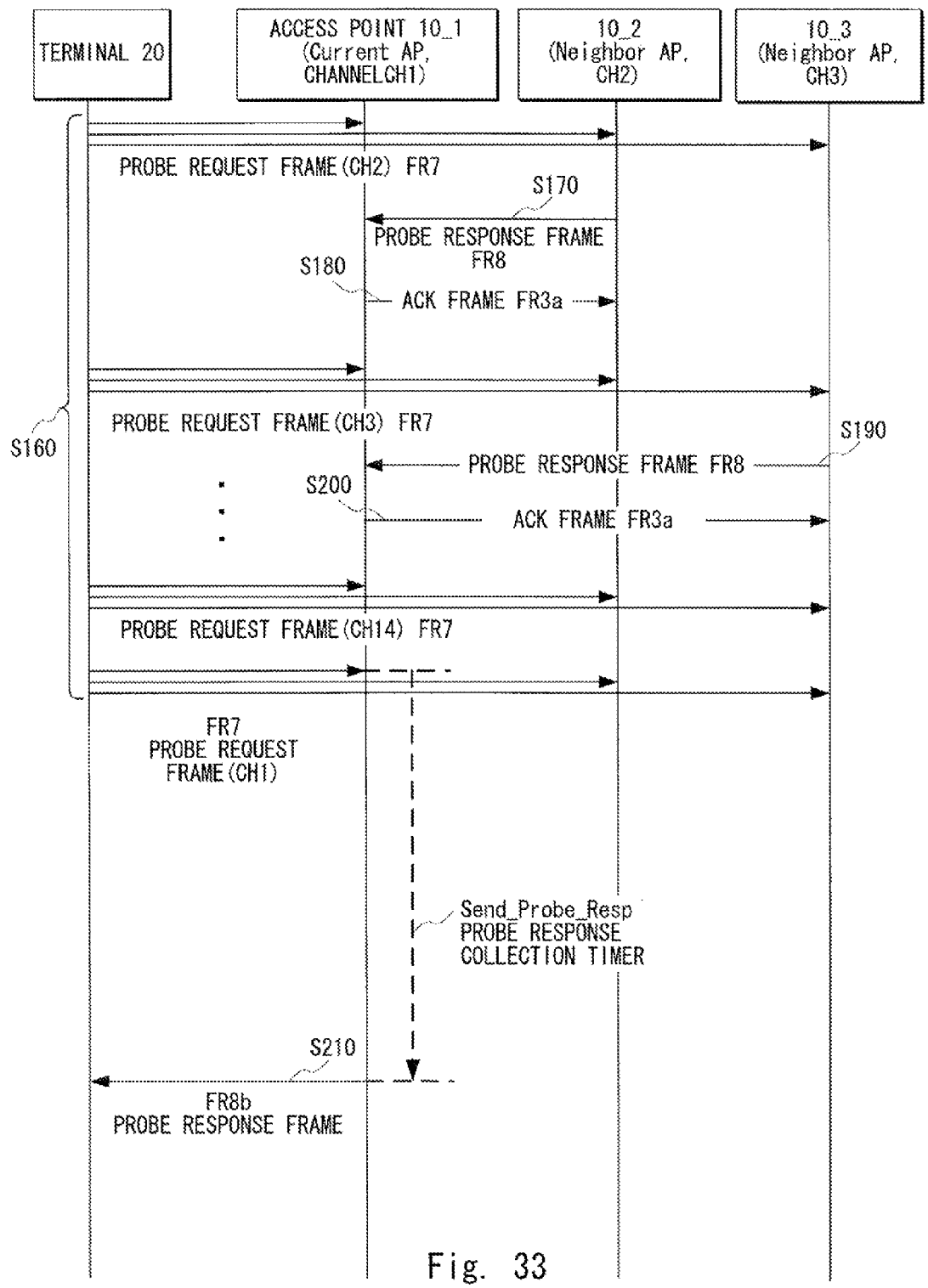
FIG. 33 is a sequence diagram showing an interoperation example in the second exemplary embodiment of the base station and the terminal according to the present invention.

In operation, as shown in FIG. 33, the terminal 20 broadcasts the probe request frame FR7 lastly to the radio channel CH1 used by the Current AP (access point 10_1) (Step S160). Specifically, the MLME-SAP processing unit 702 in the terminal 20 changes an order and the content of the ChannelList which is the parameter in the MLME-SCAN.request received from the SME 800 so as to lastly perform the switch to the radio channel CH1.

The access points 10_2 and 10_3 each transmit the probe response frame FR8 to the access point 10_1 through the DS media 30 as with the above-mentioned first exemplary embodiment (Steps S170 and S190). Further, the access point 10_1 returns the Ack frames FR3a in response to the probe response frames FR8 respectively to the access points 10_2 and 10_3 (Steps S180 and S200).

On the other hand, the access point 10_1, which has lastly received the probe request frame FR7, starts a timer (hereinafter, referred to as probe response collection timer) Send_Probe_Resp for starting transmission of the probe response frame FR8b, and generates the probe response frame FR8b to be transmitted to the terminal 20 upon the expiry of the timer Send_Probe_Resp (Step S210). The probe response collection timer Send_Probe_Resp is time for the Current AP to wait for the probe response frame FR8 to be received from another access point which uses the same radio channel as that used by the Current AP, and may have a timer value equivalent to the MaxChannelTime in the IEEE 802.11 standard. Note that the terminal 20 itself does not wait for the probe response collection timer Send_Probe_Resp to expire. Therefore, as with the above-mentioned first exemplary embodiment, it is possible to keep time during which the terminal 20 is on a radio channel other than the radio channel in use to only time required to transmit the probe request frame.

Hereinafter, an operation example of the access point 10 and a configuration example of the probe response frame FR8b will be described in detail with reference to FIGS. 34 and 35A to 35C.

Figure 34:
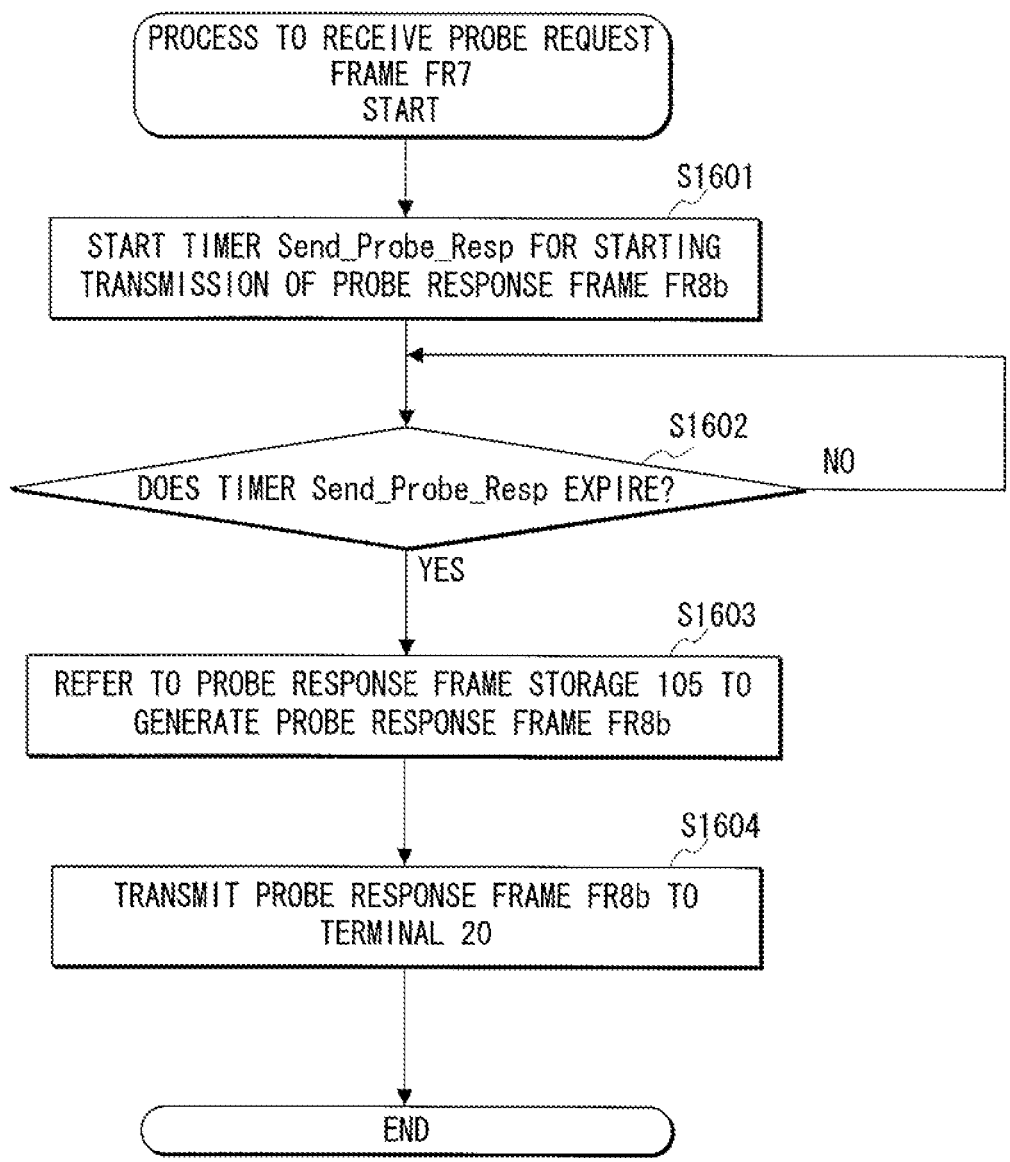
FIG. 34 is a flowchart showing an example of a process to receive the probe request frame in the second exemplary embodiment of the base station according to the present invention.

As shown in FIG. 34, the associated terminal probe request analyzer 409a in the access point 10, which has received the probe request frame FR7, starts the probe response collection timer Send_Probe_Resp and waits the expiry thereof (Step S1601). When the probe response collection timer Send_Probe_Resp expires (Step S1602), the associated terminal probe request analyzer 409a refers to the probe response frame storage 105 to generate the probe response frame FR8b (Step S1603).

Figure 35B:
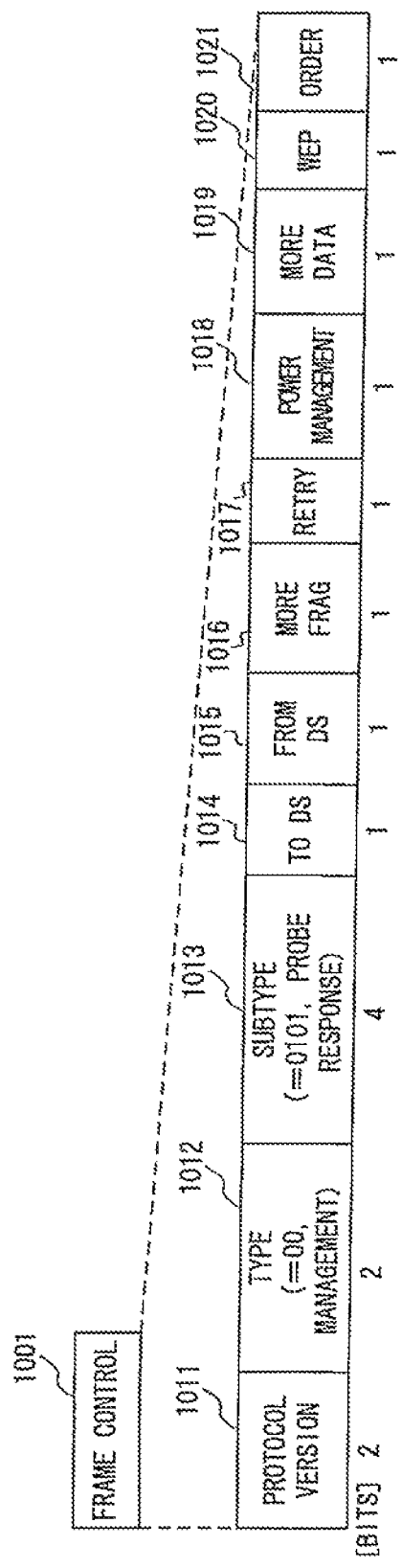
FIG. 35B is a diagram showing a configuration example of a Frame Control field in the probe response frame used in the second exemplary embodiment of the base station according to the present invention.

As shown in FIG. 35A, the probe response frame FR8b has a format of the general Management frame prescribed by the IEEE 802.11 standard. As shown in FIG. 35B, the Subtype field 1013 is set to the binary digits "0101" which indicate the probe response frame, as with the probe response frame FR8a shown in FIGS. 23A to 23C.

The DA field 1003 is set to the MAC address of the terminal 20, and each of the SA field 1004 and the BSSID field 1005 is set to the MAC address on terminal side of the access point 10_1.

Figure 35C:
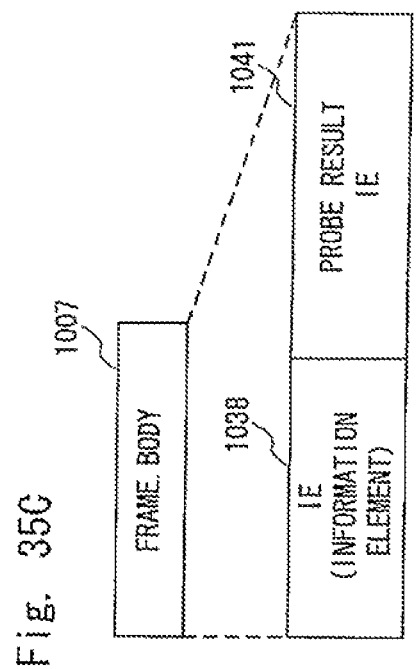
FIG. 35C is a diagram showing a configuration example of a Frame Body field in the probe response frame used in the second exemplary embodiment of the base station according to the present invention.

Further, as shown in FIG. 35C, the Frame Body field 1007 is composed of the IE field 1038 and the Probe Result IE field 1041 described in the above-mentioned first exemplary embodiment. Note that the associated terminal probe request analyzer 409a can generate the Probe Result IE 1041, as with the probe result response generator 404 shown in FIG. 2.

Then, the associated terminal probe request analyzer 409a outputs the probe response frame FR8b to the MAC processing unit 405, thereby making the MAC processing unit 405 transmit the probe response frame FR8b to the terminal 20 (Step S1604).

Further, the MLME-SAP processing unit 702 in the terminal 20, which has received the probe response frame FR8b, issues to the SME 800 the MLME-SCAN.confirm in which the parameters are set as with the case of the probe result response frame FR10 described in the above-mentioned first exemplary embodiment.

Thus, in this exemplary embodiment, it is not necessary to exchange the probe result request frame and the probe result response frame. Therefore, it is possible to avoid the consumption of bandwidth by these frames. Further, there is also the advantage that it is not necessary to newly define the probe result request frame and the probe result response frame.

[Third Exemplary Embodiment]

In this exemplary embodiment, the Fast Active Scan function can be provided without using the MDID.

An access point 10 according to this exemplary embodiment shown in FIG. 36 is different from that in the above-mentioned first exemplary embodiment in that a connection confirmation responding unit 106 is added within the interface on DS side 100 in addition to the configuration shown in FIG. 2, and that a connection confirming unit 414 is provided as substitute for the MDID comparator 411 and the MDID storage 412.

Figure 37:
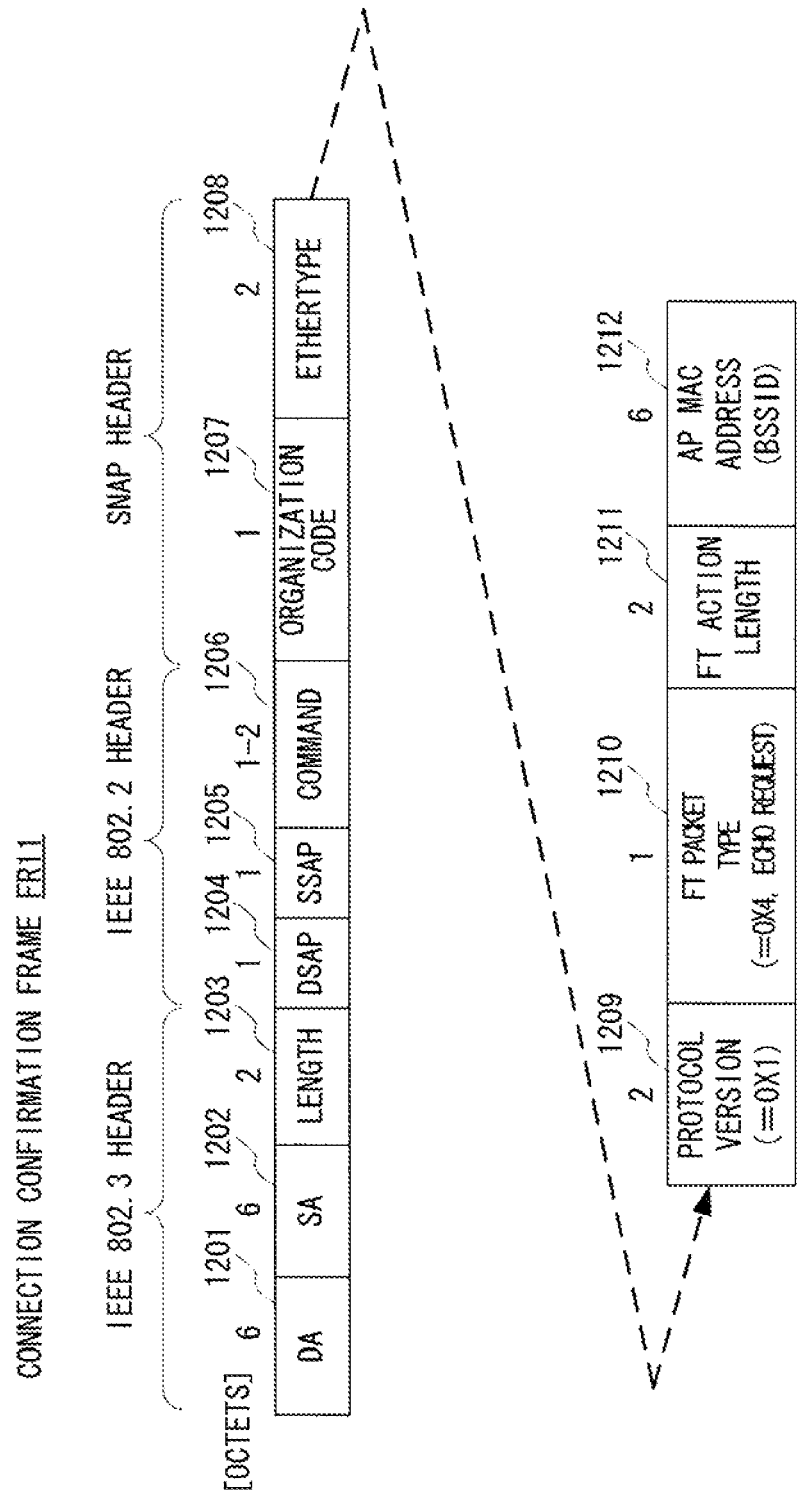
FIG. 37 is a diagram showing a configuration example of a connection confirmation frame used in the third exemplary embodiment of the base station according to the present invention.

In operation, the connection confirming unit 414 receives the probe request frame FR7 from the non-associated terminal, and then generates a connection confirmation frame FR11 shown in FIG. 37 in order to confirm whether the Current AP which has the MAC address on DS side included in the AP DS MAC Address IE field 1035 (see FIG. 18C) is connected to the AP itself through the DS media 30.

The connection confirmation frame FR11 is the one in IEEE 802.3+IEEE 802.2 (LLC+SNAP) format, and composed of the DA field 1201, the SA field 1202, the Length field 1203; the DSAP field 1204, the SSAP field 1205, the Command field 1206, the Organization Code field 1207, the EtherType field 1208, the Protocol Version field 1209, the FT Packet Type field 1210, the FT Action Length field 1211, and the AP MAC Address field 1212.

The connection confirmation frame FR11 is different from the probe response frame FR8 shown in FIG. 22 in that the FT Packet Type field 1210 is set to "0×4" which indicates the connection confirmation frame, and that the Non-AP STA MAC Address field 1213 and the subsequent fields do not exist.

Then, the connection confirming unit 414 outputs the generated connection confirmation frame FR11 to the IEEE 802.1/IEEE 802.2 processing unit 103. The connection confirmation frame FR11 is received at the Current AP through the IEEE 802.3 MAC unit 102, the IEEE 802.3 PHY unit 101, and the DS media 30.

The IEEE 802.3 MAC unit 102 in the Current AP, which has received the connection confirmation frame FR11, transfers the frame FR11 to the IEEE 802.1/IEEE 802.2 processing unit 103. The IEEE 802.1/IEEE 802.2 processing unit 103 transfers the frame FR11 to the probe response receiver on DS side 104.

The probe response receiver on DS side 104 checks the value of the FT Packet Type field 1210, and thus recognizes as the connection confirmation frame FR11. In this case, the probe response receiver on DS side 104 transfers the connection confirmation frame FR11 to the connection confirmation responding unit 106.

Figure 38:
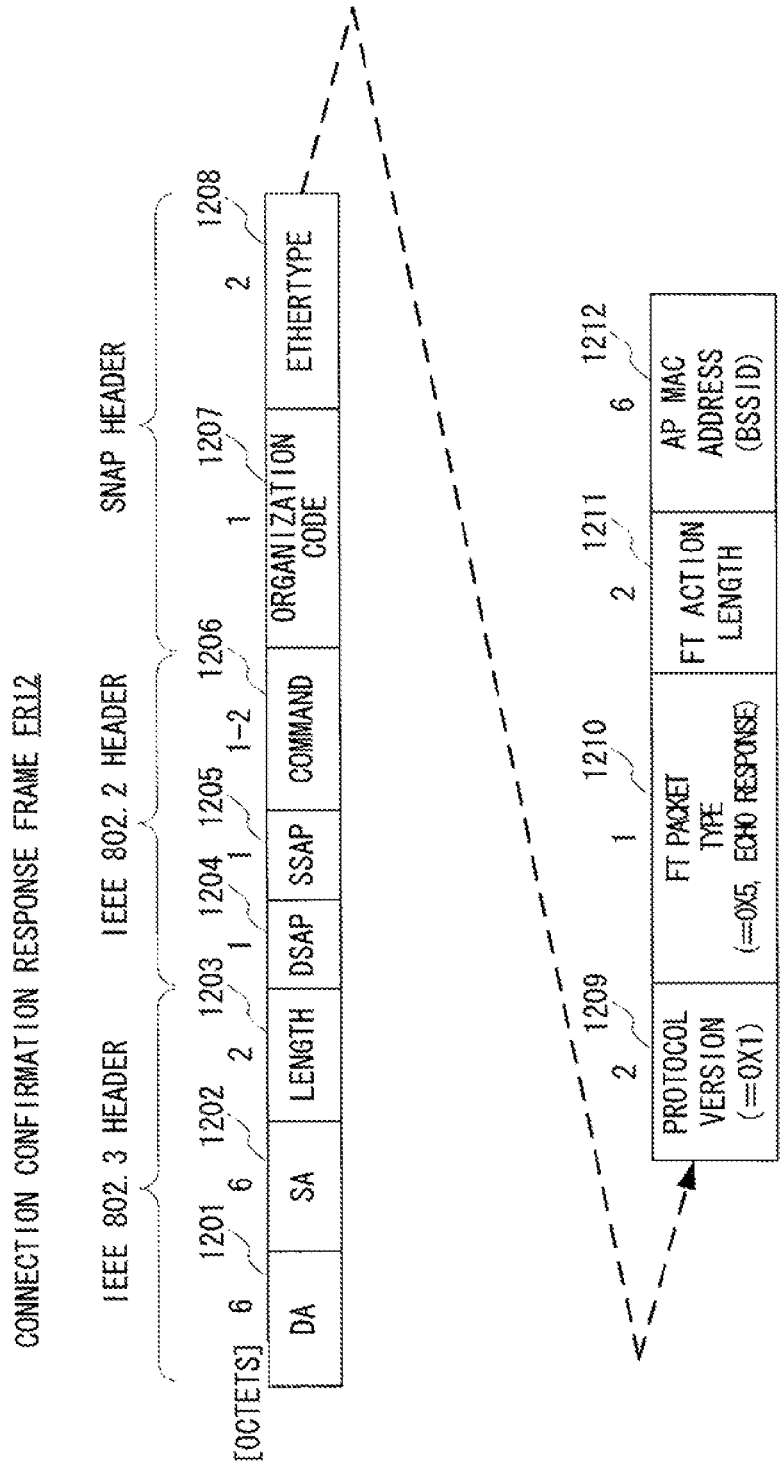
FIG. 38 is a diagram showing a configuration example of a connection confirmation response frame used in the third exemplary embodiment of the base station according to the present invention.

The connection confirmation responding unit 106 generates a connection confirmation response frame FR12 as a response to the connection confirmation frame FR11. As shown in FIG. 38, the connection confirmation response frame FR12 is different from the connection confirmation frame FR11 in that the FT Packet Type field 1210 is set to "0×5" which indicates the connection confirmation response frame. Meanwhile, the DA field 1201 is set to the source MAC address of the connection confirmation frame FR11, and the SA field 1202 is set to the MAC address on DS side of the AP itself.

Then, the connection confirmation responding unit 106 outputs the generated connection confirmation response frame FR12 to the IEEE 802.1/IEEE 802.2 processing unit 103. The connection confirmation response frame FR12 is received at the source AP of the connection confirmation frame FR11 through the IEEE 802.3 MAC unit 102, the IEEE 802.3 PHY unit 101, and the DS media 30.

The source AP of the connection confirmation frame FR11 transfers the received connection confirmation response frame FR12 to the probe response receiver on DS side 104 through the IEEE 802.3 PHY unit 101, the IEEE 802.3 MAC unit 102, and the IEEE 802.1/IEEE 802.2 processing unit 103.

The probe response receiver on DS side 104 checks the value of the FT Packet Type field 1210, and thus recognizes as the connection confirmation response frame FR12 to be transferred to the connection confirming unit 414.

The connection confirming unit 414 receives the connection confirmation response frame FR12, and thus recognizes that the Current AP to which the terminal having transmitted the probe request frame FR7 belongs is connected to the AP itself through the DS media 30. Accordingly, the connection confirming unit 414 can transmit the probe response frame FR8 through the DS media 30, as with the MDID comparator 411 in the above-mentioned first exemplary embodiment. On the other hand, when the connection confirmation response frame FR12 cannot be received even if predetermined time has elapsed, the connection confirming unit 414 recognizes as not being connected to the Current AP, and thus issues the probe response instruction INS3 to the MAC processing unit 405, thereby transmitting the normal probe response frame in accordance with the IEEE 802.11 standard to the terminal 20.

Thus, in this exemplary embodiment, the MDID is not used. Therefore, even in a network configured with access points which do not adopt the MOLD, it is possible to perform the Fast Active Scan.

Note that the present invention is not limited to the above-mentioned exemplary embodiments, and it is obvious that various modifications can be made by those of ordinary skill in the art based on the recitation of the claims.

This application is the National Phase of PCT/JP2009/057133, filed Apr. 7, 2009, which is based upon and claims the benefit of priority from Japanese patent application No. 2008-112019, filed on Apr. 23, 2008, the disclosure of which is incorporated herein in its entirety by reference.

INDUSTRIAL APPLICABILITY

The present invention is applicable to a base station and a terminal, and control methods thereof, and particularly to a base station and a terminal, and control methods thereof, which can reduce time required for scanning the base station.

REFERENCE SIGNS LIST

1 NETWORK
10, 10_1-10_3 ACCESS POINT (AP)
20 TERMINAL
30 DISTRIBUTION SYSTEM (DS) MEDIA
100, 100_1-100_3 INTERFACE ON DS SIDE
101 IEEE 802.3 PHY UNIT
102 IEEE 802.3 MAC UNIT
103 IEEE 802.1/IEEE 802.2 PROCESSING UNIT
104 PROBE RESPONSE RECEIVER ON DS SIDE
106 CONNECTION CONFRIMATION RESPONDING UNIT
105 PROBE RESPONSE FRAME STORAGE
200, 200_1-200_3 INTERFACE ON TERMINAL SIDE
300, 600 IEEE 802.11 PHY UNIT
400, 700 IEEE 802.11 MAC UNIT
401 FRAME ANALYZER
402 ASSOCIATION REQUEST ANALYZER
403 ASSOCIATED TERMINAL DETERMINER
404 PROBE RESULT RESPONSE GENERATOR
405, 701 MAC PROCESSING UNIT
406 ASSOCIATED TERMINAL INFORMATION STORAGE
407 ASSOCIATION RESPONSE GENERATOR
408 MAC ADDRESS ON DS SIDE
409, 409a ASSOCIATED TERMINAL PROBE REQUEST ANALYZER
410 NON-ASSOCIATED TERMINAL PROBE REQUEST ANALYZER
411 MDID COMPARATOR
412 MDID STORAGE
413 PROBE RESPONSE FOR DS GENERATOR
414 CONNECTION CONFIRMING UNIT
500, 800 SME
702 MLME-SAP PROCESSING UNIT
703 ASSOCIATION REQUEST GENERATOR
704 PROBE REQUEST GENERATOR
705 PROBE RESULT REQUEST GENERATOR
900 ACCESS POINT INFORMATION STORAGE
CH1-CH14 RADIO CHANNEL
A100 MAC ADDRESS ON DS SIDE

FR FRAME
FR1 BEACON FRAME
FR2 AUTHENTICATION REQUEST FRAME
FR3 ACK FRAME
FR4 AUTHENTICATION RESPONSE FRAME
FR5 ASSOCIATION REQUEST FRAME
FR6 ASSOCIATION RESPONSE FRAME
FR7 PROBE REQUEST FRAME
FR8, FR8a, FR8b PROBE RESPONSE FRAME
FR9 PROBE RESULT REQUEST FRAME
FR 10 PROBE RESULT RESPONSE FRAME
FR11 CONNECTION CONFIRMATION FRAME
FR12 CONNECTION CONFIRMATION RESPONSE FRAME
FRo OTHER FRAMES
INFO1 ASSOCIATED TERMINAL INFORMATION
INFO2 INFORMATION IN FRAME FR8
INS1 ASSOCIATION RESPONSE INSTRUCTION
INS2 ADDRESS ACQUISITION INSTRUCTION
INS3 PROBE RESPONSE INSTRUCTION
INS4 ASSOCIATION REQUEST INSTRUCTION
INS5 PROBE REQUEST INSTRUCTION
INS6 PROBE RESULT REQUEST INSTRUCTION

The invention claimed is:

1. A base station comprising:
a first interface, implemented at least in hardware, capable of communicating with a different base station through a first network; and
a second interface, implemented at least in hardware, configured to:
  receive a scan frame from a terminal;
  generate a response frame to the scan frame through the first network;
  cause the first interface to transfer the response frame to the different base station,
wherein the different base station is to then transfer the response frame to the terminal through a radio channel,
and wherein the scan frame is for scanning a base station capable of communicating with the terminal and including an address to identify the different base station that is in communication with the terminal, the response frame being addressed to the address.

2. The base station according to claim 1, wherein the first interface stores a response frame transmitted by the different base station, and the second interface notifies, in response to a request frame from a terminal that is in communication with the base station, the stored response frame to the terminal that is in communication with the base station.

3. The base station according to claim 2, wherein the second interface recognizes a scan frame from the terminal that is in communication with the base station as the request frame.

4. The base station according to claim 1, wherein the different base station and the base station itself are connected through communication media, the scan frame further includes a first identifier of the communication media, and the second interface makes the first interface transmit the response frame to the communication media when the identifier and a second identifier of the communication media held by the base station itself coincide with each other, and transmits the response frame to the terminal through the radio channel when the first identifier and the second identifier do not coincide.

5. The base station according to claim 4, wherein the second interface transmits the response frame to the terminal through the radio channel, when a scan frame not including the identifier is received.

6. The base station according to claim 1, wherein the second interface generates a confirmation frame for confirming connectivity with the different base station and makes the first interface transmit the confirmation frame, makes the first interface transfer the response frame when a return frame to the confirmation frame is received from the different base station, and transmits the response frame to the terminal through the radio channel when the return frame is not received.

7. The base station according to claim 1, wherein the second interface includes information indicating whether or not the first interface can transfer the response frame, in a frame to be transmitted through the radio channel in advance to receive the scan frame.

8. The base station according to claim 1, wherein the second interface stores information that is included in a frame received from one terminal and requesting to start communication, and that indicates whether or not to desire the transfer of the response frame by the first interface, and transmits the response frame to the one terminal through the radio channel, if the information indicates that the transfer of the response frame by the first interface is not desired when the scan frame is received from the one terminal.

9. A terminal that communicates through radio channels with a plurality of base stations connected with each other through a first network, the terminal comprising:
hardware, including a processor and memory;
computer-executable code stored by the memory and executable by the processor to:
  send a scan frame to a first base station through the radio channels;
  receive a response frame to the scan frame from a second base station through the radio channels,
wherein the first base station generates the response frame and transfers the response frame to the second base station over the first network, the second base station transferring the response frame to the terminal through the radio channels,
and wherein the scan frame is for scanning a base station capable of communicating with the terminal and including an address to identify the second base station that is in communication with the terminal, the response frame being addressed to the address.

10. The terminal according to claim 9, wherein the third unit transmits a frame for requesting the response frame to the first base station, upon acquiring the response frame.

11. The terminal according to claim 9, wherein the second unit transmits the scan frame lastly to a radio channel used for communication with the first base station, as a trigger to the acquisition of the response frame by the third unit.

12. The terminal according to claim 9, wherein the first unit includes information indicating whether or not to desire the acquisition of the response frame from the first base station, in a frame requesting the first base station to start communication.

13. A method of controlling a base station which is connected with a different base station through a first network, the method comprising:
receiving a scan frame from a terminal;
generating a response frame to the scan frame;
transferring the response frame to the difference base station over the first network,
wherein the different base station transfers the response frame to the terminal through a radio channel,
and wherein the scan frame is for scanning a base station capable of communicating with the terminal and including an address to identify the different base station that is in communication with the terminal, the response frame being addressed to the address.

14. The method according to claim 13, including:
storing a response frame transmitted by the different base station; and
notifying, in response to a request frame from a terminal that is in communication with the base station, the stored response frame to the terminal that is in communication with the base station.

15. The method according to claim 14, wherein a scan frame from the terminal that is in communication with the base station is recognized as the request frame.

16. The method according to claim 13, wherein
the different base station and the base station are connected through communication media,
the scan frame further includes an identifier of the communication media, and
the response frame is transmitted to the communication media when the identifier and an identifier of the communication media held by the base station coincide with each other, and the response frame is transmitted to the terminal through the radio channel when both of the identifiers do not coincide.

17. The method according to claim 16, wherein the response frame is transmitted to the terminal through the radio channel, when a scan frame not including the identifier is received.

18. The method according to claim 13, including:
generating a confirmation frame for confirming connectivity with the different base station and transmitting the confirmation frame;
transferring the response frame when a return frame to the confirmation frame is received from the different base station; and
transmitting the response frame to the terminal through the radio channel when the return frame is not received.

19. The method according to claim 13, wherein information that indicates whether or not the base station can transfer the response frame is included in a frame to be transmitted through the radio channel in advance to receive the scan frame.

20. The method according to claim 13, including:
storing information that is included in a frame received from one terminal and requesting to start communication, and that indicates whether or not to desire the transfer of the response frame by the base station; and
transmitting the response frame to the one terminal through the radio channel, if the information indicates that the transfer of the response frame by the base station is not desired when the scan frame is received from the one terminal.

* * * * *